(12) United States Patent
Mazar et al.

(10) Patent No.: US 12,709,203 B2
(45) Date of Patent: Aug. 18, 2026

(54) CONVERTIBLE BABY SAFETY CAR SEAT ASSEMBLY

(71) Applicant: DOONA HOLDINGS LTD., Quarry Bay (HK)

(72) Inventors: Yoav Mazar, Quarry Bay (HK); Moran Lerenthal, Quarry Bay (HK); Guy Zilberstein, Quarry Bay (HK); Maxim Holtzman, Quarry Bay (HK)

(73) Assignee: DOONA HOLDINGS LTD., Quarry Bay (HK)

( * ) Notice: Subject to any disclaimer, the term of this patent is extended or adjusted under 35 U.S.C. 154(b) by 189 days.

(21) Appl. No.: 18/524,230

(22) Filed: Nov. 30, 2023

(65) Prior Publication Data

US 2024/0227635 A1 Jul. 11, 2024

(30) Foreign Application Priority Data

Jan. 9, 2023 (IL) .......................................... 299773
Jan. 9, 2023 (IL) .......................................... 299780
Jan. 9, 2023 (IL) .......................................... 299781

(51) Int. Cl.
*B60N 2/28* (2006.01)

(52) U.S. Cl.
CPC .................................. *B60N 2/2848* (2013.01)

(58) Field of Classification Search
CPC .................................................... B60N 2/2848
(Continued)

(56) References Cited

U.S. PATENT DOCUMENTS 1,693,633 A 12/1928 Allen
3,290,050 A 12/1966 Ezquerra
(Continued)

FOREIGN PATENT DOCUMENTS

DE 1020070 B 11/1957
DE 20007466 U1 7/2000
(Continued)

OTHER PUBLICATIONS

"The All in One Child Travel Seat", http://www.hammacher.com/Product/Default.aspx?sku=77956&refsku=67232, accessed Oct. 3, 2012, 2003, 5 pages.

*Primary Examiner* — Hau V Phan
(74) *Attorney, Agent, or Firm* — Ballard Spahr LLP

(57) ABSTRACT

A convertible baby safety car seat assembly comprising an upper seat manipulable between an upright state and an extended state, and legs having distal ends with wheels and manipulable between a storage state which is combinable only with the upright state of the upper seat in a first mode of the seat assembly, and an operational state allowing the seat assembly to be rolled by means of said wheels; the extended state of the upper seat being combinable only with the operational state of the legs in a second mode of the seat assembly, whilst the operational state of the legs and the upright state of the upper seat being also combinable at least with each other. Alternatively, or in addition, the convertible baby safety car seat assembly can further comprise at least one of the following features: seat and legs manipulation mechanism actuatable at locations spaced from each other along the length of the seat; side protection module detachably attachable to a handle of the seat assembly; a zipper arrangement for detachably connecting a cover of the seat and a canopy and comprising a canopy zipper and a cover zipper. The wheels can be detachably attachable to corresponding distal ends of the legs.

26 Claims, 38 Drawing Sheets

(58) Field of Classification Search
USPC ........................................................ 280/30
See application file for complete search history.

(56) References Cited

U.S. PATENT DOCUMENTS 4,632,409 A 12/1986 Hall et al.
4,641,844 A 2/1987 Mar et al.
4,647,054 A 3/1987 Chong
4,679,804 A 7/1987 Johnson
4,685,688 A 8/1987 Edwards
4,762,331 A 8/1988 Tucker et al.
4,763,911 A 8/1988 Gebhard et al.
4,786,064 A 11/1988 Baghdasarian
4,822,064 A 4/1989 Hunter
4,828,281 A 5/1989 Sanchas
4,832,354 A 5/1989 Lafreniere
4,834,403 A 5/1989 Yanus et al.
4,872,692 A 10/1989 Steenburg
4,872,693 A 10/1989 Kennel
4,874,182 A 10/1989 Clark
4,902,026 A 2/1990 Maldonado
D310,054 S 8/1990 Tucker et al.
4,946,180 A 8/1990 Baer
4,989,888 A 2/1991 Qureshi et al.
5,022,669 A 6/1991 Johnson
5,104,134 A 4/1992 Cone
5,133,567 A 7/1992 Owens
5,188,380 A 2/1993 Tucek
5,201,535 A 4/1993 Kato et al.
5,318,311 A 6/1994 Bofill
5,360,221 A 11/1994 Chai
5,398,951 A 3/1995 Ryu
5,403,022 A 4/1995 Snider
D358,058 S 5/1995 Anthony et al.
5,595,393 A 1/1997 Batten
5,823,547 A 10/1998 Otobe et al.
6,012,184 A 1/2000 Childers
6,017,088 A 1/2000 Stephens et al.
6,196,629 B1 3/2001 Onishi et al.
6,237,995 B1 5/2001 Dierickx
6,296,259 B1 10/2001 Anderson
6,367,821 B2 4/2002 Thiele
6,446,990 B1 9/2002 Nania et al.
6,623,074 B2 9/2003 Asbach et al.
D482,641 S 11/2003 Hansen
6,655,702 B2 * 12/2003 Senger ............... B60N 2/01541 280/30
6,729,630 B2 5/2004 Szmidt et al.
6,910,696 B2 6/2005 Bargery et al.
6,976,685 B1 12/2005 King et al.
6,986,518 B1 1/2006 Besaw
7,311,353 B1 12/2007 Johnson
7,506,921 B1 3/2009 Sigmon et al.
7,540,507 B1 6/2009 Kennedy
7,543,886 B2 6/2009 Gutierrez-Hedges et al.
7,600,766 B2 10/2009 Erskine
7,871,071 B2 1/2011 Gnaegi et al.
7,871,099 B2 1/2011 Gilbertson et al.
8,087,725 B2 1/2012 Hutchinson et al.
8,128,118 B2 3/2012 Friisdahl et al.
8,434,781 B2 * 5/2013 Mazar .................. B60N 2/2848 280/30
8,469,389 B2 6/2013 Mazar et al.
8,596,670 B2 * 12/2013 di Carimate ............ B62B 7/142 280/47.38
8,622,476 B2 1/2014 Karremans et al.
8,998,242 B2 4/2015 Wang
9,114,739 B2 8/2015 Conway
9,505,321 B2 * 11/2016 Mazar .................. B60N 2/2845
9,629,476 B1 4/2017 Robbins et al.
D795,140 S 8/2017 Butler et al.
10,011,198 B2 * 7/2018 Theander ............... B60N 2/265
10,905,251 B2 2/2021 Herron
11,267,376 B2 * 3/2022 Churilla ............... B60N 2/2845
2002/0060444 A1 5/2002 Cote
2003/0015894 A1 1/2003 Bargery et al.
2003/0201625 A1 10/2003 Espenshade et al.
2003/0201626 A1 10/2003 Hartenstine et al.
2007/0085302 A1 4/2007 You et al.
2008/0042487 A1 2/2008 Chen et al.
2008/0079293 A1 4/2008 Hedges et al.
2010/0072793 A1 3/2010 Kress
2010/0109391 A1 5/2010 Berry
2012/0032420 A1 * 2/2012 Mazar .................. B60N 2/2848 280/648
2012/0119457 A1 5/2012 Williams
2013/0229033 A1 9/2013 Lee
2013/0234479 A1 9/2013 Powell et al.
2014/0097598 A1 4/2014 Sundberg et al.
2014/0265255 A1 9/2014 Wang
2015/0076798 A1 * 3/2015 Mazar .................. B60N 2/2851 280/648

FOREIGN PATENT DOCUMENTS

DE 10008230 A1 9/2001
DE 102007023509 A1 11/2008
DE 102007037588 A1 2/2009
DE 102007044833 A1 4/2009
DE 102014010783 A1 1/2016
DE 102016208997 A1 11/2017
EA 201691166 A1 2/2017
EP 0278385 A2 8/1988
EP 0466429 A1 1/1992
EP 0639490 A1 2/1995
EP 0650881 A1 5/1995
EP 1157880 A1 11/2001
FR 2745765 A3 9/1997
GB 2231537 A 11/1990
GB 2377677 A 1/2003
GB 2409970 B 9/2007
GB 2488106 A 8/2012
GB 2499422 A 8/2013
GB 2604865 A 9/2022
JP S62138639 U 9/1987
JP H072117 A 1/1995
JP H07117677 A 5/1995
JP H07117678 A 5/1995
RU 207641 U1 11/2021
WO 0179022 A2 10/2001
WO 03008228 A1 1/2003
WO 2008141778 A1 11/2008
WO 2010119446 A2 10/2010
WO 2021245425 A1 12/2021

* cited by examiner

CONVERTIBLE BABY SAFETY CAR SEAT ASSEMBLY

TECHNOLOGICAL FIELD

This invention relates to a baby safety car seat assembly, which can be used as a baby carrier and can be converted to become rollable for use, for example, as a stroller.

BACKGROUND

A baby safety car seat assembly of the kind, to which the presently disclosed subject matter refers, is disclosed, for example, in U.S. Pat. No. 8,434,781. It generally comprises legs having distal ends with wheels and is manipulable between a storage state in which the seat is configured to be mounted within a car, and an operational state allowing the seat assembly to be rolled by means of the wheels.

U.S. Pat. No. 9,629,476 discloses a device that can be converted from an infant sleeping bassinet to an infant or child seat. The device has a frame assembly and a seat structure supported by the frame assembly. The seat structure defines a seating surface and is movable between at least an inclined seating position and a reclined sleeping position.

GENERAL DESCRIPTION

In accordance with a number aspects of the presently disclosed subject matter there is provided a convertible baby safety car seat assembly comprising a seat having a backrest portion and a feet portion, the seat being manipulable between an upright state, in which the backrest and feet portions form a first angle therebetween, and an extended state, in which the backrest and feet portions form a second angle therebetween greater than the first angle; the assembly further comprising legs having distal ends with wheels and manipulable between a storage state which is combinable at least with the upright state of the seat allowing the seat assembly to be mountable in a car or on an external supporting surface at a position suitable for securing an infant therein, and an operational state allowing the seat assembly to be rolled by means of said wheels.

The orientation of the backrest in the upright and extended states can also be defined by an angle which it forms with an imaginary horizontal plane, and thus this angle in the former state is greater than in the latter state.

In the present application and claims, several features are described with respect to the imaginary horizontal plane, which can also be referred to as a 'reference plane', 'a base plane' or the like.

The above seat assembly further comprises a handlebar pivotable between different positions and having an adjustable length, allowing the handlebar to take a number of states in accordance with the mode, in which the safety car seat assembly is to be used. More particularly, the handlebar can take at least a carrier state, in which it is oriented generally vertically and a stroller state, in which it extends frontward and can have a length greater than in the carrier state. Optionally, the handlebar can further take a storage state, in which is oriented rearwardly and is positioned adjacent the backrest portion of the seat.

According to one aspect of the presently disposed subject matter the legs the storage state of the legs can be combinable only with the upright state of the seat.

Thus, the seat assembly can be used in at least the following modes:

a car seat mounting mode, which can also constitute a storage mode of the assembly, in which the seat is in its upright state, the legs are in the storage state, and the handle is in any position suitable for the car in which it is to be mounted (e.g. it can be in the storage state or it can be in an anti-rebound state in which it has the same orientation as in the stroller state but a shorter length, providing the safety car seat with the ability of being stabilized during and after possible front and rear collisions of the car, in which the seat is mounted with a baby facing a car surface, e.g. a seatback, by minimizing rotational forces associated with such collisions, thereby preventing the baby from hitting that surface with his/her head);

a rollable carrier mode, in which the seat is in its upright state, the legs are in the operational state and the handle is in the carrier state;

an upright stroller mode, in which the seat in in its upright state, the legs are in the operational state, and the handle is in the stroller state; and an extended stroller mode, in which the seat is in its extended state, the legs are in the operational state and the handle is in the stroller state.

According to a further aspect of the presently disclosed subject matter, the extended state of the seat being combinable only with the operational state of the legs in a second mode of the seat assembly, whilst the operational state of the legs and the upright state of the seat being also combinable at least with each other.

Optionally, the operational state of the legs is combinable with the upright state of the seat in a third mode of the seat assembly, and the seat assembly can be brought into its first and second modes only from its third mode.

Optionally, the convertible baby safety car seat assembly is configured so that the manipulation of the legs in the second mode of the seat assembly is prevented at least indirectly by the seat being in the extended state.

The manipulation of the seat in the first mode of the seat assembly can be prevented at least indirectly by the legs being in the storage state.

Alternatively, or in addition, the convertible baby safety car seat assembly can further comprise a seat manipulation prevention arrangement configured to prevent manipulation of the seat from the upright state to the extended state at least when the legs are in the storage state.

Thus, according to further aspect of the presently disclosed subject matter, there is provided a convertible baby safety car seat assembly comprising a seat having a backrest portion and a feet portion, there is provided a seat manipulation mechanism operable to manipulate the seat between an upright state, in which the backrest portion and the feet portion form a first angle therebetween, and an extended state, in which the backrest portion and the feet portion form a second angle therebetween, greater than the first angle; and a seat manipulation prevention arrangement configured to prevent manipulation of the seat from the upright state to the extended state at least when the legs are in the storage state.

In any of the above aspects, the convertible baby safety car seat can further comprise a leg manipulation prevention arrangement configured to prevent manipulation of the legs from the operational state to the storage state at least when the seat is in the extended state.

Thus, according to a still further aspect of the presently disclosed subject matter, there is provided a convertible baby safety car seat assembly, comprising a leg manipulation mechanism operable to manipulate the legs between their storage state and operational; and a leg manipulation prevention arrangement configured to prevent manipulation of the legs from the operational state to the storage state at least when the seat is in the extended state. The convertible baby safety car seat assembly of this aspect can also comprise the seat manipulation prevention arrangement of the previously described aspect.

Regarding the seat manipulation prevention arrangement in a convertible baby safety car seat assembly in accordance with any of the above aspects, it can have one or more of at least the following features in any combination thereof:

- the seat manipulation prevention arrangement can be configured to change states thereof between a locking state, in which the seat manipulation prevention arrangement prevents the manipulation of the seat towards the extended state, and an unlocking state, in which the seat manipulation prevention arrangement enables manipulation of the seat between the upright state and the extended state;
- the seat manipulation prevention arrangement can be configured to prevent, in the locking state, the manipulation of the seat towards the extended state by arresting the seat;
- the seat manipulation prevention arrangement can be configured to prevent, in the locking state, the manipulation of the seat towards the extended state by arresting the seat manipulation mechanism;
- the seat manipulation prevention arrangement can be configured to arrest the seat manipulation mechanism only when the seat is in its upright state;
- the seat manipulation prevention arrangement can be constituted by the legs in their storage state, e.g., by the distal ends of the legs;
- when the backrest portion of the seat, in the upright state, is positioned at a first rear angle to a base plane, and in the extended state, is positioned at a second rear angle smaller than the first rear angle, and the backrest is manipulable rearwardly from the upright state to the extended state, the distal ends of the legs can be configured to be firmly positioned, in the storage state of the legs, in contact with a rear surface of the backrest portion of the seat so as to block the rearward manipulation of the backrest portion, thereby preventing manipulation of the seat from the upright state to the extended state at least when the legs are in the storage state.

Regarding the leg manipulation prevention arrangement in a convertible baby safety car seat in accordance with any of the above aspects, it can further have one or more of at least the following features in any combination thereof:

- the leg manipulation prevention arrangement can be configured to prevent manipulation of the legs from the operational state to the storage state at least when the seat is in the extended state;
- the leg manipulation prevention arrangement can be configured to change its state between a locking state, in which the leg manipulation prevention arrangement prevents the manipulation of the legs towards the storage state, and an unlocking state, in which the leg manipulation prevention arrangement enables manipulation of the legs between the storage state and the operational state;
- the leg manipulation prevention arrangement can be configured to prevent, in the locking state, the manipulation of the legs towards the storage state by arresting the legs;
- the leg manipulation prevention arrangement can be configured to prevent, in the locking state, the manipulation of the legs towards the storage state by arresting the leg manipulation mechanism;
- the leg manipulation prevention arrangement can be configured to arrest the leg manipulation mechanism when the legs are in their operational state;
- the leg manipulation prevention arrangement can be constituted by the seat in its extended state, e.g. by the backrest portion of the seat.

When a convertible baby safety car seat assembly according to any of the above aspects comprises a seat manipulation mechanism and a leg manipulation mechanism as described above, it can further comprise a seat manipulation actuator configured to enable a user to manipulate the seat manipulation mechanism, and at least one leg manipulation actuator configured to enable a user to manipulate the leg manipulation mechanism, the seat manipulation actuator or the leg manipulation actuator/s, either the former or the latter, being positioned at a location associated with a front portion of the seat assembly, and either the latter or the former, respectively—at a location rearwardly spaced from the front portion of the seat assembly. For example, the seat manipulation actuator can be positioned at the front portion of the lower support.

Thus, in accordance with a still further aspect of the presently disclosed subject matter, there is provided a convertible baby safety car seat assembly comprising a seat with a backrest portion and feet portion, legs, a leg manipulation mechanism operable to manipulate the legs between the storage state and the operational state, and a seat manipulation mechanism operable to manipulate the seat between an upright state, in which the backrest portion and the feet portion form a first angle therebetween, and an extended state, in which the backrest portion and the feet portion form a second angle therebetween larger than the first angle, the seat assembly further comprising: a seat manipulation actuator configured to enable a user to manipulate the seat manipulation mechanism, and at least one leg manipulation actuator configured to enable a user to manipulate the leg manipulation mechanism, the seat and the leg manipulation actuators being positioned one/s at a location associated a front of the assembly and the other one/s at a location spaced longitudinally therefrom to reduce the risk of them being mixed up. For example, the seat manipulation actuator can be positioned adjacent to the feet portion and the leg manipulation actuator/s can be positioned adjacent to the backrest portion. More particularly, the seat manipulation actuator can be in the form of a seat handle positioned at the frontmost of the feet portion and at least one of the leg manipulation actuator/s can be in the form of a leg handle positioned at a top rear side of the backrest portion.

In other words, when there are more than one leg manipulation actuators, each of them fulfills the above-mentioned conditions with respect to their spaced location from the seat manipulation actuator.

In a convertible baby safety car seat assembly according to any of the above aspects or according to a still further aspect of the presently disclosed subject matter, proximal portions of the legs can be articulably connected to opposite lateral sides of the seat and the assembly can further comprise at least one side protection module.

The side protection module(s) can each be mounted on a corresponding left and right lateral side of the seat. The seat can be constituted by a lower support and an upper seat portion having structure and being operable together in the manner similar to any of the above aspects. In some examples, the seat can be constituted by a lower support and an upper seat portion integrally or unitarily formed together.

When the seat assembly is in its storage or car seat mounting mode and is positioned within a car adjacent a side door of the car, in the scenario of an impact from the door of the car on the assembly, the side protection module mounted on the side of assembly facing the car door would absorb at least a part of the energy of the impact, thereby preventing the infant seated in the assembly against injury.

Thus, in accordance with a still further aspect of the presently disclosed subject matter, there is provided a convertible baby safety car seat assembly a seat having a backrest portion and a feet portion; a handle connected to the seat at a handle attachment area of the seat by a pivotable attachment which enables pivoting of the handle between a plurality of different positions, said handle having a seat-facing area facing the handle attachment area and an opposite exterior-facing area; and a side protection module for absorbing at least a part of the energy of an impact thereupon, the side protection module being selectively mountable onto the handle at the exterior-facing area.

In a convertible baby safety car seat assembly according to any of the above aspects or any of the aspects described below, the backrest and feet portions of the seat can be manipulable in different manners to change the states of the seat between the upright and extended states. For example, the backrest and feet portions can be mounted to a lower support comprising a rear articulation portion at the rear portion of the lower support to which the backrest portion is pivotally articulated, and a front articulation portion at the front of the lower support to which the feet portion of the upper seat is configured to be slidably articulated, the change of the seat between the upright state and the extended state being achievable by the pivotal articulation of the backrest portion accompanied by the sliding articulation of the feet portion.

Thus, according to a still further aspect of the presently disclosed subject matter, there is provided a convertible baby safety car seat assembly comprising: a lower support having front and rear portions and a reference plane horizontally passing through a lowermost area of the lower support; an upper seat connected to said lower support and having a backrest portion associated with the rear portion of the lower support and a feet portion associated with the front portion of the lower support; the upper seat being manipulable between an upright state, in which the backrest and feet portions form a first angle therebetween, and an extended state, in which the backrest and feet portions form a second angle therebetween greater than the first angle; legs having wheels, the legs being manipulable between a storage state, in which at least the wheels are located above the reference plane; and an operational state, in which at least the wheels are located below the reference plane so as to enable the seat assembly to be rolled by means of said wheels; the lower support comprising a rear articulation portion at the rear portion of the lower support to which the backrest portion is pivotally articulated, and a front articulation portion at the front of the lower support to which the feet portion of the upper seat is configured to be slidably articulated, the change of the state of the upper seat between the upright state and the extended state being achievable by the pivotal articulation of the backrest portion accompanied by the sliding articulation of the feet portion. The backrest portion can be pivotally articulated about a pivot axis which is perpendicular to a longitudinal axis of the lower support, and the feet portion can be slidably articulated along the longitudinal axis of the lower support. The backrest portion and the feet portion can be connected to each other so that the manipulation of one of them induces manipulation to the other one.

In all the above aspects, the seat can optionally comprise an upper seat and a lower support, which the upper seat is articulated to and mounted on, so as to allow the upper seat to take the above described upright and extended states in the corresponding modes of the seat assembly. In addition or alternatively, the backrest portion of the seat, or of the upper seat in case the seat comprises also the lower support, can comprise an intermediate portion, to which the feet portion is connected and which is movable about a vertical axis upon manipulation of the seat or the upper seat between the upright state and the extended state.

In all the above aspects, the backrest portion of the seat can comprise a shell having an upper edge, the shell or at least a portion thereof close to the upper edge being made of a plastic material and being configured for sewing thereto adjacent to the upper edge, at least one zipper for attaching to the shell a fabric for covering at least the backrest portion and/or a canopy.

Thus, according to a still further aspect of the presently disclosed subject matter, there is provided a baby seat comprising at least in use:

- a shell made of a plastic material and having an external side facing an exterior and an internal side at which a fabric cover of the seat can be attached to the shell, the shell having a back wall and two sidewalls, each having corresponding inner and outer surfaces merging at respective upper edges, the upper edges of the back wall and sidewalls merging continuously and constituting a shell upper edge,
- the fabric cover for covering at least the internal side of the shell when the fabric cover is detachably connected thereto;
- a canopy; and
- a zipper arrangement for detachably connecting the cover and the canopy to the shell adjacent the shell upper edge, the zipper arrangement comprising a canopy zipper and a cover zipper, each of the zippers being of a separating type and comprising a zipper box and a zipper pin and having
- a shell zipper half with one of the zipper box and the zipper pin, sewn to the shell adjacent to the shell upper edge, at the outer surfaces of the back wall and the sidewalls at least along portions thereof adjacent to the back wall, and
- a matching zipper half with the other of the zipper box and the zipper pin, the matching zipper half of the first zipper being sewn to said cover and the matching zipper half of the second zipper being sewn to said canopy.

Optionally, the zipper box can be located on the shell zipper half and the zipper pin can be located on the matching zipper half.

The above baby seat including any of its optional features listed below, can constitute a part of the convertible baby safety car seat assembly in accordance with each one of the previously described aspects of the presently disclosed subject matter, as well as any other baby safety car seat assembly. It can also constitute a part of any other baby carrier or stroller or the like.

The baby seat according to this aspect of the presently disclosed subject matter can comprise one or more of at least the following features in any combination thereof:

- the shell zipper half of each of the zippers can have a base portion at which the shell zipper half is sewn to the shell and a flapping portion with zipper teeth, and both shell zipper halves of the two zippers can be sewn to the shell, at the base portions of the shell zipper halves, so that the flapping portions of the shell zipper halves can be manipulated separately and independently from each other when engaging the corresponding matching halves of the zippers;

the shell zipper half of the cover zipper can be spaced from the upper edge of the shell to a first extent and the shell zipper half of the canopy zipper can be spaced from the upper edge of the shell to a second extent that is less than the first extent;

the shell zipper half of the cover zipper can extend along at least a portion of the upper edge of the shell, and the shell zipper half of the canopy zipper can extend along a portion of the shell zipper half of the cover zipper;

when both the cover and the canopy are zipped to the shell, the canopy zipper can overly the cover zipper along the length of the canopy zipper.

the zipper boxes of the shell halves of the two zippers can be located at or adjacent different side walls of the shell, enabling the cover zipper to be fastened in a direction opposite to that of the canopy zipper;

both of the shell zipper halves can be sewn to the shell together, at least indirectly, by at least one common sewing seam;

the shell upper edge can comprise a stepped, zipper-receiving recess having a first wall at which the shell halves of the zippers are sewn to the shell and a second wall oriented transversely to the first wall and having a height defining a depth of the recess;

the zipper arrangement can further comprise a fabric binding accommodating the base portions of the shell halves and sewn to the shell therewith by the at least one common sewing seam; in this case the binding with the base portions of the shell zipper halves can have a thickness corresponding to the depth of the zipper-receiving recess;

the base portions of the shell zipper halves can be connected to each other by a pre-formed connection in addition to the at least one common sewing seam, said pre-formed connection can optionally be formed by welding and or by sewing;

the cover zipper can be longer than the canopy zipper and extend further down along each of the two sidewalls of the shell relative to the canopy zipper;

when the canopy is fastened, only the canopy zipper can be unfastened, and the cover zipper remains at least partially inaccessible.

In a convertible baby safety car seat assembly according to any of the above aspects or according to a still further aspect of the presently disclosed subject matter, the assembly when in the storage mode and positioned on an external supporting surface can be rockable thereon between a neutral position and at least one of front and rear inclined positions. At least some of the areas of the assembly that contact the external supporting surface during the rocking thereupon can be made of a material that improves at least one rocking quality compared with that which said area would have if it were made of a material from which some other areas that would not contact the external supporting surface during the rocking are made.

Thus, in accordance with a still further aspect of the presently disclosed subject matter, there is provided a convertible baby safety car seat assembly suitable for securing an infant therein, and having a first, storage mode, in which the assembly is suitable for being positioned within a car, and a second, operational mode in which the assembly is rollable along an external supporting surface, the assembly when in the storage mode and positioned on an external supporting surface being rockable thereon between a neutral position and at least one of front and rear inclined positions, the assembly comprising: one or more lowermost areas that are operable to contact the external supporting surface in the neutral position; at least one of front and rear areas that is operable to contact the external supporting surface when in said corresponding at least one of front and rear inclined positions; a horizontal reference plane including the one or more lowermost areas of the assembly when in the neutral position and imaginarily representing said external supporting surface; a lower support having front and rear portions and a seat lowermost area closest to the horizontal reference plane when the assembly is in the neutral position; an upper seat connected to said lower support and having a backrest portion associated with the rear portion of the lower support and a feet portion associated with the front portion of the lower support; legs connected to the lower support at their proximal ends and having distal ends with wheels fixed thereto at least in the operational mode, the legs being manipulable between a storage state associated at least with the storage mode of the assembly, in which at least a part of each leg with the wheel is located above the reference plane, and an operational state associated at least with the operational mode of the assembly, in which at least said part of each leg with the wheel is located below the reference plane so as to enable the seat assembly to be rolled by means of said wheels; the legs constituting a pair of rear legs and a pair of front legs; the legs of at least one of the pairs having a curved shape such that, when in the storage state, the legs of said at least one pair have a first area that is positioned above the reference plane in the neutral position, at least one second area constituting said at least one of front and rear areas, and at least one third area spaced from the first and the second area, at least the second area having a rocking-participating portion made of a material other than that of the at least one third area, said material being such as to improve at least one rocking quality compared with that which said rocking-participating portion would have if it were made of the material from which the third area is made.

In a convertible baby safety car seat assembly according to any of the above aspects or according to a still further aspect of the presently disclosed subject matter, at least the front wheels can be connected to the front legs by a quick-release mechanism, thereby allowing removal of the front wheel at least when the assembly is to be positioned in the car.

Thus, in accordance with a still further aspect of the presently disclosed subject matter, there is provided a convertible baby safety car seat assembly comprising: a lower support having front and rear portions and a reference plane horizontally passing through a lowermost area of the lower support; an upper seat connected to said lower support and having a backrest portion associated with the rear portion of the lower support and a feet portion associated with the front portion of the lower support; legs having wheels, the legs being manipulable between a storage state, in which at least the wheels are located above the reference plane and the assembly is suitable for being positioned in a car or on a supporting surface at a position suitable for securing an infant therein, and an operational state, in which at least the wheels are located below the reference plane so as to enable the seat assembly to be rolled by means of said wheels; the legs constituting a pair of rear legs associated with rear wheels, and a pair of front legs associated with front wheels, the front wheels protruding sidewards from the lower support in the storage state thereof, to a greater extent than the rear wheels at least in the rear view of the assembly; said front legs being pivotable for being manipulated from the operational state to the storage state such that in the storage state said front wheels are positioned closer to the backrest portion than the feet portion; wherein at least the front wheels are connected to the front legs by a quick-release mechanism.

The above-described aspects and features of the presently disclosed subject matter as well as additional aspects and features are further specified in embodiments of the presently disclosed subject matter presented below.

1. A convertible baby safety car seat assembly comprising:
   an upper seat having a backrest portion and a feet portion, the upper seat being manipulable between an upright state, in which the backrest and feet portions form a first angle therebetween, and an extended state, in which the backrest and feet portions form a second angle therebetween greater than the first angle; and
   legs having distal ends with wheels and manipulable between a storage state which is combinable only with the upright state of the upper seat in a first mode of the seat assembly mountable in a car at a position suitable for securing an infant therein, and an operational state allowing the seat assembly to be rolled by means of said wheels; the extended state of the upper seat being combinable only with the operational state of the legs in a second mode of the seat assembly, whilst the operational state of the legs and the upright state of the upper seat being also combinable at least with each other.
2. The convertible baby safety car seat assembly according to Embodiment 1, wherein the operational state of the legs is combinable with the upright state of the upper seat in a third mode of the seat assembly, and the seat assembly can be brought into its first and second modes only from its third mode.
3. The convertible baby safety car seat assembly according to Embodiment 1 or 2, configured so that the manipulation of the legs in the second mode of the seat assembly is prevented at least indirectly by the upper seat being in the extended state.
4. The convertible baby safety car seat assembly according to Embodiment 1, 2 or 3, further configured so that the manipulation of the upper seat in the first mode of the seat assembly is prevented at least indirectly by the legs being in the storage state.
5. The convertible baby safety car seat assembly according to any one of Embodiments 1 to 4, further comprising a seat manipulation prevention arrangement configured to prevent manipulation of the upper seat from the upright state to the extended state at least when the legs are in the storage state.
6. The convertible baby safety car seat assembly according to Embodiment 5, wherein the seat manipulation prevention arrangement is configured to change states thereof between a locking state, in which the seat manipulation prevention arrangement prevents the manipulation of the upper seat towards the extended state, and an unlocking state, in which the seat manipulation prevention arrangement enables manipulation of the upper seat between the upright state and the extended state.
7. The convertible baby safety car seat assembly according to Embodiment 6, wherein the seat manipulation prevention arrangement is configured to prevent, in the locking state, the manipulation of the upper seat towards the extended state by arresting the upper seat.
8. The convertible baby safety car seat assembly according to Embodiment 6, wherein the seat manipulation prevention arrangement is configured to prevent, in the locking state, the manipulation of the upper seat towards the extended state by arresting the seat manipulation mechanism.
9. The convertible baby safety car seat assembly according to Embodiment 8, wherein the seat manipulation prevention arrangement is configured to arrest the seat manipulation mechanism only when the upper seat is in its upright state.
10. The convertible baby safety car seat assembly according to Embodiment 8 or 9,
   wherein the seat manipulation prevention arrangement comprises a seat trigger member and a seat arresting member,
   wherein the seat trigger member is configured to operate the seat arresting member upon being triggered by the legs, when the legs are in the operational state thereof; and
   wherein the seat arresting member is operable by said seat trigger member to be manipulated, upon operation thereof, from an arresting state to a releasing state thereof, in which the seat manipulation mechanism is released from said arresting.
11. The convertible baby safety car seat assembly according to Embodiment 10, wherein the legs are configured to trigger the seat trigger member only when the legs are in their operational state.
12. The convertible baby safety car seat assembly according Embodiment 10 or 11, further comprising a lower support having two leg attachment areas at two lateral sides of the lower support, wherein the seat trigger member is disposed on the lower support adjacent to at least one of the leg attachment areas, wherein at least one of the legs comprises a frontal protrusion positioned about a proximal end of at least one of the legs, and wherein the frontal protrusion is configured to trigger the seat trigger member when the legs are in their operational state.
13. The convertible baby safety car seat assembly according to Embodiment 5, wherein the seat manipulation prevention arrangement is constituted by the legs in their storage state.
14. The convertible baby safety car seat assembly according to Embodiment 13, wherein the seat manipulation prevention arrangement is constituted by the distal ends of the legs.
15. The convertible baby safety car seat assembly according to any one of the preceding embodiments, wherein the backrest portion of the upper seat, in the upright state, is positioned at a first rear angle to a base plane, and in the extended state, is positioned at a second rear angle smaller than the first rear angle, and wherein the backrest is manipulable rearwardly from the upright state to the extended state.
16. The convertible baby safety car seat assembly according to Embodiment 15, wherein the distal ends of the legs are configured to be firmly positioned, in the storage state of the legs, in contact with a rear surface of the backrest portion of the upper seat so as to block the rearward manipulation of the backrest portion, thereby preventing manipulation of the upper seat from the upright state to the extended state at least when the legs are in the storage state.

17. The convertible baby safety car seat assembly according to any one of Embodiments 1 to 16, further comprising a leg manipulation prevention arrangement configured to prevent manipulation of the legs from the operational state to the storage state at least when the upper seat is in the extended state.
18. The convertible baby safety car seat assembly according to Embodiment 17, wherein the leg manipulation prevention arrangement is configured to change its state between a locking state, in which the leg manipulation prevention arrangement prevents the manipulation of the legs towards the storage state, and an unlocking state, in which the leg manipulation prevention arrangement enables manipulation of the legs between the storage state and the operational state.
19. The convertible baby safety car seat assembly according to Embodiment 18, wherein the leg manipulation prevention arrangement is configured to prevent, in the locking state, the manipulation of the legs towards the storage state by arresting the legs.
20. The convertible baby safety car seat assembly according to Embodiment 19, wherein the leg manipulation prevention arrangement is configured to prevent, in the locking state, the manipulation of the legs towards the storage state by arresting the leg manipulation mechanism.
21. The convertible baby safety car seat assembly according to Embodiment 20, wherein the leg manipulation prevention arrangement is configured to arrest the leg manipulation mechanism when the legs are in their operational state.
22. The convertible baby safety car seat assembly according to Embodiment 20 or 21, wherein the leg manipulation prevention arrangement comprises a leg trigger member and a leg arresting member,
    wherein the leg trigger member is configured to operate the leg arresting member upon being triggered by the upper seat, when in the upright state thereof; and
    wherein the leg arresting member is operable by said leg trigger member to be manipulated, upon operation thereof, from an arresting state to a releasing state thereof, in which the leg manipulation mechanism is released from said arresting.
23. The convertible baby safety car seat assembly according to Embodiment 22, wherein the upper seat is configured to trigger the leg trigger member only when the upper seat is in its upright state.
24. The convertible baby safety car seat assembly according to Embodiment 23, wherein the leg trigger member is connected to the upper seat and constituted as a portion of the seat manipulation mechanism, such that upon manipulation of the upper seat to the upright state the leg trigger member is further configured to maintain the upper seat in the upright state.
25. The convertible baby safety car seat assembly according to Embodiment 20 or 21, wherein the leg manipulation prevention arrangement is constituted by the upper seat in its extended state.
26. The convertible baby safety car seat assembly according to Embodiment 25, wherein the leg manipulation prevention arrangement is constituted by the backrest portion of the upper seat.
27. The convertible baby safety car seat assembly according to any one of Embodiments 17 to 26, wherein the backrest portion comprises an intermediate portion, to which the feet portion is connected.
28. The convertible baby safety car seat assembly according to Embodiment 27, wherein the intermediate portion constitutes an upper seat lowermost portion and wherein the upper seat lowermost portion is movable about a vertical axis upon manipulation of the upper seat between the upright state and the extended state.
29. The convertible baby safety car seat assembly according to Embodiment 27 or 28, wherein at least the intermediate portion of the backrest portion is formed from a flexible material.
30. A convertible baby safety car seat assembly, comprising:
    an upper seat having a backrest portion and a feet portion;
    a seat manipulation mechanism operable to manipulate the upper seat between an upright state, in which the backrest portion and the feet portion form a first angle therebetween, and an extended state, in which the backrest portion and the feet portion form a second angle therebetween, greater than the first angle;
    legs having distal ends associated with wheels and configured to be manipulated between a storage state in which the car seat assembly is mountable in a car at a position suitable for securing an infant therein, and an operational state, in which the seat assembly can be rolled by means of said wheels; and
    a seat manipulation prevention arrangement configured to prevent manipulation of the upper seat from the upright state to the extended state at least when the legs are in the storage state.
31. The convertible baby safety car seat assembly according to Embodiment 30, wherein the seat manipulation prevention arrangement is configured to change states between a locking state, in which the seat manipulation prevention arrangement prevents the manipulation of the upper seat towards the extended state, and an unlocking state, in which the seat manipulation prevention arrangement enables manipulation of the upper seat between the upright state and the extended state.
32. The convertible baby safety car seat assembly according to Embodiment 31, wherein the seat manipulation prevention arrangement is configured to prevent, in the locking state, the manipulation of the upper seat towards the extended state by arresting the upper seat.
33. The convertible baby safety car seat assembly according to Embodiment 31, wherein the seat manipulation prevention arrangement is configured to prevent, in the locking state, the manipulation of the upper seat towards the extended state by arresting the seat manipulation mechanism.
34. The convertible baby safety car seat assembly according to Embodiment 33, wherein the seat manipulation prevention arrangement is configured to arrest the seat manipulation mechanism only when the upper seat is in its upright state.
35. The convertible baby safety car seat assembly according to Embodiment 33 or 34,
    wherein the seat manipulation prevention arrangement comprises a seat trigger member and a seat arresting member,
    wherein the seat trigger member is configured to operate the seat arresting member upon being triggered by the legs, when the legs are in the operational state thereof; and
    wherein the seat arresting member is operable by said seat trigger member to be manipulated, upon operation thereof, from an arresting state to a releasing state thereof, in which the seat manipulation mechanism is released from said arresting.

36. The convertible baby safety car seat assembly according to Embodiment 35, wherein the legs are configured to trigger the seat trigger member only when the legs are in their operational state.

37. The convertible baby safety car seat assembly according Embodiment 35 or 36, further comprising a lower support having two leg attachment areas at two lateral sides of the lower support, wherein the seat trigger member is disposed on the lower support and adjacent to at least one of the leg attachment areas, wherein at least one of the legs comprises a frontal protrusion positioned about a proximal end of at least one of the legs, and wherein the frontal protrusion is configured to trigger the seat trigger member when the legs are in their operational state.

38. The convertible baby safety car seat assembly according to Embodiment 30, wherein the seat manipulation prevention arrangement is constituted by the legs in their storage state.

39. The convertible baby safety car seat assembly according to Embodiment 38, wherein the seat manipulation prevention arrangement is constituted by the distal ends of the legs.

40. The convertible baby safety car seat assembly according to any one of embodiments 30 to 39, wherein the backrest portion of the upper seat, in the upright state, is positioned at a first rear angle to a base plane, and in the extended state, is positioned at a second rear angle smaller than the first rear angle, and wherein the backrest is manipulable rearwardly from the upright state to the extended state.

41. The convertible baby safety car seat assembly according to Embodiment 40 when dependent on any one of Embodiments 32 or 33, wherein the distal ends of the legs are configured to be firmly positioned, in the storage state of the legs, in contact with a rear surface of the backrest portion of the upper seat so as to block the rearward manipulation of the backrest portion, thereby preventing manipulation of the upper seat from the upright state to the extended state at least when the legs are in the storage state.

42. The convertible baby safety car seat assembly according to any one of Embodiments 30 to 41, further comprising a leg manipulation prevention arrangement configured to prevent manipulation of the legs from the operational state to the storage state at least when the upper seat is in the extended state.

43. The convertible baby safety car seat assembly according to Embodiment 42, wherein the leg manipulation prevention arrangement is configured to change its state between a locking state, in which the leg manipulation prevention arrangement prevents the manipulation of the legs towards the storage state, and an unlocking state, in which the leg manipulation prevention arrangement enables manipulation of the legs between the storage state and the operational state.

44. The convertible baby safety car seat assembly according to Embodiment 43, wherein the leg manipulation prevention arrangement is configured to prevent, in the locking state, the manipulation of the legs towards the storage state by arresting the legs.

45. The convertible baby safety car seat assembly according to Embodiment 43, wherein the leg manipulation prevention arrangement is configured to prevent, in the locking state, the manipulation of the legs towards the storage state by arresting the leg manipulation mechanism.

46. The convertible baby safety car seat assembly according to Embodiment 45, wherein the leg manipulation prevention arrangement is configured to arrest the leg manipulation mechanism when the legs are in their operational state.

47. The convertible baby safety car seat assembly according to Embodiment 45 or 46, wherein the leg manipulation prevention arrangement comprises a leg trigger member and a leg arresting member, wherein the leg trigger member is configured to operate the leg arresting member upon being triggered by the upper seat, when in the upright state thereof; and wherein the leg arresting member is operable by said leg trigger member to be manipulated, upon operation thereof, from an arresting state to a releasing state thereof, in which the leg manipulation mechanism is released from said arresting.

48. The convertible baby safety car seat assembly according to Embodiment 47, wherein the upper seat is configured to trigger the leg trigger member only when the upper seat is in its upright state.

49. The convertible baby safety car seat assembly according to Embodiment 48, wherein the leg trigger member is connected to the upper seat and constituted as a portion of the seat manipulation mechanism, such that upon manipulation of the upper seat to the upright state the leg trigger member is further configured to maintain the upper seat in the upright state.

50. The convertible baby safety car seat assembly according to Embodiment 42 or 43, wherein the leg manipulation prevention arrangement is constituted by the upper seat in its extended state.

51. The convertible baby safety car seat assembly according to Embodiment 50, wherein the leg manipulation prevention arrangement is constituted by the backrest portion of the upper seat.

52. The convertible baby safety car seat assembly according to any one of Embodiments 42 to 51, wherein the backrest portion comprises an intermediate portion, to which the feet portion is connected.

53. The convertible baby safety car seat assembly according to Embodiment 52, wherein the intermediate portion constitutes an upper seat lowermost portion and wherein the upper seat lowermost portion is movable about a vertical axis upon manipulation of the upper seat between the upright state and the extended state.

54. The convertible baby safety car seat assembly according to Embodiment 52 or 53, wherein at least the intermediate portion of the backrest portion is formed from a flexible material.

55. A convertible baby safety car seat assembly, comprising:

an upper seat having a backrest portion and a feet portion;

a seat manipulation mechanism operable to manipulate the upper seat between an upright state, in which the backrest portion and the feet portion form a first angle therebetween, and an extended state, in which the backrest portion and the feet portion form a second angle therebetween larger than the first angle;

legs having distal ends associated with wheels;

a leg manipulation mechanism operable to manipulate the legs between a storage state in which the car seat assembly is mountable in a car at a position suitable for securing an infant therein, and an operational state, in which the seat assembly can be rolled by means of said wheels; and a leg manipulation prevention arrangement configured to prevent manipulation of the legs from the operational state to the storage state at least when the upper seat is in the extended state.

56. The convertible baby safety car seat assembly according to Embodiment 55, wherein the leg manipulation prevention arrangement is configured to change its state between a locking state, in which the leg manipulation prevention arrangement prevents the manipulation of the legs towards the storage state, and an unlocking state, in which the leg manipulation prevention arrangement enables manipulation of the legs between the storage state and the operational state.

57. The convertible baby safety car seat assembly according to Embodiment 56, wherein the leg manipulation prevention arrangement is configured to prevent, in the locking state, the manipulation of the legs towards the storage state by arresting the legs.

58. The convertible baby safety car seat assembly according to Embodiment 56, wherein the leg manipulation prevention arrangement is configured to prevent, in the locking state, the manipulation of the legs towards the storage state by arresting the leg manipulation mechanism.

59. The convertible baby safety car seat assembly according to Embodiment 58, wherein the leg manipulation prevention arrangement is configured to arrest the leg manipulation mechanism when the legs are in their operational state.

60. The convertible baby safety car seat assembly according to Embodiment 58 or 59, wherein the leg manipulation prevention arrangement comprises a leg trigger member and a leg arresting member, wherein the leg trigger member is configured to operate the leg arresting member upon being triggered by the upper seat, when in the upright state thereof; and wherein the leg arresting member is operable by said leg trigger member to be manipulated, upon operation thereof, from an arresting state to a releasing state thereof, in which the leg manipulation mechanism is released from said arresting.

61. The convertible baby safety car seat assembly according to Embodiment 60, wherein the upper seat is configured to trigger the leg trigger member only when the upper seat is in its upright state.

62. The convertible baby safety car seat assembly according to Embodiment 61, wherein the leg trigger member is connected to the upper seat and constituted as a portion of the seat manipulation mechanism, such that upon manipulation of the upper seat to the upright state the leg trigger member is further configured to maintain the upper seat in the upright state.

63. The convertible baby safety car seat assembly according to Embodiment 55, wherein the leg manipulation prevention arrangement is constituted by the upper seat in its extended state.

64. The convertible baby safety car seat assembly according to Embodiment 63, wherein the leg manipulation prevention arrangement is constituted by the backrest portion of the upper seat.

65. The convertible baby safety car seat assembly according to any one of Embodiments 55 to 64, wherein the backrest portion comprises an intermediate portion, to which the feet portion is connected.

66. The convertible baby safety car seat assembly according to Embodiment 65, wherein the intermediate portion constitutes an upper seat lowermost portion and wherein the upper seat lowermost portion is movable about a vertical axis upon manipulation of the upper seat between the upright state and the extended state.

67. The convertible baby safety car seat assembly according to Embodiment 65 or 66, wherein at least the intermediate portion of the backrest portion is formed from a flexible material.

68. The convertible baby safety car seat assembly according to any one of Embodiments 55 to 67, further comprising a seat manipulation prevention arrangement configured to prevent manipulation of the upper seat from the upright state to the extended state at least when the legs are in the storage state.

69. The convertible baby safety car seat assembly according to Embodiment 68, wherein the seat manipulation prevention arrangement is configured to change states between a locking state, in which the seat manipulation prevention arrangement prevents the manipulation of the upper seat towards the extended state, and an unlocking state, in which the seat manipulation prevention arrangement enables manipulation of the upper seat between the upright state and the extended state.

70. The convertible baby safety car seat assembly according to Embodiment 68 or 69, wherein the seat manipulation prevention arrangement is configured to prevent, in the locking state, the manipulation of the upper seat towards the extended state by arresting the upper seat.

71. The convertible baby safety car seat assembly according to Embodiment 68 or 69, wherein the seat manipulation prevention arrangement is configured to prevent, in the locking state, the manipulation of the upper seat towards the extended state by arresting the seat manipulation mechanism.

72. The convertible baby safety car seat assembly according to Embodiment 71, wherein the seat manipulation prevention arrangement is configured to arrest the seat manipulation mechanism only when the upper seat is in its upright state.

73. The convertible baby safety car seat assembly according to Embodiment 71 or 72, wherein the seat manipulation prevention arrangement comprises a seat trigger member and a seat arresting member, wherein the seat trigger member is configured to operate the seat arresting member upon being triggered by the legs, when the legs are in the operational state thereof; and wherein the seat arresting member is operable by said seat trigger member to be manipulated, upon operation thereof, from an arresting state to a releasing state thereof, in which the seat manipulation mechanism is released from said arresting.

74. The convertible baby safety car seat assembly according to Embodiment 73, wherein the legs are configured to trigger the seat trigger member only when the legs are in their operational state.

75. The convertible baby safety car seat assembly according Embodiment 73 or 74, further comprising a lower support having two leg attachment areas at two lateral sides of the lower support, wherein the seat trigger member is disposed on the lower support and adjacent to at least one of the leg attachment areas, wherein at least one of the legs comprises a frontal protrusion positioned about a proximal end of at least one of the legs, and wherein the frontal protrusion is configured to trigger the seat trigger member when the legs are in their operational state.

76. The convertible baby safety car seat assembly according to Embodiment 68, wherein the seat manipulation prevention arrangement is constituted by the legs in their storage state.

77. The convertible baby safety car seat assembly according to Embodiment 76, wherein the seat manipulation prevention arrangement is constituted by the distal ends of the legs.

78. The convertible baby safety car seat assembly according to any one of embodiments 68 to 77, wherein the backrest portion of the upper seat, in the upright state, is positioned at a first rear angle to a base plane, and in the extended state, is positioned at a second rear angle smaller than the first rear angle, and wherein the backrest is manipulable rearwardly from the upright state to the extended state.

79. The convertible baby safety car seat assembly according to Embodiment 78 when dependent on any one of Embodiments 70 or 71, wherein the distal ends of the legs are configured to be firmly positioned, in the storage state of the legs, in contact with a rear surface of the backrest portion of the upper seat so as to block the rearward manipulation of the backrest portion, thereby preventing manipulation of the upper seat from the upright state to the extended state at least when the legs are in the storage state.

80. A convertible baby safety car seat assembly, comprising:

a lower support having front and rear portions and a reference plane horizontally passing through a lowermost area of the lower support;

an upper seat articulably connected to said lower support and having a backrest portion associated with the rear portion of the lower support and a feet portion associated with the front portion of the lower support;

legs having wheels, the legs being manipulable between a storage state, in which at least the wheels are located above the reference plane and the assembly is mountable in a car at a position suitable for securing an infant therein, and an operational state, in which at least the wheels are located below the reference plane so as to enable the seat assembly to be rolled by means of said wheels;

a leg manipulation mechanism operable to manipulate the legs between the storage state and the operational state;

a seat manipulation mechanism operable to manipulate the upper seat between an upright state, in which the backrest portion and the feet portion form a first angle therebetween, and an extended state, in which the backrest portion and the feet portion form a second angle therebetween larger than the first angle;

a seat manipulation actuator configured to enable a user to manipulate the seat manipulation mechanism and a leg manipulation actuator configured to enable a user to manipulate the leg manipulation mechanism, the seat and the leg manipulation actuators being positioned one at a location associated with the front portion of the lower support and the other one at a location rearwardly spaced from the front portion of the lower support.

81. A convertible baby safety car seat assembly according to Embodiment 80, wherein the seat manipulation actuator is positioned at the front portion of the lower support.

82. The convertible baby safety car seat assembly according to Embodiment 80 or 81, wherein the storage state of the legs is combinable only with the upright state of the upper seat, defining a first mode of the seat assembly; the extended state of the upper seat is combinable only with the operational state of the legs, defining a second mode of the seat assembly; and the operational state of the legs and the upright state of the upper seat are also combinable at least with each other, defining a third mode of the seat assembly.

83. The convertible baby safety car seat assembly according to Embodiment 80, 81 or 82, wherein the seat assembly can be brought into its first and second modes only from its third mode.

84. The convertible baby safety car seat assembly according to Embodiment 82 or 83, configured so that the manipulation of the legs in the second mode of the seat assembly is prevented at least indirectly by the upper seat being in the extended state.

85. The convertible baby safety car seat assembly according to any one of Embodiments 80 to 84, further configured so that the manipulation of the upper seat in the first mode of the seat assembly is prevented at least indirectly by the legs being in the storage state.

86. The convertible baby safety car seat assembly according to any one of Embodiments 80 to 85, further comprising a leg manipulation prevention arrangement configured to prevent manipulation of the legs from the operational state to the storage state at least when the upper seat is in the extended state.

87. The convertible baby safety car seat assembly according to any one of Embodiments 80 to 86, further comprising a seat manipulation prevention arrangement configured to prevent manipulation of the upper seat from the upright state to the extended state at least when the legs are in the storage state.

88. The convertible baby safety car seat assembly according to Embodiment 87, wherein the seat manipulation prevention arrangement is configured to change states between a locking state, in which the seat manipulation prevention arrangement prevents the manipulation of the upper seat towards the extended state, and an unlocking state, in which the seat manipulation prevention arrangement enables manipulation of the upper seat between the upright state and the extended state.

89. The convertible baby safety car seat assembly according to Embodiment 88, wherein the seat manipulation prevention arrangement is configured to prevent, in the locking state, the manipulation of the upper seat towards the extended state by arresting the upper seat.

90. The convertible baby safety car seat assembly according to Embodiment 88 or 89, wherein the seat manipulation prevention arrangement is configured to prevent, in the locking state, the manipulation of the upper seat towards the extended state by arresting the seat manipulation mechanism.

91. The convertible baby safety car seat assembly according to Embodiment 89 or 90, wherein the seat manipulation prevention arrangement is configured to arrest the seat manipulation mechanism only when the upper seat is in its upright state.

92. The convertible baby safety car seat assembly according to any one of Embodiments 87 to 91, wherein the seat manipulation prevention arrangement comprises the legs in their storage state.

93. The convertible baby safety car seat assembly according to Embodiment 92, wherein the seat manipulation prevention arrangement comprises the distal ends of the legs.

94. The convertible baby safety car seat assembly according to any one of embodiments 80 to 93, wherein the backrest portion of the upper seat is manipulable rearwardly from the upright state to the extended state.

95. The convertible baby safety car seat assembly according to Embodiment 94, wherein distal ends of the legs are configured to be firmly positioned, in the storage state of the legs, in contact with a rear surface of the backrest portion of the upper seat so as to block the rearward manipulation of the backrest portion, thereby preventing manipulation of the upper seat from the upright state to the extended state at least when the legs are in the storage state.

96. The convertible baby safety car seat assembly according to Embodiment 86 and any one of Embodiments 87 to 95 dependent directly or indirectly on Embodiment 86, wherein the leg manipulation prevention arrangement is configured to change its state between a locking state, in which the leg manipulation prevention arrangement prevents the manipulation of the legs towards the storage state, and an unlocking state, in which the leg manipulation prevention arrangement enables manipulation of the legs between the storage state and the operational state.

97. The convertible baby safety car seat assembly according to Embodiment 96, wherein the leg manipulation prevention arrangement is configured to prevent, in the locking state, the manipulation of the legs towards the storage state by arresting the legs.

98. The convertible baby safety car seat assembly according to Embodiment 96 or 97, wherein the leg manipulation prevention arrangement is configured to prevent, in the locking state, the manipulation of the legs towards the storage state by arresting the leg manipulation mechanism.

99. The convertible baby safety car seat assembly according to Embodiment 98, wherein the leg manipulation prevention arrangement is configured to arrest the leg manipulation mechanism when the legs are in their operational state.

100. The convertible baby safety car seat assembly according to Embodiment 86 or any one of Embodiments 87 to 99, when dependent on Embodiment 86 directly or indirectly, wherein the leg manipulation prevention arrangement is constituted by the upper seat in its extended state.

101. The convertible baby safety car seat assembly according to Embodiment 100, wherein the leg manipulation prevention arrangement comprises the backrest portion of the upper seat.

102. A baby seat comprising at least in use:

a shell made of a plastic material and having an external side facing an exterior and an internal side at which a fabric cover of the seat can be attached to the shell, the shell having a back wall and two sidewalls, each having corresponding inner and outer surfaces merging at respective upper edges, the upper edges of the back wall and sidewalls merging continuously and constituting a shell upper edge, the fabric cover for covering at least the internal side of the shell when the fabric cover is detachably connected thereto;

a canopy; and a zipper arrangement for detachably connecting the cover and the canopy to the shell adjacent the shell upper edge, the zipper arrangement comprising a canopy zipper and a cover zipper, each of the zippers being of a separating type and comprising a zipper box and a zipper pin and having a shell zipper half with one of the zipper box and the zipper pin, sewn to the shell adjacent to the shell upper edge, at the outer surfaces of the back wall and the sidewalls at least along portions thereof adjacent to the back wall, and a matching zipper half with the other of the zipper box and the zipper pin, the matching zipper half of the first zipper being sewn to said cover and the matching zipper half of the second zipper being sewn to said canopy, wherein optionally, the zipper box is located on the shell zipper half and the zipper pin is located on the matching zipper half.

103. The baby seat according to embodiment 102, wherein the shell zipper half of each of the zippers has a base portion at which the shell zipper half is sewn to the shell and a flapping portion with zipper teeth, and both shell zipper halves of the two zippers are sewn to the shell at the base portions of the shell zipper halves so that the flapping portions of the shell zipper halves can be manipulated separately and independently from each other when engaging the corresponding matching halves of the zippers.

104. The baby seat of embodiment 102 or 103, wherein the shell zipper half of the cover zipper is spaced from the upper edge of the shell to a first extent and the shell zipper half of the canopy zipper is spaced from the upper edge of the shell to a second extent that is less than the first extent.

105. The baby seat of any one of embodiments 102 to 104, wherein the shell zipper half of the cover zipper extends along at least a portion of the upper edge of the shell, and the shell zipper half of the canopy zipper extends along a portion of the shell zipper half of the cover zipper.

106. The baby seat of any one of embodiments 102 to 105, wherein when both the cover and the canopy are zipped to the shell, the canopy zipper overlies the cover zipper along the length of the canopy zipper.

107. The baby seat of any one of embodiments 102 to 106, wherein the zipper boxes of the shell halves of the two zippers are located at or adjacent different side walls of the shell, enabling the cover zipper to be fastened in a direction opposite to that of the canopy zipper.

108. The baby seat of any one of embodiments 102 to 107, wherein both of the shell zipper halves are sewn to the shell together by at least one common sewing seam.

109. The baby seat of any one of embodiments 102 to 108, wherein the shell upper edge comprises a stepped, zipper-receiving recess having a first wall at which the shell halves of the zippers are sewn to the shell and a second wall oriented transversely to the first wall and having a height defining a depth of the recess.

110. The baby seat of embodiment 108 or 109 when dependent directly or indirectly on embodiment 111, wherein the zipper arrangement further comprises a fabric binding accommodating the base portions of the shell halves and sewn to the shell therewith by the at least one common sewing seam.

111. The baby seat of embodiment 110, when dependent on embodiment 109, wherein the binding with the base portions of the shell zipper halves has a thickness corresponding to the depth of the zipper-receiving recess.

112. The baby seat of embodiment 108 or any one of embodiments 109 to 111, when dependent on embodiment 108 directly or indirectly, when embodiment 108 depends on embodiment 103 directly or indirectly, wherein the base portions of the shell zipper halves are connected to each other by a pre-formed connection in addition to the at least one common sewing seam, said pre-formed connection can optionally be formed by welding.

113. The baby seat of any one of embodiments 102 to 112, wherein the cover zipper is longer than the canopy zipper, the cover zipper extending further down along each of the two sidewalls of the shell relative to the canopy zipper.

114. The baby seat of any one of embodiments 102 to 113, wherein when the canopy is fastened, only the canopy zipper can be unfastened, and the cover zipper remains at least partially inaccessible.

115. A convertible baby safety car seat assembly suitable for securing an infant therein, and having a first, storage mode, in which the assembly is suitable for being positioned within a car, and a second, operational mode in which the assembly is rollable along an external supporting surface, the assembly when in the storage mode and positioned on an external supporting surface being rockable thereon between a neutral position and at least one of front and rear inclined positions, the assembly comprising:

one or more lowermost areas that are operable to contact the external supporting surface in the neutral position;

at least one of front and rear areas that is operable to contact the external supporting surface when in said corresponding at least one of front and rear inclined positions;

a horizontal reference plane including the one or more lowermost areas of the assembly when in the neutral position and imaginarily representing said external supporting surface;

a lower support having front and rear portions and a seat lowermost area closest to the horizontal reference plane when the assembly is in the neutral position;

an upper seat connected to said lower support and having a backrest portion associated with the rear portion of the lower support and a feet portion associated with the front portion of the lower support;

legs connected to the lower support at their proximal ends and having distal ends with wheels fixed thereto at least in the operational mode, the legs being manipulable between a storage state associated at least with the storage mode of the assembly, in which at least a part of each leg with the wheel is located above the reference plane, and an operational state associated at least with the operational mode of the assembly, in which at least said part of each leg with the wheel is located below the reference plane so as to enable the seat assembly to be rolled by means of said wheels; the legs constituting a pair of rear legs and a pair of front legs;

the legs of at least one of the pairs having a curved shape such that, when in the storage state, the legs of said at least one pair have a first area that is positioned above the reference plane in the neutral position, at least one second area constituting said at least one of front and rear areas, and at least one third area spaced from the first and the second area, at least the second area having a rocking-participating portion made of a material other than that of the at least one third area, said material being such as to improve at least one rocking quality compared with that which said rocking-participating portion would have if it were made of the material from which the third area is made.

116. The assembly according to Embodiment 115, wherein said rocking quality is at least one of the following:

a higher friction ability such that the rocking-participating portion constitutes a friction increasing portion; or softness such that the rocking participating portion constitutes a soft-contact portion.

117. The assembly according to embodiment 115 or 116, wherein the one or more lowermost areas and said at least one second area constitute a continuous curved shape at least as seen in the side view of the assembly.

118. The assembly according to any one of embodiments 115 to 117, wherein said at least one second area, in the storage state of the corresponding legs, constitutes at least one of:

the rear area of said at least one of front and rear areas, and extends further rearward from the rear portion of the lower support, and the front area of said at least one of front and rear areas, and extends further frontward from the front portion of the lower support.

119. The assembly according to any one of embodiments 115 to 118, wherein at least one of the lower support and the legs comprises at least one other area spaced from the one or more lowermost areas and the at least one second area, wherein at least one of the one or more lowermost areas comprises a rocking-participating portion made of a material other than that of the at least one other area, said material being such as to improve at least one rocking quality compared with that which said rocking-participating portion would have if it were made of the material from which the other area is made.

120. The assembly according to embodiment 119, wherein the rocking-participating portion of the second area and the rocking-participating portion of the at least one of the one or more lowermost areas are made of same material.

121. The assembly according to embodiment 119 or 120, wherein said at least one other area constitutes a majority of area of the at least one of the lower support and the legs.

122. The assembly according to any one of embodiments 115 to 121, wherein the one or more lowermost areas of the assembly comprise the seat lowermost area.

123. The assembly according to embodiment 122, wherein the lower support comprises a curved bottom extending between the front and rear portions of the lower support and including the seat lowermost area, wherein said curved bottom at least partially participates in the ability of the assembly when in the storage mode and positioned on an external supporting surface to be rockable thereon between said neutral position and said at least one of front and rear inclined positions.

124. The assembly according to any one of embodiments 115 to 123, wherein the one or more lowermost areas of the assembly comprise the first area of said at least one of the pairs of legs.

125. The assembly according to embodiment 124, the first area having a rocking-participating portion made of a material other than that of the at least one third area, said material being such as to improve at least one rocking quality compared with that which said rocking-participating portion would have if it were made of the material from which the third area is made.

126. The assembly according to embodiment 125, wherein the rocking-participating portion of the second area and the rocking-participating portion of the first area are made of same material.

127. The assembly according to any one of embodiments 124 to 126, wherein the first area at least partially coincides with one of said at least one second areas at least in a side view of the assembly.

128. The assembly according to any one of embodiments 115 to 127, wherein the wheels of the legs of said at least one pair of legs, when connected to the legs, constitute stoppers for restricting the rocking of the assembly in said at least one of front and rear inclined positions.

129. The assembly according to any one of embodiments 115 to 127, the wheels of the legs of said at least one pair of legs being detachably connected thereto.

130. The assembly according to embodiment 129, wherein when the wheels are detached from the legs, a range of the rocking of the assembly is increased as compared to when the wheels are connected to the legs, said range being defined by a total area of the assembly that coincides with the horizontal reference plane during the rocking of the assembly.

131. The assembly according to any one of embodiments 115 to 130, wherein said at least one pair of legs is the front pair of legs.

132. The assembly according to embodiment 131, said at least one second area constituting the rear area that coincides with the reference plane in the corresponding rear inclined position of the assembly.

133. The assembly according to embodiment 116 or any one of embodiments 117 to 132 when dependent on embodiment 116 directly or indirectly, wherein the material that said friction-increasing portion is made of is softer than that of the at least one third area, said rocking participating portion thereby constituting the soft-contact portion.

134. The assembly according to embodiment 133, wherein said soft-contact portion provides a dampening to the rocking of the assembly.

135. The assembly according to any one of embodiments 115 to 134, wherein the material that said rocking-participating portion is made of prevents the legs of said at least one pair against mechanical damages.

136. The assembly according to any one of embodiments 115 to 135, wherein the at least one third area constitutes a majority of the legs of said at least one pair.

137. The assembly according to any one of embodiments 115 to 136, wherein each leg having the rocking-participating portion is made of a first material and said rocking participating portion is made of a second material other than the first material.

138. The assembly according to embodiment 137, wherein said rocking participating portion is in the form of a liner attached to the corresponding leg at a surface thereof facing the reference plane.

139. A convertible baby safety car seat assembly comprising:

a lower support having front and rear portions and a reference plane horizontally passing through a lowermost area of the lower support;

an upper seat connected to said lower support and having a backrest portion associated with the rear portion of the lower support and a feet portion associated with the front portion of the lower support;

legs having wheels, the legs being manipulable between a storage state, in which at least the wheels are located above the reference plane and the assembly is suitable for being positioned in a car or on a supporting surface at a position suitable for securing an infant therein, and an operational state, in which at least the wheels are located below the reference plane so as to enable the seat assembly to be rolled by means of said wheels; the legs constituting a pair of rear legs associated with rear wheels, and a pair of front legs associated with front wheels, the front wheels protruding sidewards from the lower support in the storage state thereof, to a greater extent than the rear wheels at least in the rear view of the assembly; said front legs being pivotable for being manipulated from the operational state to the storage state such that in the storage state said front wheels are positioned closer to the backrest portion than the feet portion;

wherein at least the front wheels are connected to the front legs by a quick-release mechanism.

140. The assembly according to embodiment 139, wherein the front wheels are removable from the front legs in a wheel-removal direction extending sidewards with respect to the lower support.

141. The assembly according to Embodiment 140, wherein each of said front wheels comprises a leg-connection element extending along said wheel-removal direction when the wheel is connected to the corresponding front leg, and each of the front legs comprises a wheel-connection element extending along said wheel-removal direction.

142. The assembly according to embodiment 141, said leg-connection element and said wheel-connection element being detachably connectable to each other allowing rotation of the wheel together with the leg-connection element with respect to the wheel-connection element about a wheel-rotation axis parallel to the wheel-removal direction.

143. The assembly according to Embodiment 142, said leg-connection element and said wheel-connection element at least partially constituting the quick release mechanism.

144. The assembly according to embodiment 143, wherein the quick-release mechanism further comprises a release actuator for actuating a release of the leg-connection element from the wheel-connection element.

145. The assembly according to embodiment 144, wherein the release actuator is positioned at one of the front wheel and the corresponding front leg.

146. The assembly according to any one of embodiments 139 to 145, wherein each of the front wheels comprises a rolling area configured to come into contact with a supporting surface when the assembly is rolled thereon by means of the wheels, and a remaining area configured to be free of contact with the supporting surface when the assembly is rolled thereon, each of said front wheels comprising a wheel holding portion positioned at said remaining area suitable for being held by a user at least for removing the wheel from the corresponding front leg.
147. The assembly according to any one of embodiments 139 to 146, wherein the rear wheels are connected to the rear legs by a quick-release mechanism.
148. A baby safety car seat assembly comprising:
   a seat having a backrest portion and a feet portion;
   a handle connected to the seat at a handle attachment area of the seat by a pivotable attachment which enables pivoting of the handle between a plurality of different positions, said handle having a seat-facing area facing the handle attachment area and an opposite exterior-facing area; and
   a side protection module for absorbing at least a part of the energy of an impact thereupon, the side protection module being selectively mountable onto the handle at the exterior-facing area.
149. The assembly according to embodiment 148, wherein the side protection module is configured to be pivotable together with the handle, when mounted thereto.
150. The assembly according to embodiment 148 or 149, wherein the side protection module has an elongated shape extending along a longitudinal axis and comprises a first handle engaging portion and a second handle engaging portion spaced from each other at least partially along the longitudinal axis.
151. The assembly according to embodiment 150, wherein the exterior-facing area of the handle comprises a first module engaging portion for engaging the first handle engaging portion and a second module engaging portion for engaging the second handle engaging portion when the side protection module is mounted to the handle.
152. The assembly according to embodiment 151, wherein at least one of the first and second handle engaging portions comprises a handle connection element and a corresponding at least one of the first and second module engaging portions comprises a module connection element, said handle connection element and said module connection element being detachably connectable to each other.
153. The assembly according to embodiment 152, said handle connection element and said module connection element being detachably connectable to each other by a quick release mechanism.
154. The assembly according to embodiment 153, said quick-release mechanism being a magnetic-connection mechanism.
155. The assembly according to any one of embodiments 151 to 154, wherein at least one of the first and second handle engaging portions comprises a first part of an orientation fixing mechanism and a corresponding at least one of the first and second module engaging portions comprises a second part of the orientation fixing mechanism, wherein said first and second parts of the orientation fixing mechanism are configured for engaging each other when the side protection module is mounted to the handle to fix the orientation of the side protection module with respect to the handle.
156. The assembly according to embodiment 155, wherein the orientation fixing mechanism is configured for maintaining the orientation of the side protection module with respect to the handle during said pivoting of the handle.
157. The assembly according to any one of embodiments 151 to 156, wherein the side protection module comprises at least one third handle engaging portion positioned offset the longitudinal axis, and the exterior-facing area of the handle comprises at least one third module engaging portion configured for engaging the at least one third handle engaging portion when the side protection module is mounted to the handle.
158. The assembly according to embodiment 157, wherein the at least one third handle engaging portion comprises a handle connection element and the at least one module engaging portion comprises a module connection element, said handle connection element and said module connection element being detachably connectable to each other.
159. The assembly according to embodiment 158, said handle connection element and said module connection element being detachably connectable to each other by a quick release mechanism.
160. The assembly according to embodiment 159, said quick-release mechanism being a magnetic-connection mechanism.
161. The assembly according to any one of embodiments 148 to 160, further comprising a cable-connection arrangement for connecting the side-protection module to at least one of the handle and the seat when the side protection module is mounted to the handle.
162. The assembly according to embodiment 161, wherein the cable-connection arrangement comprises a cable having a first end connectable to the side-protection module and a second end connectable to the at least one of the handle and the seat.
163. The assembly according to any one of embodiments 148 to 162, wherein the side protection module comprises a first module part selectively mountable to the handle and a second module part selectively mountable to the first module part.
164. The assembly according to embodiment 163, wherein the side protection module comprises a locking arrangement for selectively locking the first and second module parts with each other when the second module part is mounted to the first module part.
165. The assembly according to any one of embodiments 148 to 164, further comprising legs having distal ends with wheels and opposite proximal ends connected to the seat at leg attachment areas thereof at least partially overlapping with the handle attachment areas at least in a side view of the assembly.
166. The assembly according to embodiment 165, wherein the seat has a reference plane horizontally passing through a lowermost area thereof, said legs being manipulable between a storage state, in which at least the distal ends are located above the reference plane and the assembly is suitable for being positioned within a car with an infant secured therein, and an operational state, in which at least the distal ends are located below the reference plane so as to enable the seat assembly to be rolled by means of wheels connected at the distal ends, said legs being pivotable rearwardly towards the backrest portion of the seat for being manipulated from the operational state to the storage state such that in the storage state said distal ends are positioned closer to the backrest portion than the feet portion; the legs constituting a pair of rear legs associated with rear wheels at least in the operational state, and a pair of front legs associated with front wheels at least in the operational state.

167. The assembly according to embodiment 166, wherein at least one wheel of said front and rear wheels constitutes an additional side protection module when connected to the corresponding leg in the storage state thereof.

168. The assembly according to embodiment 167, wherein in the storage state of the legs, said at least one wheel protrudes sidewards from the seat, to a greater extent than at least another wheel on the same side of the seat as the at least one wheel, at least in the rear view of the assembly.

169. The assembly according to embodiment 168, wherein said at least one wheel is a front wheel and said at least another wheel is a rear wheel.

170. A convertible baby safety car seat assembly comprising:

a lower support having front and rear portions and a reference plane horizontally passing through a lowermost area of the lower support;

an upper seat connected to said lower support and having a backrest portion associated with the rear portion of the lower support and a feet portion associated with the front portion of the lower support; the upper seat being manipulable between an upright state, in which the backrest and feet portions form a first angle therebetween, and an extended state, in which the backrest and feet portions form a second angle therebetween greater than the first angle;

legs having wheels, the legs being manipulable between a storage state, in which at least the wheels are located above the reference plane; and an operational state, in which at least the wheels are located below the reference plane so as to enable the seat assembly to be rolled by means of said wheels;

the lower support comprises a rear articulation portion at the rear portion of the lower support to which the backrest portion is pivotally articulated, and a front articulation portion at the front of the lower support to which the feet portion of the upper seat is configured to be slidably articulated, the change of the state of the upper seat between the upright state and the extended state being achievable by the pivotal articulation of the backrest portion accompanied by the sliding articulation of the feet portion.

171. The assembly according to embodiment 170, wherein the backrest portion is pivotally articulated about a pivot axis which is perpendicular to a longitudinal axis of the lower support, and the feet portion is slidably articulated along the longitudinal axis of the lower support.

172. The assembly according to embodiment 170 or 171, wherein the backrest portion and the feet portion of the upper are connected to each other so that the manipulation of one of them induces manipulation to the other one.

173. The assembly according to any one of embodiments 170 to 172, wherein the upper seat further comprises an intermediate portion fixedly connecting the backrest portion and the feet portion to each other.

174. The convertible baby safety car seat assembly according to embodiment 173, wherein the intermediate portion constitutes an upper seat lowermost portion and wherein the upper seat lowermost portion is movable about a vertical axis upon manipulation of the upper seat between the upright state and the extended state.

175. The convertible baby safety car seat assembly according to embodiment 173 or 174, wherein at least the intermediate portion of the backrest portion is formed from a flexible material.

176. The assembly according to any one of embodiments 173 to 175, wherein the intermediate portion is concave and is formed of flexible material so that it can be flexed upon manipulation of the upper seat to the extended state.

177. The assembly according to any one of embodiments 170 to 176, further comprising a seat manipulation mechanism operable to manipulate the upper seat between the upright and the extended states; and a seat manipulation prevention arrangement operable to prevent manipulation of the upper seat from the upright state to the extended state.

178. The convertible baby safety car seat assembly according to embodiment 177, wherein the seat manipulation prevention arrangement is configured to change states between a locking state, in which the seat manipulation prevention arrangement prevents the manipulation of the upper seat towards the extended state, and an unlocking state, in which the seat manipulation prevention arrangement enables manipulation of the upper seat between the upright state and the extended state.

179. The convertible baby safety car seat assembly according to embodiment 177 or 178, wherein the seat manipulation prevention arrangement is operable to prevent, in the locking state, the manipulation of the upper seat towards the extended state by arresting the upper seat.

180. The convertible baby safety car seat assembly according to embodiment 177 or 178, wherein the seat manipulation prevention arrangement is operable to prevent, in the locking state, the manipulation of the upper seat towards the extended state by arresting the seat manipulation mechanism.

181. The convertible baby safety car seat assembly according to embodiment 180, wherein the seat manipulation prevention arrangement is operable to arrest the seat manipulation mechanism only when the upper seat is in its upright state.

182. The convertible baby safety car seat assembly according to any one of embodiments 177 to 181, wherein the seat manipulation prevention arrangement is constituted by the legs in their storage state.

183. The convertible baby safety car seat assembly according to embodiment 182, wherein the seat manipulation prevention arrangement is constituted by the distal ends of the legs.

184. The convertible baby safety car seat assembly according to embodiment 170 or any one of embodiments 171 to 183, when dependent on embodiment 170 directly or indirectly, wherein the rear articulation portion is in the form of articulation recesses positioned in sidewalls of the lower support, configured to freely receive therein one or more articulable elements of the backrest portion so as to allow pivoting of these elements about the pivot axis.

185. The convertible baby safety car seat assembly according to embodiment 184, wherein the one or more articulable elements of the backrest portion comprise a rear pivot axle which is unitarily formed or assembled with the backrest portion.
186. The convertible baby safety car seat assembly according to embodiment 170 or any one of embodiments 171 when dependent on embodiment 170 directly or indirectly, wherein the front articulation portion is in the form of elongated articulation slots extending parallel to the longitudinal axis and configured to slidably receive therein at least one corresponding articulable element of the feet portion.
187. The convertible baby safety car seat assembly according to embodiment 186, wherein the articulable element of the feet portion comprises a sliding bar which is unitarily formed or assembled with the feet portion.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIGS. 1A, 1B, 1C and 1D illustrate a side view of a baby safety car seat assembly according to one example of the presently disclosed subject matter in a respective car seat mounting or storage mode, extended stroller mode, upright stroller mode, and rollable carrier mode, which the assembly can be used in;

DETAILED DESCRIPTION OF EMBODIMENTS

Figure 1A:
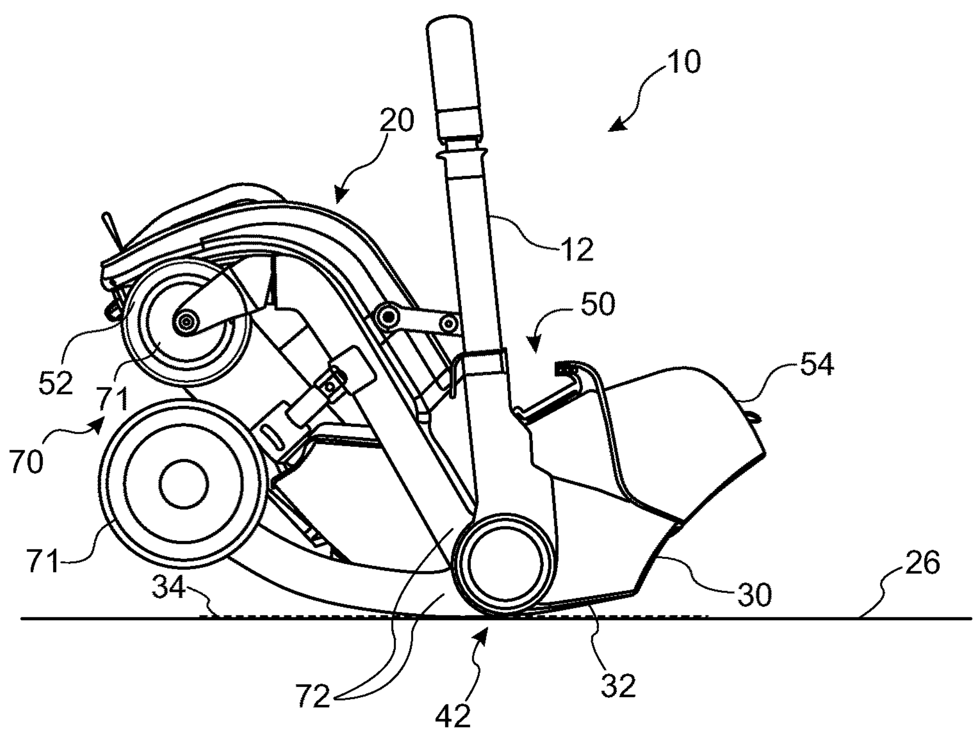

A convertible baby safety car seat assembly, according to one example of the presently disclosed subject matter can be any seat assembly configured for use in modes of operation as illustrated in FIGS. 1A-1D. These modes of operation are a car seat mounting mode shown in FIG. 1A, which hereinafter will be referred to as a storage mode 20; an extended stroller mode shown in FIG. 1B, which hereafter will be referred to as an extended operational mode 24; an upright stroller mode shown in FIG. 1C and a rollable carrier mode shown in FIG. 1D, which both hereinafter will be referred to as an upright operational mode 22.

In the present example, the convertible baby safety car seat assembly shown in FIGS. 1A to 1D, is designated as 10 and it comprises a lower support 30, an upper seat 50 articulated to and mounted on the lower support 30, legs 70 having distal ends 71 associated with wheels and proximal ends 72 pivotally articulated to the lower support 30, and a handlebar 12 configured to be pivoted between a plurality of positions as shown in FIGS. 1A to 1D.

The handlebar can have an adjustable length, allowing the handlebar to take a number of states in accordance with the mode, in which the safety car seat assembly is to be used.

The handlebar 12 of the present example can take at least a carrier state (FIG. 1D), in which it is oriented generally vertically (FIG. 1D), a stroller state (FIGS. 1B and 1C), in which it extends frontward and can have a length greater than in the carrier state, and a storage state, in which is oriented rearwardly (FIG. 1A).

The lower support 30 comprises a seat lowermost area 32 configured to contact a supporting surface 26, which can be e.g. a vehicle seat or a base securely mounted thereon or the ground, onto which the seat assembly is configured to be used as a safety seat. The supporting surface 26 being suitable for mounting/positioning the seat assembly 10 thereon when in the storage mode 20. The seat lowermost area 32 defines an imaginary horizontal base plane 34 and further comprises two leg attachment areas 42 to which proximal ends 72 of the legs are pivotally articulated between the following two states:

(a) a storage state (FIG. 1A), in which the distal ends of the legs are positioned on or above the horizontal base plane 34 such that the seat lowermost area 32 of the seat assembly 10 can contact the supporting surface 26, to which the seat assembly is to be mounted or on which it is to be positioned; and (b) an operational state (FIGS. 1B, 1C and 1D), in which the seat assembly can be rolled by the wheels, which are positioned below the horizontal base plane 34, on the supporting surface 26.

The upper seat 50 comprises a rear backrest portion 52 and a front feet portion 54 which is spaced to a smaller distance from the horizontal base plane 34 than the backrest portion 52. The backrest portion 52 is configured to support the head and back of an infant seated on the seat assembly 10 and to better support the head it can be provided with a headrest assembly 53 configured to be adjusted between a default position and a lifted position, as known in the art.

The upper seat 50 is manipulable between the following two states:

(a) an upright state (FIGS. 1A, 1C and 1D) enabling a seated position for an infant secured to the upper seat 50, in which the backrest portion 52 has a first orientation and forms a first angle $\alpha$ with the feet portion 54; and (b) an extended state (FIG. 1B) enabling a lie-flat position for an infant secured to the upper seat 50, in which the backrest portion 52 has a second orientation closer to a horizontal orientation than the first orientation and forms with the feet portion 54 a second angle ß greater than the first angle $\alpha$.

Specifically, the first angle $\alpha$ can be about 90-130 degrees and the second angle $\beta$ can be about 140-170 degrees.

In general, the seat assembly can be configured to enable a plurality of combinations between the above states of the upper seat and the legs, while preventing at least one such combination. For example, such prevented combination can be that between the storage state of the legs and the extended state of the upper seat, by virtue of which the possibility in which the seat assembly will be inserted into a car with a baby lying thereon is excluded.

Figure 1B:
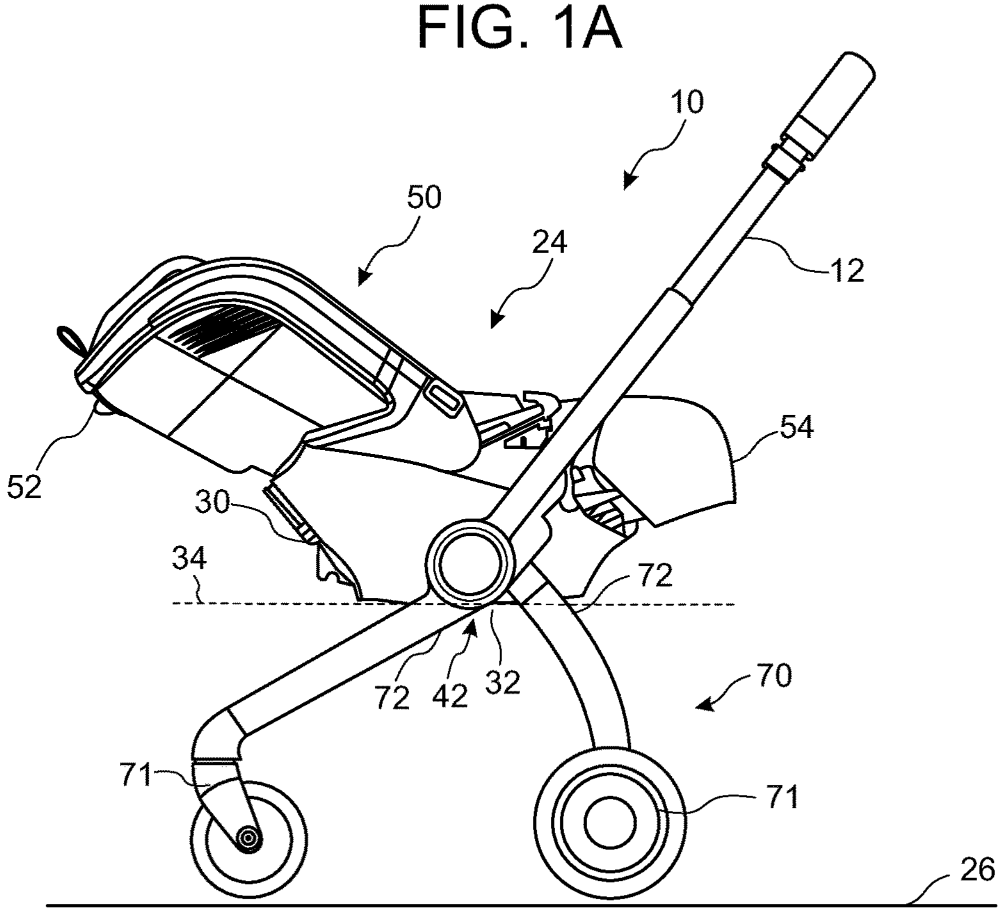
Figure 1C:
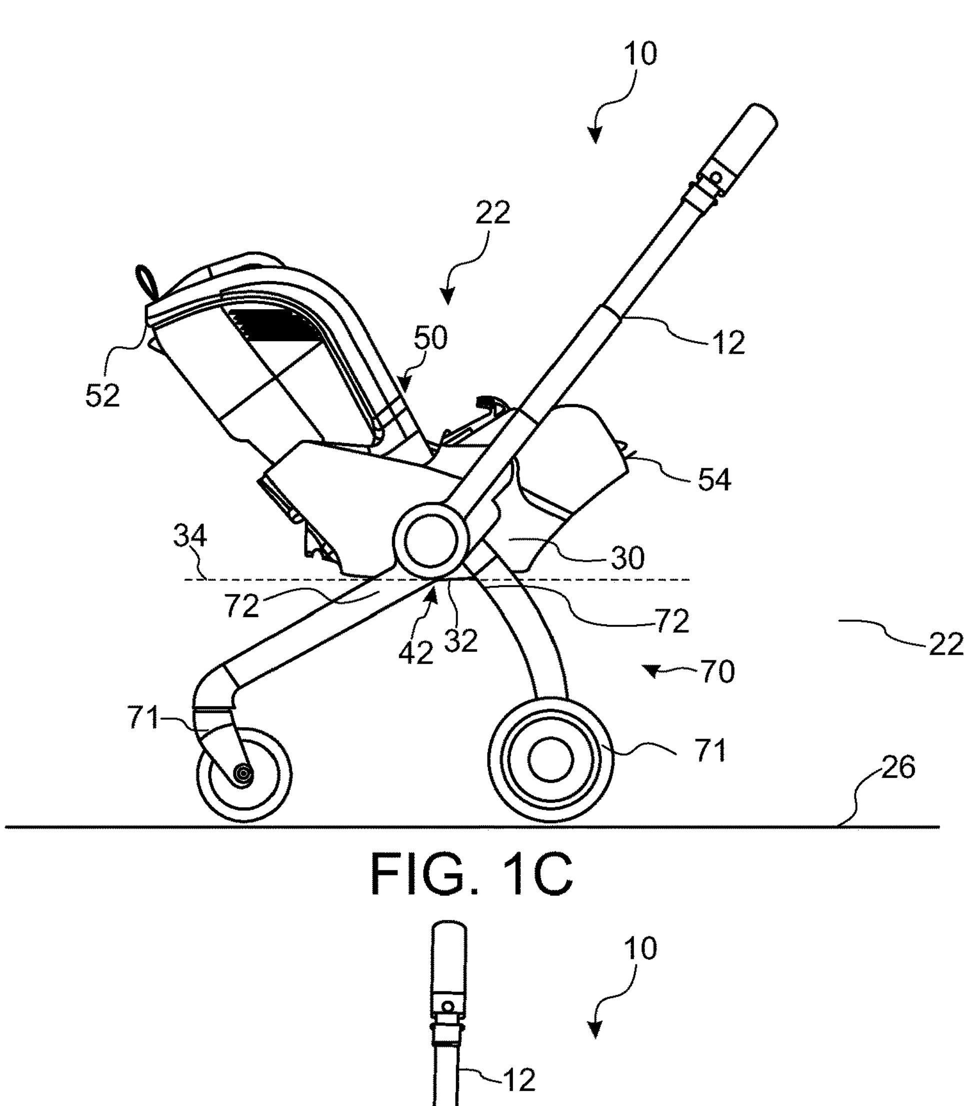
Figure 1D:
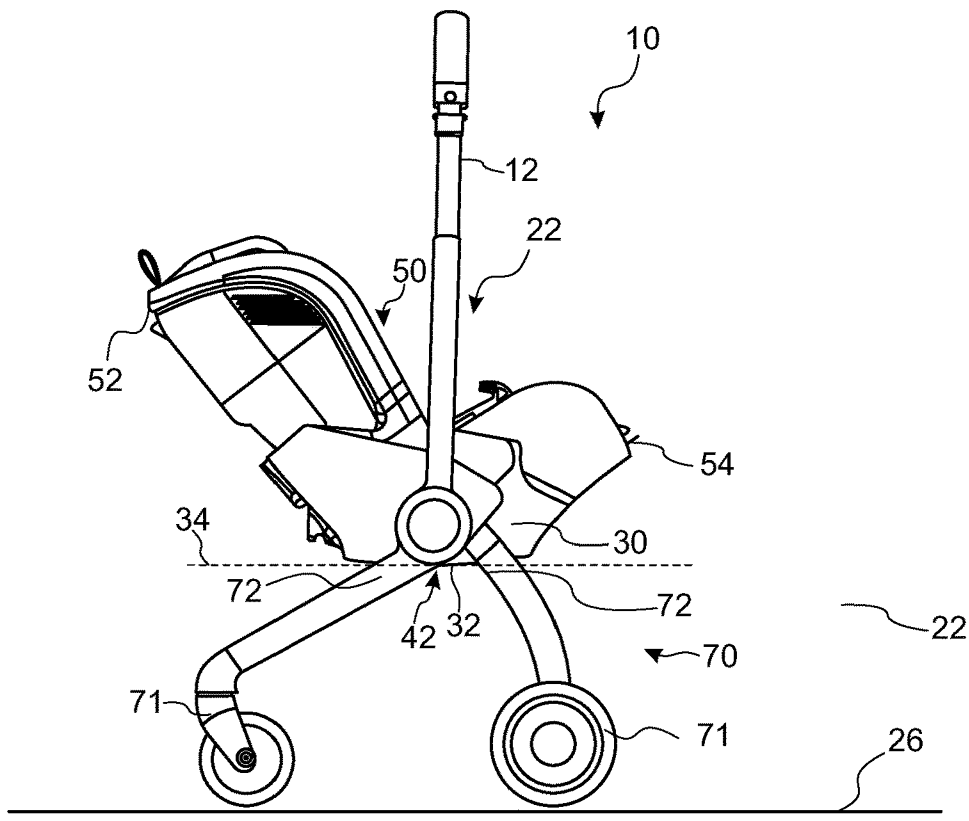
Figure 1E:
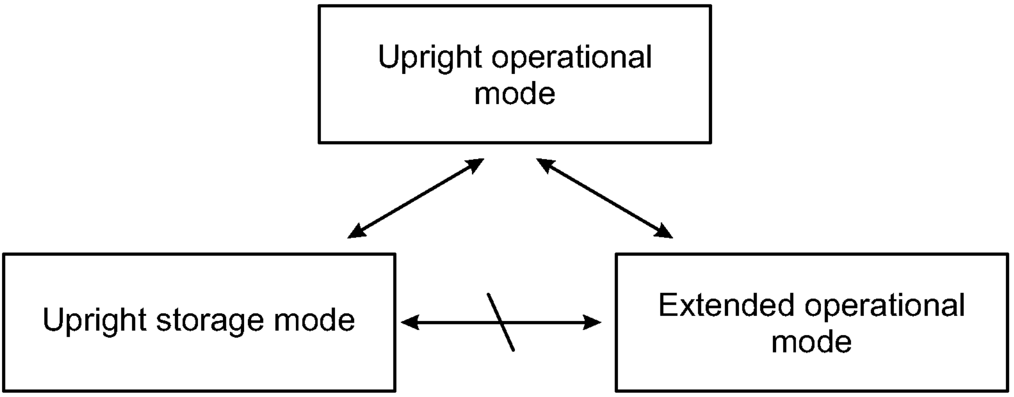
FIG. 1E is a diagram illustrating possible transitions between the modes shown in FIGS. 1A to 1C/1D.

In accordance with the latter example, and as illustrated in FIG. 1E, the seat assembly 10 is configured to enable the combination of the extended state of the upper seat 50 only with the operational state of the legs 70. As such, the seat assembly is configured to enable manipulation of the upper seat 50 between the upright state and the extended state only when the legs 70 are in their operational state. Such manipulation can occur in the transition between the upright operational mode 24 and the extended operational mode 22. The seat assembly 10 is also configured to enable combination of the storage state of the legs 70 only with the upright state of the upper seat 50. As such, the seat assembly is configured to enable manipulation of the legs 70 between the operational state and the storage state only when the upper seat 50 is in its upright state. Such manipulation can occur in the transition between the upright operational mode 24 and the storage mode 20.

Hence, in the upright operational mode 24 of the seat assembly, the operational state of the legs 70 is combinable with the upright state of the upper seat 50, and the seat assembly can be brought into its first, storage mode 20 and second, extended operational mode 22, only from its third, upright operational mode 24.

Non-limiting examples of structures of the lower support 30 and the upper seat 50 and their assembly and manner of operation, allowing the above combinations of the states of the legs and the upper seat, will now be described in detail below, with reference to the corresponding drawings.

In general, the basic structure of the lower support can comprise at least one articulation portion, to which at least a part of the upper seat is configured to be articulated so as to allow the change of its state between the upright and extended states.

The lower support can comprise rear and front articulation portions to which the backrest and feet portions of the upper seat can be articulated, respectively. The articulation portion/s can be configured to provide the same or different kinds of articulation to the associated portion/s of the upper seat, i.e., they both can be configured to provide a pivotal or linear articulation or rather one of them can provide pivotal and the other one—linear articulation of the associated portion of the upper seat. More particularly, the lower support can comprise a rear articulation portion at the rear of the lower support, to which the backrest portion is configured to be pivotally articulated, and a front articulation portion at the front of the lower support, to which the feet portion of the upper seat is configured to be slidably articulated.

The lower support can be in the form of an asymmetric bowl comprising a bottom, a high rear wall and a low front wall spaced from each other along a longitudinal axis of the lower portion, and two side walls extending therebetween generally parallel to this axis as best seen in a side view of each side wall taken perpendicular to its inner surface. The rear and front walls can generally extend away from each other, as seen in the side view of the lower support, so that a distance between them along the longitudinal axis increases in the direction away from the bottom of the lower support.

The rear articulation portion can be located at rear areas of the side walls of the lower support, e.g., closer to the side walls' top than to the bottom of the lower support, and the front articulation portion can be located at the front wall of the lower support. The backrest portion of the upper seat can thus be configured to be pivotally articulated to the rear articulation portion about an axis perpendicular to a longitudinal direction D of the lower support, and the feet portion of the upper seat can be configured to be slidably articulated to the front articulation portion along the longitudinal direction.

Figure 2A:
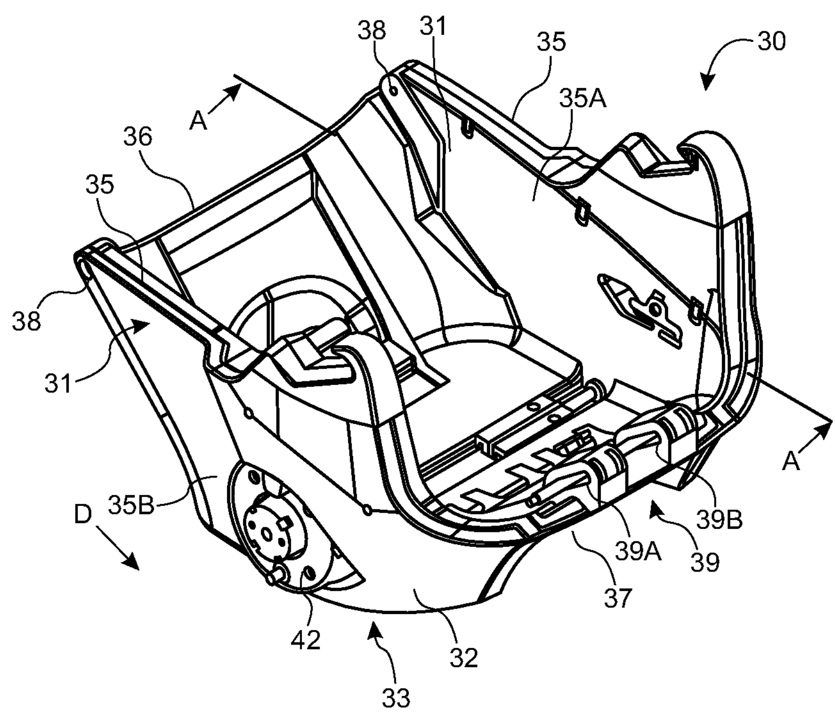
FIG. 2A is a front perspective view of a lower support, which can be used in a baby safety car seat assembly according to one example of the presently disclosed subject matter.
Figure 2B:
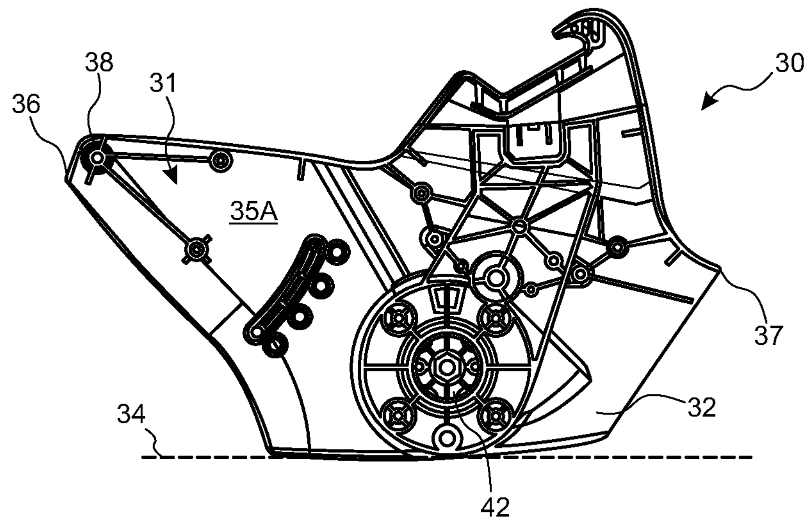
FIG. 2B is a view of one side wall of the lower support shown in FIG. 2A, taken along the direction A-A in FIG. 2A perpendicular to the side wall's inner surface.

In the present example, the lower support 30 shown in detail in FIGS. 2A and 2B, comprises a bottom 33 constituting its lowermost area, a high rear wall 36, a low front wall 37, the front and rear walls extending away from the bottom and away from each other in the longitudinal direction D of the lower support 30, and two side walls 35 oriented generally parallel to the direction D and having top rear areas 31.

The lower support 30 further comprises a rear articulation portion 38 at the top rear areas 31 of the side walls 35, to which the backrest portion 52 is configured to be pivotally articulated about a pivot axis (not shown) perpendicular to the longitudinal direction D of the lower support, and a front articulation portion 39 at the front wall 37, to which the feet portion 54 of the upper seat 50 is configured to be slidably articulated along the longitudinal direction.

More particularly, in the present example, the rear articulation portion 38 is in the form of articulation recesses positioned in the top rear areas 31 of the side walls 35 and configured to freely receive therein one or more articulable elements of the backrest portion 52 of the upper seat 50, so as to allow pivoting of these elements with the backrest about the pivot axis, and the front articulation portion 39 is in the form of elongated articulation slots 39A and 39B extending parallel to longitudinal direction D and configured to slidably receive therein a corresponding articulable element of the feet portion 54 of the upper seat 50.

As indicated above, the lower support 30 comprises two leg attachment areas 42 (one of which is shown in FIGS. 2A and 2B), to which proximal ends 72 of the legs 70 are pivotally articulated between the operational and storage states of the legs 70 and a leg manipulation mechanism (not shown in FIGS. 2A and 2B) configured to lock the legs 70 in either one of their storage state and operational state and to unlock them to enable their manipulation between the states. Different constructions of the leg manipulation mechanism providing the above locking arrangement can be used, including but not limited to any one of those described e.g., in the Applicant's U.S. Pat. Nos. 8,469,389 and 9,505,321, and the description of these constructions therefrom is incorporated herein by reference.

The upper seat of a seat assembly according to the presently disclosed subject matter has a construction enabling at least a part thereof to be articulated to the one or more of the articulation portion/s of the lower support as described above, to allow the change of the state of the upper seat between the upright and extended states. More particularly, when the lower support comprises rear and front articulation portions, the backrest and feet portions of the upper seat can have articulable elements respectively configured to be articulated to the articulation portions of the lower support as desired. For example, an articulable element of the backrest portion of the upper seat can be configured to be pivotally articulated to the rear articulation portion of the lower support, and an articulable element of the feet portion of the upper seat can be configured to be slidably articulated to the front articulation portion of the lower support. The backrest portion and the feet portion of the upper seat can also be articulately connected to each other, so that the movement of one of them will induce manipulation to the other one.

FIGS. 3A to 3E illustrate an upper seat without a covering, which can be used together with the lower support shown in FIGS. 2A and 2B. In FIGS. 3A, 3B and 3D, 3E, the backrest portion of the upper seat is shown in the respective upright and extended states with the respective first angle α and second angle β referred to above with reference to FIGS. 1B, 1C and 1D.

In FIGS. 3A to 3E, an articulable element of the backrest portion 52 of the upper seat 50 is constituted by a rear pivot axle 38A unitarily formed or assembled with the backrest portion and having ends freely received in the recesses of the rear articulation portion 38 of the lower support 30 so as to allow pivoting of the axle with the backrest portion between its close-to-vertical orientation (i.e. upright state) and close-to-horizontal orientation (i.e. extended state). An articulable element of the feet portion 54 of the upper seat 50 is constituted by a sliding bar 56 unitarily formed or assembled with the feet portion 54 and slidably received within the articulation slots 39A and 39B of the lower support 30, so as to allow movement of the sliding bar 56 with the feet portion 54 between extreme positions of the sliding bar 56 within the slots 39A and 39B, corresponding to innermost and outermost positions of the feet portion 54. The close-to-vertical orientation of the backrest portion 52 and innermost position of the feet portion 54, and close-to-horizontal orientation of the backrest portion 52 and outermost position of the feet portion 54 correspond, respectively, to the upright and extended states of the upper seat 50.

In general, the backrest and the feet portions of the upper seat can be directly or indirectly connected to each other. Alternatively, the backrest and the feet portions can be separately connected to lower support without being connected to each other. In case the backrest and the feet portions are connected to each other, they can be articulately connected directly, or indirectly via an intermediate backrest portion, to enable rotation/manipulation of one of the portions while the other portion is being manipulated/rotated. Also, the backrest and the feet portions can be fixedly connected to each other in order to induce manipulation of one portion by manipulating the other portion.

Figure 3A:
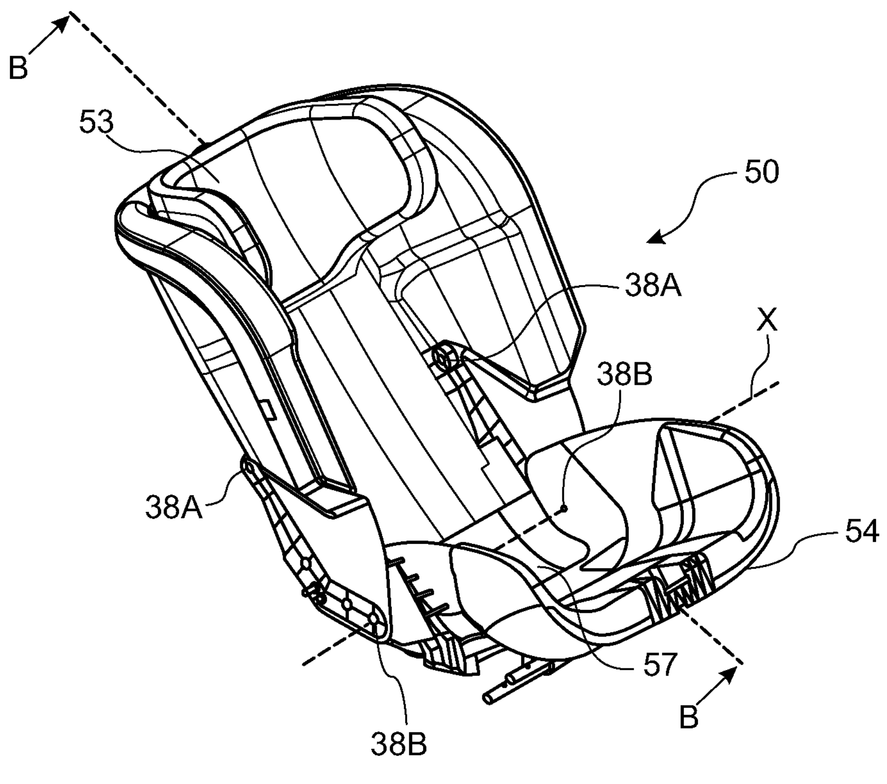
FIG. 3A is a front perspective view of an upper seat without a covering, which can be used together with the lower support shown in FIGS. 2A and 2B, in a baby safety car seat assembly according to one example of the presently disclosed subject matter, the upper seat being in its upright state.
Figure 3B:
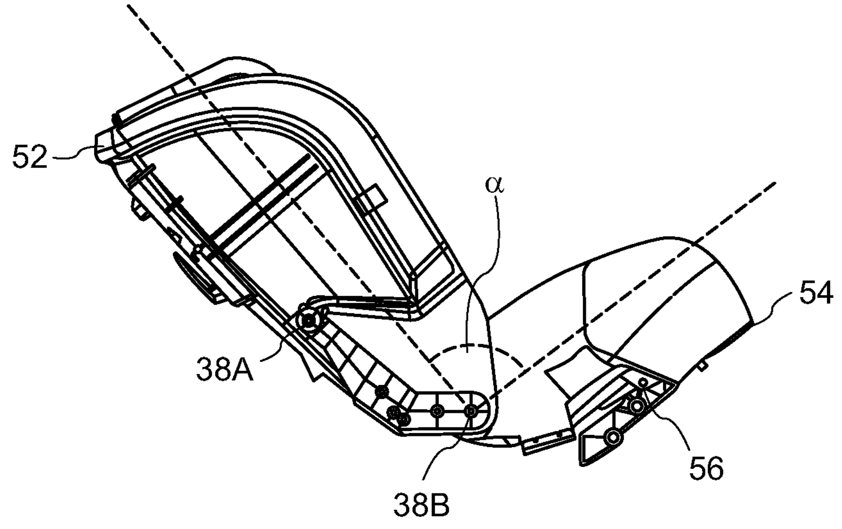
FIG. 3B is a side view of the upper seat of FIG. 3A.
Figure 3C:
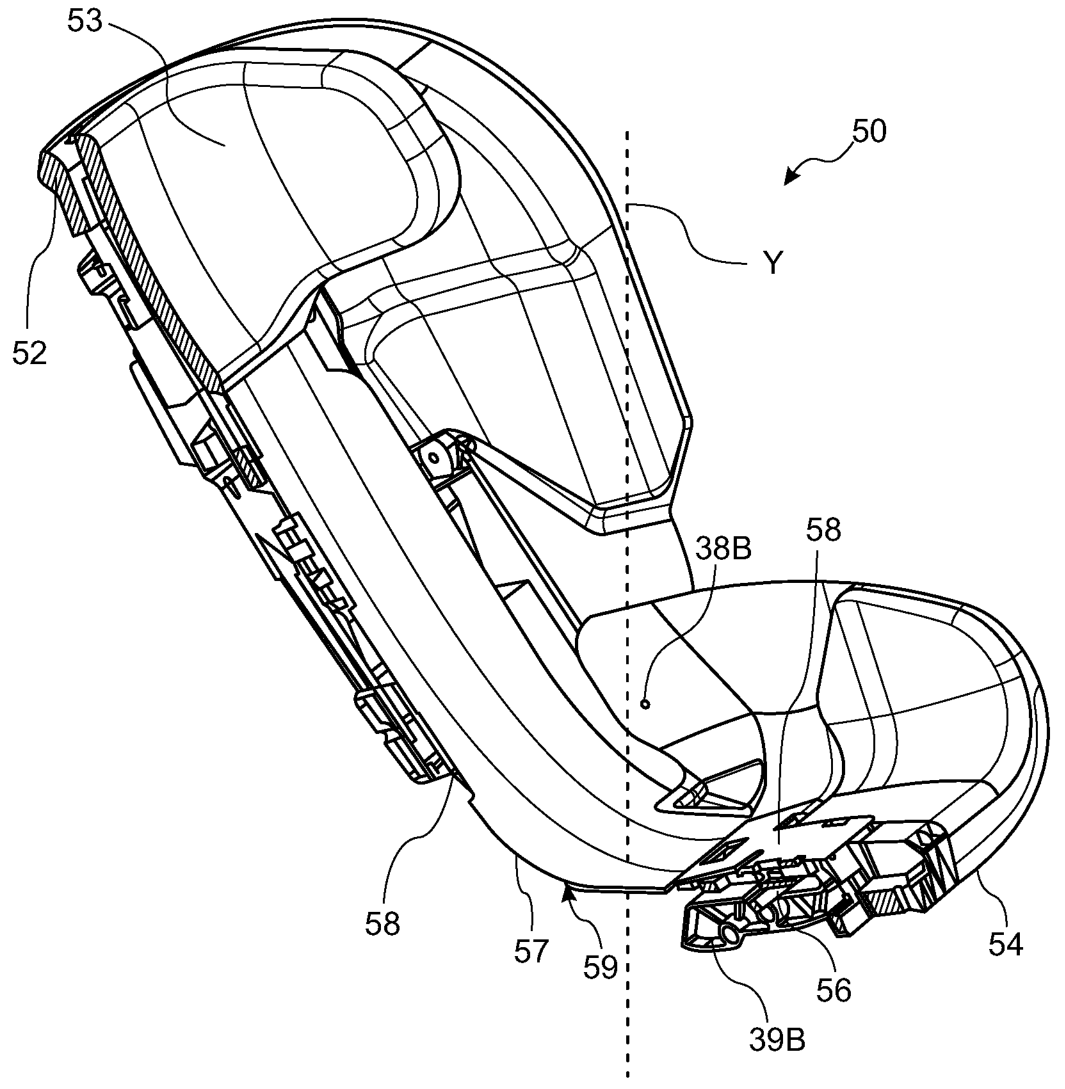
FIG. 3C is a perspective cutaway side view of the upper seat shown in FIG. 3A as seen in the direction B-B in FIG. 3A, which is perpendicular to the cutting-away plane.
Figure 3D:
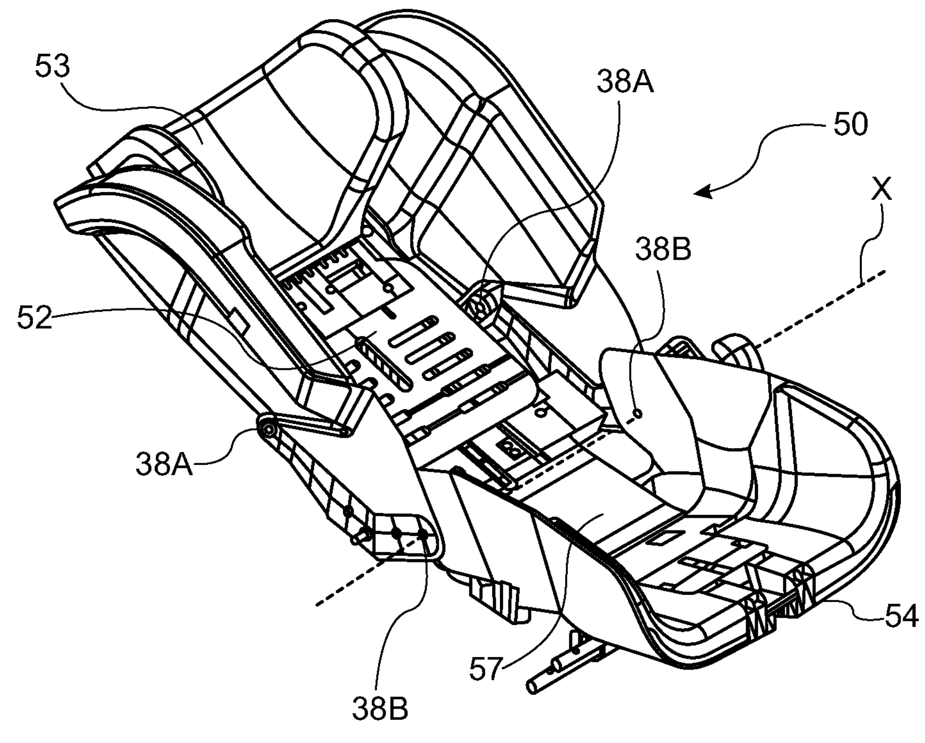
FIG. 3D is a front perspective view of the upper seat shown in FIGS. 3A to 3C, the upper seat being in its extended state.
Figure 3E:
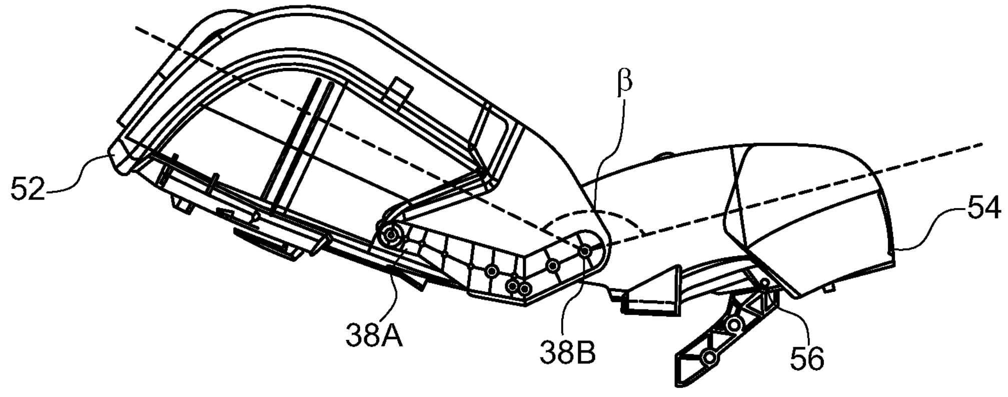
FIG. 3E is a side view of the upper seat of FIG. 3D.

In the present example, the upper seat 50 also comprises an intermediate portion 57 fixedly connecting the backrest and the feet portions 52 and 54, to each other. Specifically (as best shown in FIG. 3C), the intermediate portion 57 is constituted as a bottom part of the backrest portion 52, extending forward from a lower edge 58 thereof and being configured to be fixedly connected at a front edge 59 thereof to the feet portion 54. The intermediate portion 57 is concave and configured to receive the bottom of an infant seated on the upper seat 50. The intermediate portion 57 is formed from a flexible material, so as to enable it to be flexed upon manipulation of the upper seat 50 to the extended state, in which the intermediate portion 57 is less concaved then in the upright state.

The backrest portion 52 and the feet portion 54 are also pivotally connected to each other by an articulable element constituted by a front pivot axle (not shown) having ends freely received in lateral intermediate apertures 38B formed in the side walls 35 of the lower support 30. This pivotal connection defines a horizontal axis X interconnecting the lateral intermediate apertures 38B about which the backrest portion 52 and the feet portion 54 pivot.

In general, the upper seat can further comprise a seat manipulation mechanism operable to induce the upper seat to change its state between the upright and extended states, as described above with reference to FIGS. 1A to 1D. This mechanism can be configured to induce the manipulation of only the backrest portion of the upper seat while maintaining the position of the feet portion unchanged (in order to provide different orientations of the backrest in the upright state of the upper seat), and/or to cause each of the backrest portion and the feet portion to move, or to cause movement of the feet portion which in turn induces the movement of the backrest portion (in both latter cases—to change the state of the upper seat between its upright and extended states). The seat manipulation mechanism can comprise a seat manipulation actuator positioned at a location available to be actuated by a user.

Figure 4A:
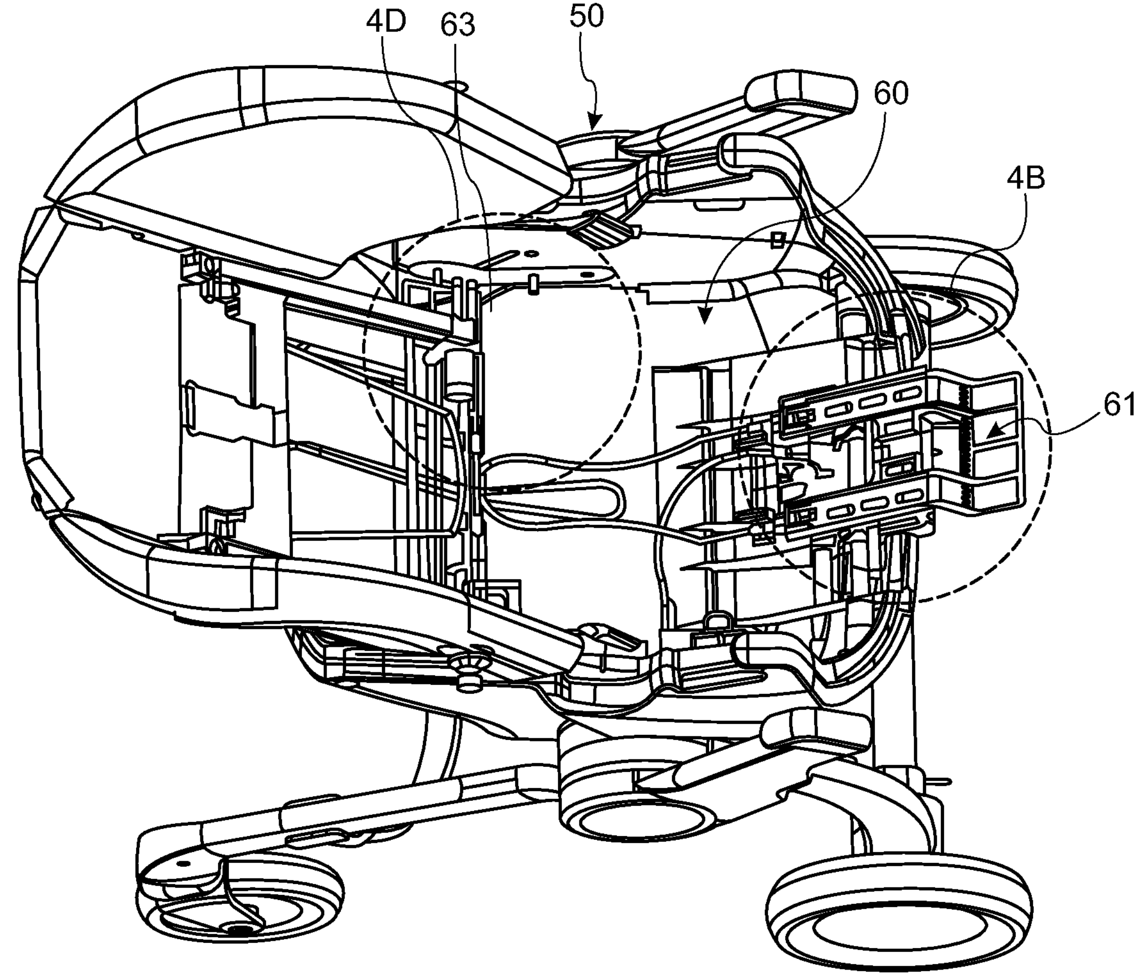
FIG. 4A is a top perspective view of a seat assembly having the upper seat shown in FIGS. 3A to 3E mounted to the lower support shown FIGS. 2A and 2B, the upper seat being in the upright state shown in FIGS. 3A to 3C with the feet portion thereof removed to simplify the illustration.
Figure 4B:
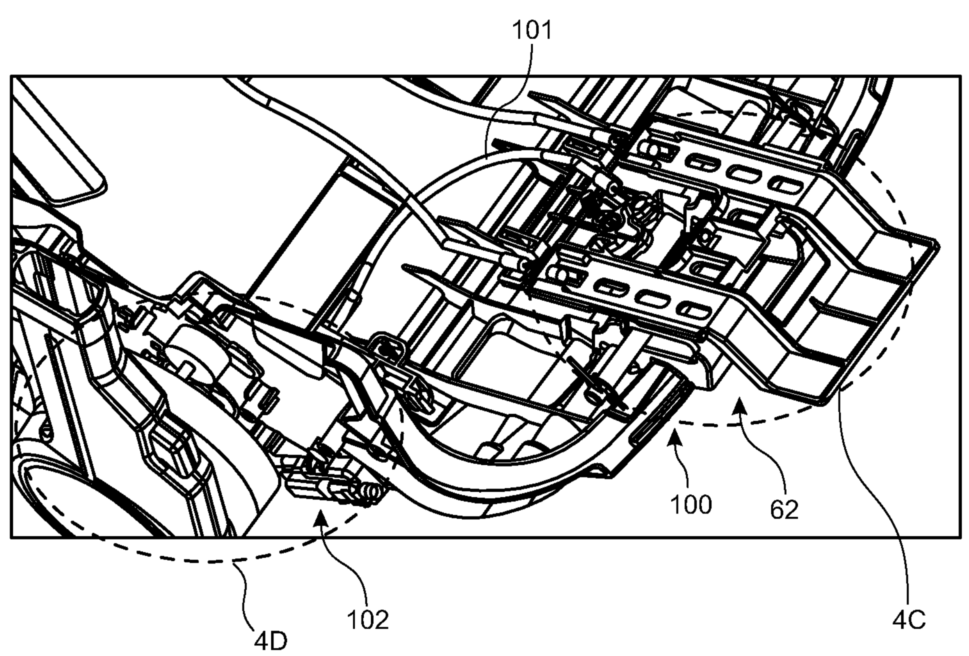
FIG. 4B is an enlarged perspective view of an area 4B of the seat assembly shown in FIG. 4A, comprising a seat manipulation mechanism and a seat manipulation prevention arrangement, and having the feet portion of the upper seat removed to simplify the illustration.
Figure 4C:
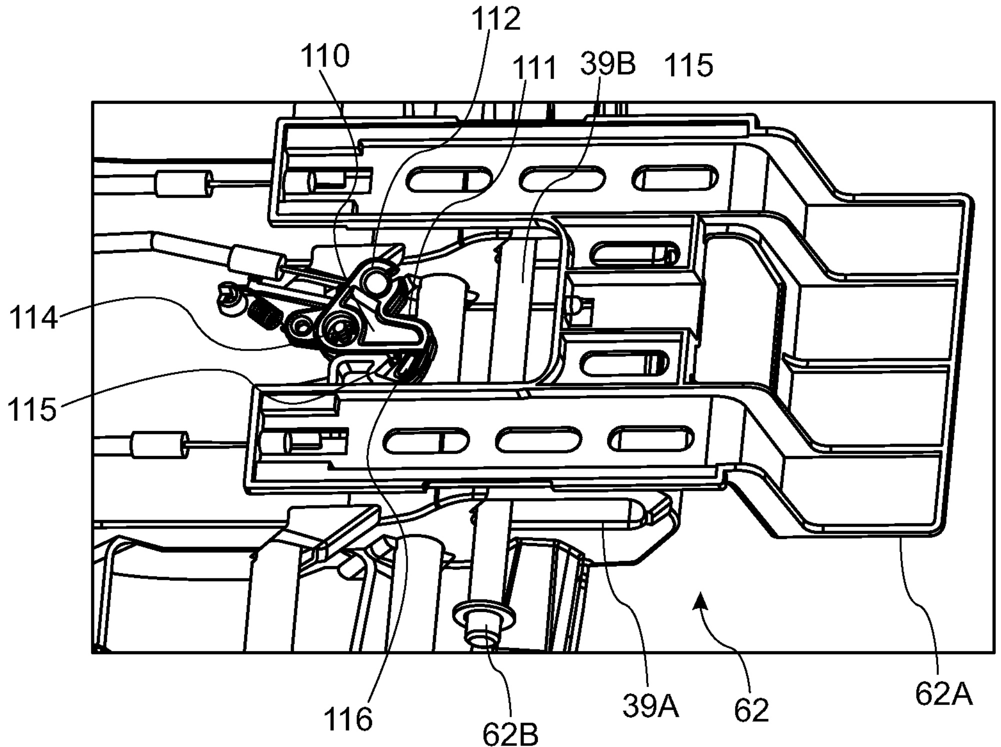
FIG. 4C is an enlarged view of an area 4C of the seat assembly shown in FIG. 4B.

In the present example illustrated in FIGS. 4A-4C, the seat manipulation mechanism of the upper seat 50 is designated as 60 and comprises a seat manipulation actuator 61, for actuating the manipulation of the upper seat 50 so as to change its state, and a seat locking mechanism 63, for preventing the upper seat from changing its state.

The seat manipulation actuator 61 is constituted by a seat handle 62 disposed at the frontmost portion of the feet portion 54. The seat handle 62 comprises a seat handle exterior portion 62A configured to enable a user to grab the seat handle 62 and a seat handle interior portion 62B movably connected to the feet portion 54 so as to allow the movement of the feet portion 54 between its innermost and outermost positions, and respective movement of the backrest portion 52 between the upright state and the extended state respectively, by the user's applying respective pushing and pulling forces to the handle.

In general, the seat manipulation mechanism can further comprise a seat locking mechanism configured to selectively prevent the upper seat from changing its state between the upright and extended states. More particularly the seat locking mechanism can have a locking state, in which the seat locking mechanism prevents the upper seat from movement and thus from changing its state, and an unlocking state, in which the seat locking mechanism allows the upper seat to move and thus change its state. The seat locking mechanism can be configured to selectively lock at least one portion of the upper seat to at least one portion of the lower support, and more specifically, to at least two different portions of the lower support. The seat locking mechanism can be configured with a first locking portion positioned at the lower support and a second locking portion positioned at a matching position at the backrest portion configured to interact with the first locking portion for selectively locking the backrest portion to the lower support. The lower support can be configured with more than two different portions, to which the upper seat is to be locked, for enabling the upper seat to be gradually manipulated between its upright and extended states by the seat locking mechanism while allowing the upper seat to be fixed relative to the lower support in a plurality of states between, and including, the upright state and the extended state.

Figure 4D:
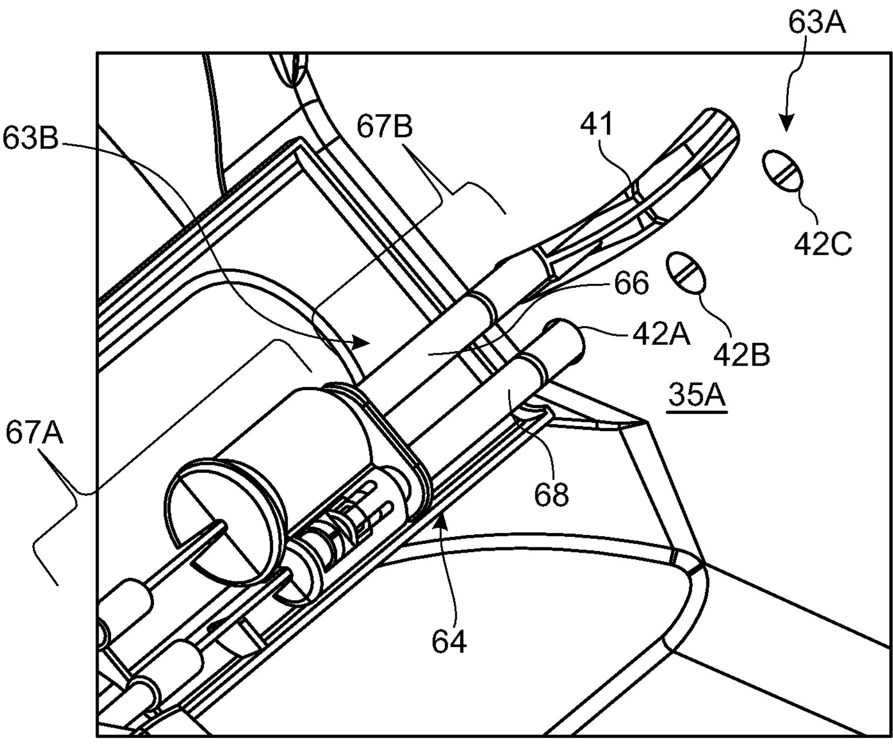
FIG. 4D is an enlarged view of an area 4D of the seat assembly shown in FIG. 4A.
Figure 4E:
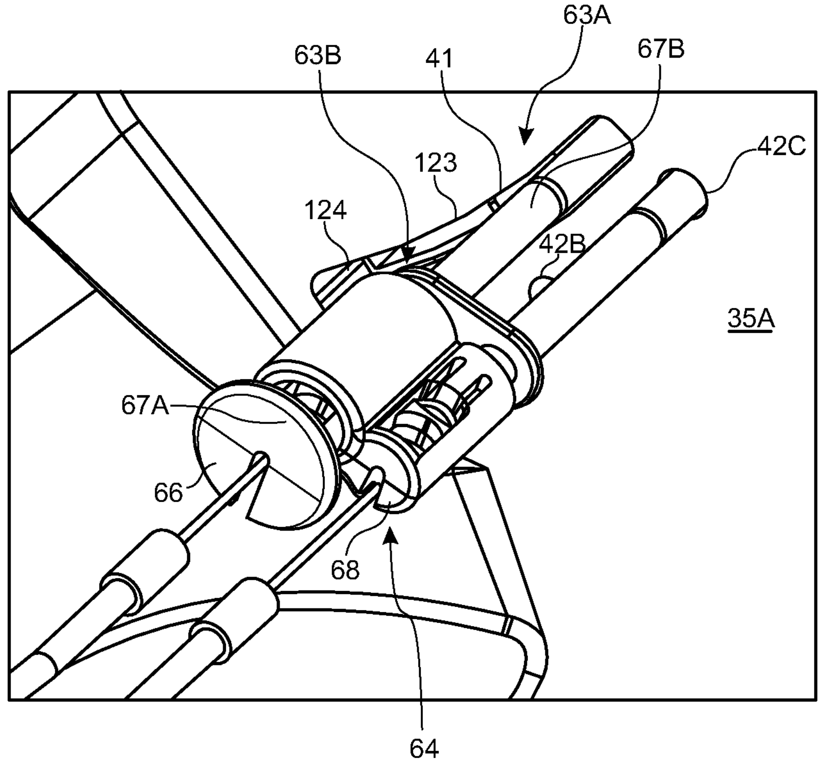
FIG. 4E illustrates the area shown in FIG. 4D, when the upper seat of the seat assembly is in its extended state, as shown in FIGS. 3D and 3E.
Figure 4F:
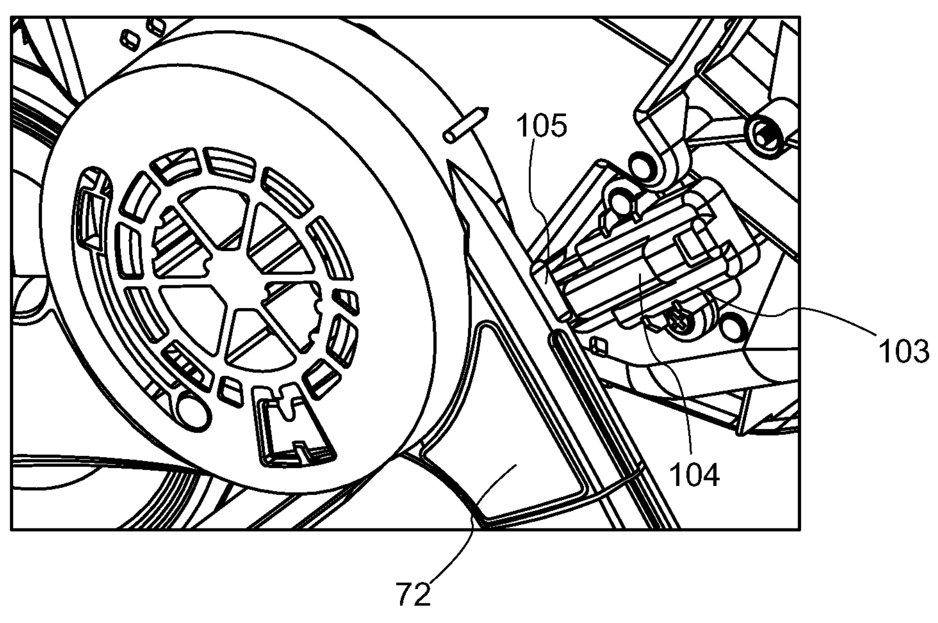
FIG. 4F is a close-up view of a proximal end of a leg of a baby safety car seat assembly according to one example of the presently disclosed subject matter, the leg shown in the operational state thereof.
Figure 4G:
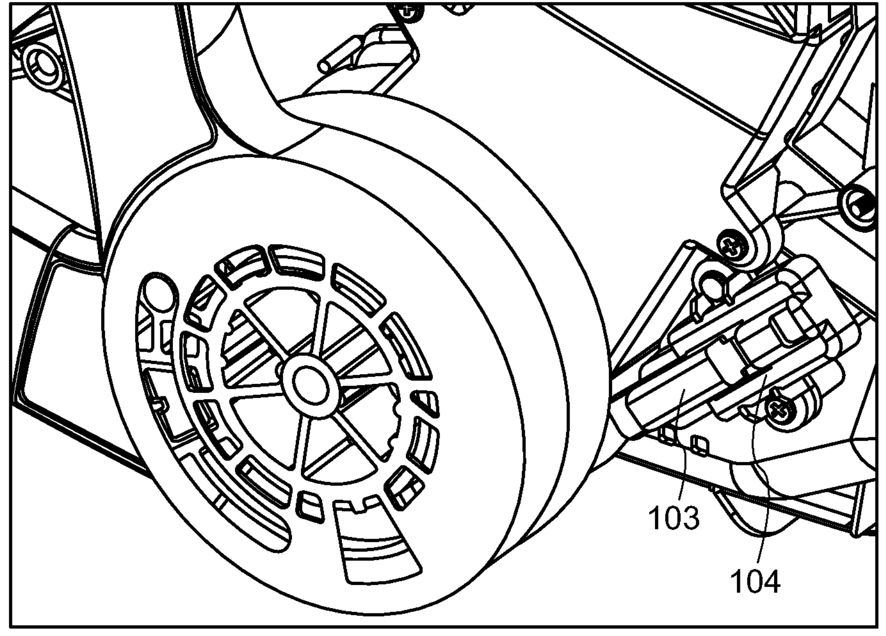
FIG. 4G is the proximal end of the leg of FIG. 4F, the leg shown in the storage state thereof.

With reference to FIGS. 4A, 4D and 4E, the seat locking mechanism 63 is configured for selectively locking the upper seat 50 to the lower support 30, so as to prevent it from changing its state. For this purpose, the seat locking mechanism 63 comprises a first locking portion 63A positioned at the lower support 30 and a second locking portion 63B positioned at the backrest portion 52 configured to interact with the first locking portion 63A for selectively locking the backrest portion 52 to the lower support 30.

More particularly, the first locking portion 63A of the seat locking mechanism 63 comprises an elongated guiding slot 41 and a plurality of fixation apertures 42A-42C, all formed on an inner surface 35A of each of the side walls 35. (An outer surface of the side walls 35 is generally designated at 35B). The apertures 42A-42C are spaced from each other along a direction parallel to the elongated guiding slot 41. The elongated guiding slot 41 is formed in a curved manner having similar curvature to the curvature the lower edge 58 of the backrest portion travels along the movement thereof between the upright and the extended states. The elongated guiding slot 41 is configured to slidably receive therein a corresponding guiding element of the second locking portion 63B allowing it to take different positions along the slot, and the apertures 42A-42D are configured to receive therein a corresponding locking element of the second locking portion 63B when the guiding element takes the respective position in the elongated guiding slot 41, in order to lock the upper seat 50 to the lower support. The apertures 42A-42D of the first locking portion 63A are also configured to provide the upper seat 50 with at least one, and in the present example two, additional intermediate states between the upright state and the extended state, so as to provide further orientations.

The second locking portion 63B of the seat locking mechanism 63, positioned on the upper seat 50, comprises two pin holders 64 (only one being seen) attached to the backrest portion 52 between the backrest portion 52 and the bottom 33 of the lower support and located adjacent to inner surfaces 35A of different side walls 35, being configured to operate concurrently upon actuation of the actuator 61. Each pin holder 64 comprises a guiding pin 66 and a locking pin 68 traversing the pin holder 64 generally perpendicularly to the direction D and in parallel to each other. Each guiding pin 66 and locking pin 68 comprises an actuated portion 67A extending from an internal side of the corresponding pin holder 64 (i.e., away from the closest side wall 35), and a lockable portion 67B extending from an external side of the pin holder 64 (i.e. towards the closest side wall 35) and configured to interact with the first locking portion 63A.

The lockable portion 67B of the guiding pin 66 is configured to be at least partially positioned inside the elongated guiding slot 41 and configured to be slidably moved therein, for guiding the manipulation of the backrest portion 52 between the states. In the present example, the lockable portion 67B of the guiding pin 66 is maintained within the elongated guiding slot 41. The locking pin 68 is positioned and configured to be inserted into and removed from any one of the plurality of apertures 42A-42C for fixing the backrest portion 52 in each one of the states of the upper seat 50 including the upright state (i.e. when the lockable portion 67B of the locking pin 68 is in the aperture 42A), the extended state (i.e. when the lockable portion 67B of the locking pin 68 is in the aperture 42C), and at least one intermediate state therebetween (i.e. when the lockable portion 67B of the locking pin 68 is in aperture 42B).

In the present example, the pin holders 64 are configured to be actuated by the seat actuator 61 to change the state of the seat locking mechanism to the unlocking state, and by doing so, releasing the upper seat 50 from being arrested to the lower support 30. For that purpose, the pin holders 64 are configured to be manipulated along a route perpendicularly to the longitudinal direction D between a fixing position, in which at least the lockable portion 67B of the locking pin 68 is inserted into one of the plurality of apertures 42A-42C, and a remote position, in which the lockable portion 67B of the locking pin is external of the apertures 42A-42C. Thus, upon actuation of the seat actuator 61, the pin holders 64 are manipulated towards the remote position thereof, thereby pulling the lockable portion 67B of the locking pin 68 out from one of the apertures 42A-42C.

Regarding the legs of a seat assembly according to the presently disclosed subject matter, with reference to the legs and leg locking arrangement as described in U.S. Pat. No. 9,505,321 (which description is incorporated herein by reference as indicated above), the legs can be configured to be manipulated by a leg manipulation mechanism comprising at least one leg manipulation actuator positioned at a location available for a user, and a leg locking mechanism. The legs are manipulatable between their storage and operational states.

Figure 5A:
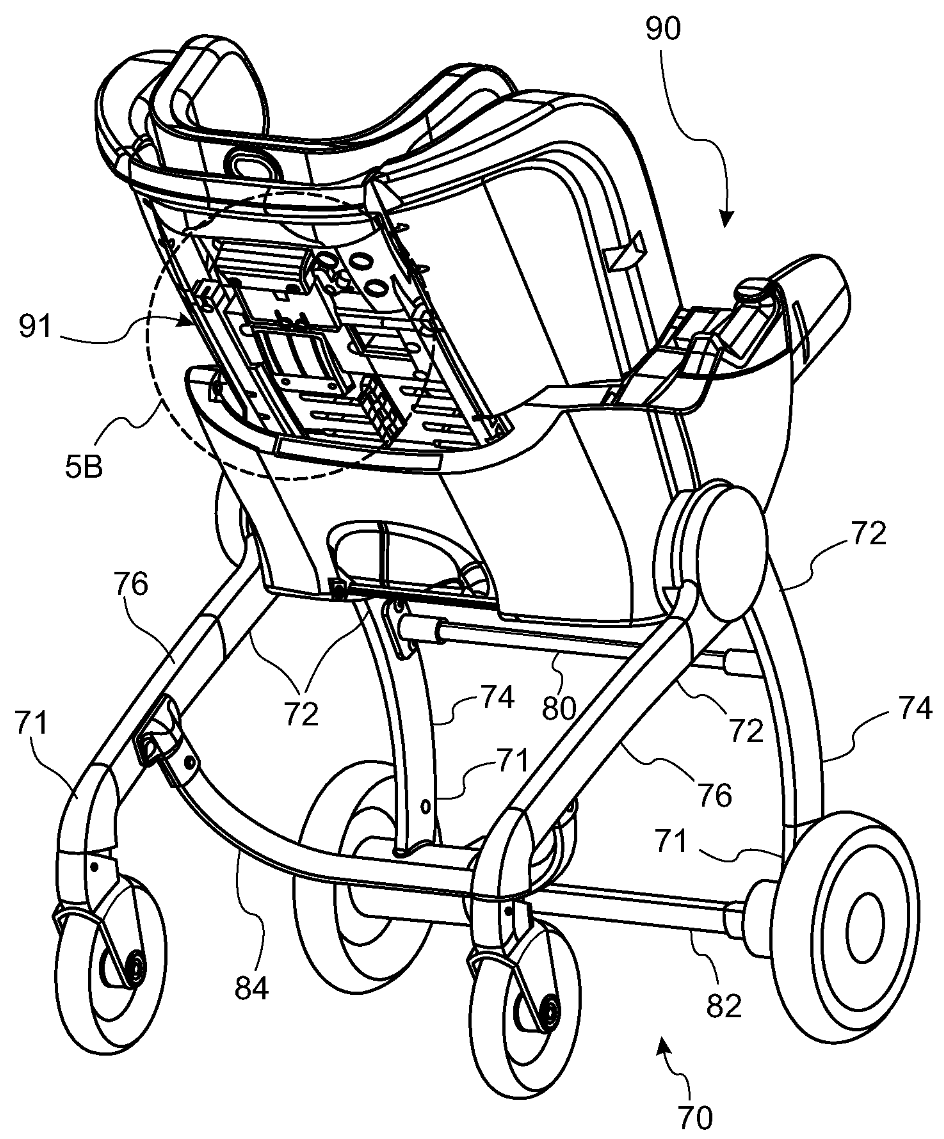
FIG. 5A is a rear perspective view of the seat assembly shown in FIG. 4A.
Figure 5B:
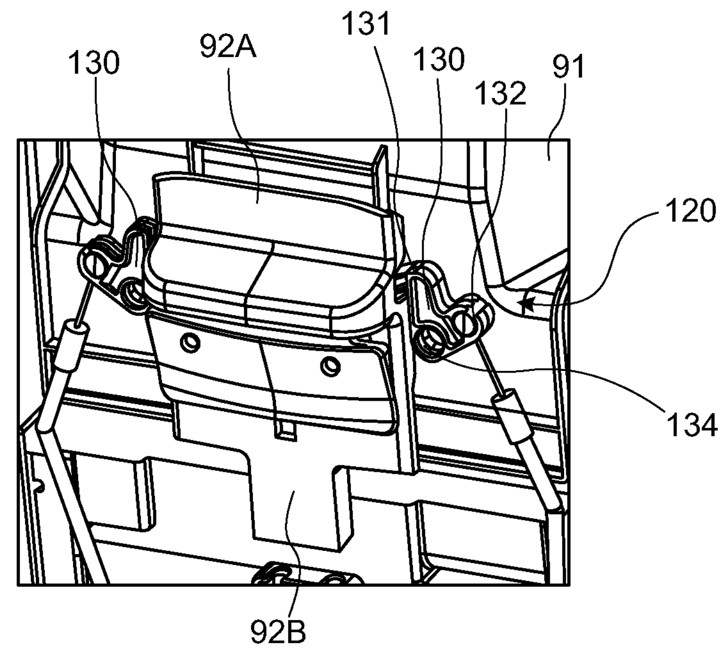
FIG. 5B is an enlarged view of an area 5B in FIG. 5A, comprising a leg manipulation mechanism and a leg manipulation prevention arrangement.
Figure 5C:
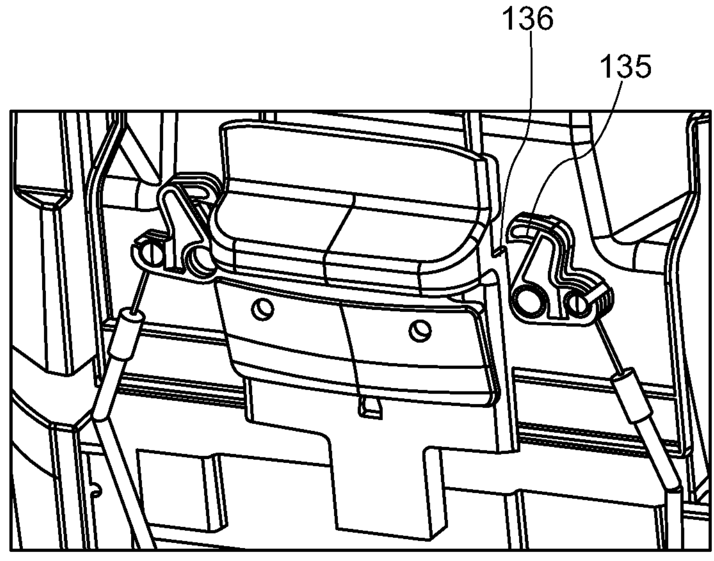
FIG. 5C illustrates the area 62 of the seat shown in FIG. 5B, when the upper seat of the seat assembly is in its extended state.

With reference to FIGS. 5A to 5C, a leg manipulation mechanism 90 of the seat assembly 10 of the present example comprises a leg manipulation actuator 91 for actuating the manipulation of the legs 70 and a leg locking mechanism (not shown) for activating the leg locking arrangement to arrest the legs in either one of the storage state and the operational state. In the present example, the leg manipulation actuator 91 is constituted by a leg handle 92 positioned at the top rear side of the backrest portion 52 for enabling easy access to a user. The leg handle 92 comprises a leg handle exterior portion 92A configured to enable a user to grab the leg handle 92, and a leg handle interior portion 92B fixedly connected to the backrest portion 52. The leg handle 92 is operably connected to the leg locking mechanism so as to unlock the locking arrangement and allow the movement of the legs 70 between their storage and operational states, by the user's applying respective forces to the handle 92.

Whilst in the present example as described above, the seat handle 62 is positioned at the frontmost of the feet portion 54 and the leg handle 92 is position at the top rear side of the backrest portion 52, their positions can be different as long as they are spaced from each other to reduce the risk of them being mixed up.

As aforementioned, the seat assembly can be configured to prevent at least the combination between the storage state of the legs and the extended state of the upper seat, by virtue of which the possibility in which the seat assembly will be inserted into a car with a baby lying thereon is excluded. More particularly, the seat assembly can be configured to prevent the manipulation of either one of the upper seat or legs if such manipulation would result in a state in which the legs are in their storage state and the upper seat is in its extended state. In some cases, the seat assembly can be configured such that a certain state of either one of the legs or upper seat can cause prevention of the manipulation of the other. In some cases, the seat assembly can comprise at least one manipulation prevention arrangement configured to identify a certain state of at least one of the upper seat and legs and prevent the other from manipulation while the certain state is maintained. Such manipulation prevention arrangement can comprise either a mechanical or an electrical mechanism. Even more particularly, the seat assembly can comprise a manipulation prevention arrangement for each of the upper seat and legs, each configured to identify a certain state of their respective part.

The manipulation prevention arrangement can be configured to prevent manipulation of either the upper seat or the legs as long as the other of the upper seat or the legs is not in a certain state. For example, the manipulation prevention arrangement may be configured to prevent manipulation of the seat from the upright state to the extended state if the legs are in the storage state. In another example, the manipulation prevention arrangement may be configured to prevent manipulation of the legs from the operational state to the storage state if the seat is in the extended state.

The manipulation prevention arrangement can be configured to prevent the manipulation of either the upper seat or the legs by respectively arresting the upper seat or the legs, or by respectively arresting the seat manipulation mechanism or the leg manipulation mechanism.

The manipulation prevention arrangement can have an identifying component, such as a trigger portion, configured to identify the state of the upper seat or the legs of the seat assembly, and an arresting portion, configured to be actuated or triggered by the trigger portion to selectively arrest the respective seat or leg manipulation mechanism. The trigger portion and/or the arresting portion of the manipulation prevention arrangement can be positioned on or constituted by a different part of the seat assembly. In some cases, the manipulation prevention arrangement can be configured to arrest the manipulation mechanism of the upper seat or the legs in a manner similar to that of the respective locking mechanisms, or the manipulation prevention arrangement can be constituted or integrated therewith.

For example, a seat assembly according to the presently disclosed subject matter can comprise a seat manipulation prevention arrangement configured to prevent manipulation of the upper seat from the upright state to the extended state at least when the legs are in the storage state. In one example, the seat manipulation prevention arrangement is configured to prevent manipulation of the upper seat to the extended state unless the seat manipulation prevention arrangement is triggered by the legs in the operational state thereof.

The seat manipulation prevention arrangement can be configured to change states between a locking state, in which the seat manipulation prevention arrangement prevents the manipulation of the upper seat towards the extended state, and an unlocking state, in which the seat manipulation prevention arrangement enables manipulation of the upper seat between the upright state and the extended state.

In the present example, the seat manipulation prevention arrangement is designated as 100 in FIG. 4B. When the legs 70 are in their storage state, the seat manipulation prevention arrangement 100 is configured to prevent manipulation of the upper seat 50 from the upright state to the extended state. The seat manipulation prevention arrangement 100 is configured to be triggered by the legs 70 when the legs 70 are in their operational state, which triggering changes the state of the seat manipulation prevention arrangement 100 from the locking state to the unlocking state such that the upper seat 50 can be manipulated between the upright and extended states thereof.

In some cases, the seat manipulation prevention arrangement is configured to prevent, while being in the locking state, manipulation of the upper seat from the upright state towards the extended state by arresting the seat manipulation mechanism. More specifically, the seat manipulation prevention arrangement can be configured to arrest the seat manipulation mechanism when the legs are in their storage state. The seat manipulation prevention arrangement can also be configured to release said arresting of the seat manipulation mechanism when the legs are in their operational state. As such, the seat manipulation prevention arrangement 100 is configured to arrest the seat manipulation mechanism only when the upper seat 50 is in its upright state.

In some cases, the seat manipulation prevention arrangement comprises a seat trigger member and a seat arresting member. The seat trigger member may be configured to operate the seat arresting member upon being triggered by the legs when the legs are in the operational state thereof. The seat arresting member is operable by the seat trigger member so to be manipulated, upon operation thereof, from an arresting state, in which the seat arresting member arrests the seat manipulation mechanism to prevent manipulation of the upper seat from the upright state to the extended state, to a releasing state, in which the seat manipulation mechanism is released from said arresting such that manipulation of the upper seat between the upright and extended states is enabled. In a particular example, wherein the legs are configured to trigger the seat trigger member only when the legs are in their operational state.

FIGS. 4B and 4C depict an exemplary embodiment of the seat manipulation prevention arrangement 100 comprising a seat trigger member 102 and a seat arresting member 110. The seat trigger member 102 is configured to be triggered by the legs 70 only when they are in their operational state and to operate the seat arresting member 110 as a result. The seat trigger member 102 is also configured to maintain operation of the seat arresting member 110 while the legs 70 are in their operational state. The seat arresting member 110 is configured to have an arresting state, in which the seat arresting member 110 arrests the seat manipulation mechanism 60 to prevent manipulation of the upper seat 50 from the upright state to the extended state, and a releasing state, in which the seat manipulation mechanism 60 is released from said arresting by the seat arresting member 110 so as to enable manipulation of the upper seat 50 between the upright and extended states.

In general, the seat trigger member may be disposed on the lower support of the seat assembly, adjacent to at least one of the leg attachment areas thereof. In such cases, at least one of the legs may comprise a frontal protrusion positioned about a proximal end thereof, wherein the frontal protrusion is configured to trigger the seat trigger member when the legs are in their operational state. In other words, when the legs are moved to or are in their operational state, the frontal protrusion thereof triggers the seat trigger member, causing the seat trigger member to operate the seat arresting member, which operation manipulates the seat arresting member from its arresting state to its releasing state such that the seat arresting member releases arrestment of the seat manipulation mechanism so as to enable manipulation of the upper seat between the upright and extended states. Correspondingly, when the legs are not in the operational state (i.e., the legs are moved to or toward the storage state), the frontal protrusion thereof no longer triggers the seat trigger member, in which case the seat arresting member assumes its arresting state so as to arrest the seat manipulation mechanism and thus prevent manipulation of the upper seat from the upright state to the extended state.

In the present example, and with reference to FIGS. 4B, 4C, 4F and 4G, the seat trigger member 102 comprises a trigger body 103 disposed on the lower support 30 in front of and adjacent to at least one of the leg attachment areas 42. In some cases, the seat trigger member 102 is disposed within one of the side walls 35 or projects laterally therefrom. A movable member 104 extends through a length of the trigger body 103, having a sufficient length to reach and contact at least a part of one of the legs 70, and more specifically a front side of the proximal end 72 of that leg 70 when the legs 70 are in their operational state. The proximal end 72 of at least the leg 70 that triggers the seat trigger member 102 comprises a frontal protrusion 105 extending forwards therefrom configured to press against the movable member 104 when the legs are in the operational state thereof. The seat trigger member 102 is operably connected, either mechanically or electrically, to the seat arresting member 110. In the Figures, the movable member 104 is operably connected, via cable 101, to the seat arresting member 110 so as to operate the seat arresting member 110 when pressed by the frontal protrusion 105 when the legs 70 are in their operational state. As such, in the unlocking state of the seat manipulation prevention arrangement 100 (FIG. 4F), the movable member 104 of the seat trigger member 102 is pressed against the trigger body 103 by the frontal protrusion 105 of one of the legs 70 when the legs 70 are in the operational state. Said pressing of the seat trigger member 102 operates the seat arresting member 110 such that it is manipulated from the arresting state to the releasing state, thereby releasing the seat manipulation mechanism 60 such that the upper seat 50 can be manipulated between the upright and extended states. Correspondingly, in the locking state of the seat manipulation prevention arrangement 100 (FIG. 4G), the movable member 104 of the seat trigger member 102 is not pressed by the frontal protrusion of one of the legs 70 when the legs 70 are not in the operational state. As such, the seat trigger member 102 is not triggered by the legs 70 and thus the seat trigger member 102 does not operate the seat arresting member 110. The seat arresting member 110 thus assumes its arresting state wherein it arrests the seat manipulation mechanism 60 such that the upper seat 50 is prevented from being manipulated from the upright state to the extended state. Thus, the legs 70 of the seat assembly 10 are generally configured to change the state of the seat manipulation prevention arrangement 100 between the locking state and the unlocking state. As such, the seat manipulation prevention arrangement is generally constituted by the legs. In particular, the locking state of the seat manipulation prevention arrangement is generally constituted by the legs in their storage state, and the unlocking state of the seat manipulation prevention arrange is generally constituted by the legs in their operational state.

The seat arresting member 110 is configured to be operated by the seat trigger member 102 upon triggering thereof by the legs 70 in their operational state. The seat arresting member 110 is manipulable between an arresting state, associated with the locking state of the seat manipulation prevention arrangement 100, and a releasing state, associated with the unlocking state of the seat manipulation prevention arrangement 100. In the arresting state, the seat arresting member 110 arrests the seat manipulation mechanism 60 from manipulation and in the releasing state, the seat arresting member 110 releases arrestment of the seat manipulation mechanism 60 so as to allow manipulation thereof.

In the present example, the seat arresting member 110 comprises a pawl pivotally connected to the lower support 30 and/or the feet portion 54 by a pivot pin 114 and is positioned adjacent to the seat handle interior portion 62B. The seat arresting member 110 comprises an engaging portion 111 at one end and a lever portion 112 at the other end thereof. The lever portion 112 is either directly or indirectly connected to the movable member 104 of the seat trigger member 102, such that movement of the movable member 104 actuates the seat arresting member 110 to pivot about the pivot pin 114. In the depicted example, the lever portion 112 is operably connected to the movable member 104 via cable 101. The seat arresting member 110 can further have a compression spring (not shown) configured to bias the seat arresting member 110 towards the arresting state thereof.

In the arresting state of the seat arresting member 110, the engaging portion 111 is configured to be in mechanical communication with at least a portion of the seat handle 62 so as to prevent the seat handle 62 from being used to manipulate the seat manipulation mechanism 60. In the present example, the seat handle interior portion 62B further comprises a seat handle depression 115 and the engaging portion 111 having an arresting tooth 116 protruding laterally forward about the rear end thereof. The arresting tooth 116 is formed to be received in the seat handle depression 115 of the seat handle 62 such that when the arresting tooth 116 is received therein, the seat arresting member 110 arrests the seat handle 62, and thus the seat manipulation mechanism 60, from being operated by a user to manipulate the upper seat 50 from the upright state to the extended state thereof.

In operation, when the seat trigger member 102 is triggered by legs 70 in the operational state thereof, the movable member 104 is moved by the frontal protrusion 105, which in turn causes the seat arresting member 110 to pivot in a first direction away from the seat handle depression 115 such that the arresting member 110 assumes the releasing state thereof. When the seat trigger member 102 ceases being triggered by the legs 70, (i.e. when the legs 70 are manipulated away or out of the operational state and towards the storage state), the movable member 104 moves back towards the corresponding leg attachment area 42, causing the seat arresting member 110 to pivot in a second direction opposite to the first direction and resulting with the insertion of the arresting tooth 116 into the seat handle depression 115, thus bringing the seat arresting member 110 to its locking state.

In other cases (not shown), the seat manipulation prevention arrangement is configured to prevent, in the locking state thereof, the manipulation of the upper seat towards the extended state by arresting the upper seat. In such cases, in the arresting state, a seat arresting member of the seat manipulation prevention arrangement can be configured to abut the upper seat so as to prevent manipulation thereof. For example, the seat arresting member can be constituted by a bolt which is directly or indirectly connected to the seat trigger member 102. In the arresting state, such a seat arresting member can be configured to be positioned within a corresponding bore located on the feet portion 54 of the upper seat 50 so as to arrest the upper seat 50 from manipulation, and in the releasing state, the seat arresting member can be configured to be removed from the bore when the seat trigger member 102 is triggered by the legs 70.

In yet other cases, the seat manipulation prevention arrangement can be constituted by the legs and/or structures associated therewith. In one example, the seat manipulation prevention arrangement can be constituted by the distal ends of the legs.

In general, when the upper seat of the seat assembly is manipulated from the upright state to the extended state, the corresponding backrest portion of the upper seat is moved from a first position in which the backrest portion is positioned at a first rear angle to a base plane, to a second position in which the backrest portion is positioned at a second rear angle that is smaller than the first rear angle. This manipulation of the backrest from the first rear angle to the second rear angle, associated with the upright and extended states of the upper seat, respectively, can be understood to form a rearward manipulation of the backrest portion. The seat manipulation prevention arrangement may be configured to selectively block the rearward manipulation of the backrest portion. For example, in cases where the distal ends of the legs constitute the seat manipulation prevention arrangement, the distal ends of the legs may be configured to be firmly positioned, in the storage state thereof, in contact with a rear surface of the backrest portion so as to block a rearward manipulation of the backrest portion, thereby preventing manipulation of the upper seat from the upright state to the extended state.

Figure 6:
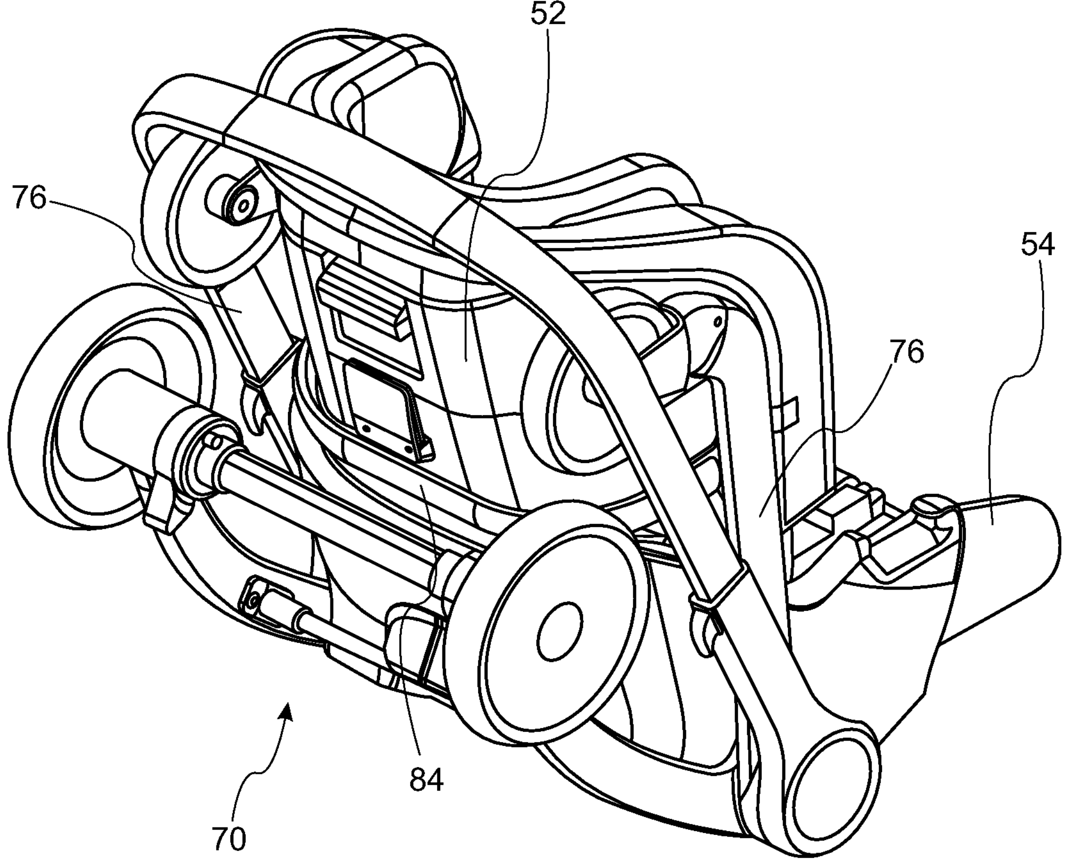
FIG. 6 is a rear perspective view of a seat assembly of FIG. 4A, illustrating a seat manipulation prevention arrangement according to another example of the presently disclosed subject matter.

In one example, and with reference to FIG. 6, the seat manipulation prevention arrangement can comprise a rear bar 84 interconnecting distal ends 71 of the rear leg supports 76. When the legs 70 are in their storage state, the rear bar 84 is configured to be firmly positioned against a rear surface of the backrest portion 52 when in the upright state thereof. As such, the rear bar 84 physically blocks the backrest portion 52 from being manipulated rearwardly, and thereby prevents manipulation of the upper seat 50 from the upright state to the extended state. It is envisaged that a front bar 82 (seen in FIG. 5A) interconnecting distal ends 71 of the front leg supports 74 may also be configured to block the backrest portion 52 from rearward manipulation, thereby preventing the upper seat 50 from being manipulated from the upright state to the extended state. As shown in FIG. 5A, in addition to the front bar 82 interconnecting the distal ends of the front leg supports, a front bar 80 interconnects the front leg supports 74 at locations thereof between the distal and proximal ends of the leg supports.

The manipulation prevention arrangement of the present seat assembly may alternatively or additionally comprise a leg manipulation prevention arrangement configured to prevent manipulation of the leg manipulation mechanism. In the present example, the seat assembly 10 comprises a leg manipulation prevention arrangement 120 configured to prevent manipulation of the legs 70 from the operational state to the storage state at least when the upper seat 50 is in the extended state. Analogous to the seat manipulation prevention mechanism, the leg manipulation prevention arrangement 120 is also configured to change its state between a locking state, in which it prevents the manipulation of the legs 70 towards the storage state, and an unlocking state, in which it enables manipulation of the legs 70 between the operational state and the storage state.

In some cases, the leg manipulation prevention arrangement 120 is configured to prevent, while in the locking state, manipulation of the legs 70 towards the storage state by arresting the leg manipulation mechanism 90. In particular, the leg manipulation prevention arrangement 120 is configured to arrest the legs 70 from manipulation towards the storage state when the upper seat 50 is in its extended state. As such, the leg manipulation prevention arrangement 120 is configured to arrest the leg manipulation mechanism 90 when the legs 70 are in their operational state.

In general, the leg manipulation prevention arrangement can comprise a leg trigger member and a leg arresting member. The leg trigger member may be configured to operate the leg arresting member upon being triggered by the upper seat when in the upright state thereof. Said operation of the leg arresting member by the triggered leg trigger member manipulates the leg arresting member from an arresting state to a releasing state, in which the leg arresting member releases the leg manipulating manipulation mechanism from arrestment thereby. In some cases, the upper seat is configured to trigger the leg trigger member only when the upper seat is in the upright state. The leg trigger member can also be configured to maintain operation of the leg arresting member while the upper seat is in its upright state.

In the present example, best shown in FIGS. 4D and 4E, the leg trigger member is connected to the upper seat 50 and constituted as a portion of the seat manipulation mechanism 60, wherein upon manipulation of the upper seat 50 to the upright state, the leg trigger member is configured to maintain the upper seat 50 in the upright state. More specifically, the leg trigger member may be constituted by the seat locking mechanism 63, and even more specifically by the guiding pin 66 of the upper seat 50 and the elongated guiding slot 41 of the lower support 30. For that purpose, the elongated guiding slot 41 further comprises a slot internal frame 123 extending through the length of the elongated guiding slot 41 in an inner portion thereof. The slot internal frame 123 is configured to form depth differences from a frontmost edge of the elongated guiding slot 41 up to a distance from a rearmost edge thereof, such that the guiding pin 66 can only be partially inserted into the elongated guiding slot 41 while positioned against the slot internal frame 123. At the rearmost edge, the slot internal frame 123 defines a slot depression 124 having a greater depth then the slot internal frame 123. The slot depression 124 is configured to receive therein a larger portion of the lockable portion 67B of the guiding pin 66 than the rest of the elongated guiding slot 41.

Thus, the leg trigger member is configured to 'identify' a state of the upper seat 50 based on the depth to which the guiding pin 66 is inserted into the elongated guiding slot 41. In particular, when the upper seat 50 is in its upright state, which is associated with the unlocking state of the leg manipulation prevention arrangement 120, the leg trigger member is inserted within the slot depression 124 (FIG. 4D), which insertion triggers the leg trigger member to operate the leg arresting member to manipulate it to its releasing state such that the legs 70 can be manipulated between the operational and storage states. Correspondingly, when the upper seat 50 is not in its upright state, which is associated with the locking state of the leg manipulation prevention arrangement 120, the leg trigger member is inserted within the elongated guiding slot 41 against the slot internal frame 123 (e.g., FIG. 4E), wherein the leg trigger member is not triggered by the upper seat 50 and thus does not operate the leg arresting member and thus the legs are prevented from manipulation towards the extended state. As such, when the upper seat 50 is in the upright state, the leg manipulation prevention arrangement 120 is in its unlocking state and thus the legs are manipulable between the operational and storage states When the upper seat 50 is not in the upright state (e.g., it is in the extended state), the leg manipulation prevention arrangement 120 is in its locking state and thus the legs are prevented from manipulation to the operational state.

A leg arresting member 130 of the leg manipulation prevention arrangement 120 is configured to have an arresting state, in which the leg arresting member 130 arrests the leg manipulation mechanism 90, and a releasing state, in which the leg manipulation mechanism 90 is released from the arresting of the leg arresting member 130. The leg arresting member 130 is configured to change states via operation by the leg trigger member, to which it is connected either directly or indirectly. The leg arresting member 130 is manipulable between an arresting state associated with the locking state of the leg manipulation prevention arrangement 120, and a releasing state associated with the unlocking state of the leg manipulation prevention arrangement 120. In the arresting state, the leg arresting member 130 arrests the leg manipulation mechanism 90 from manipulation and in the releasing state, the leg arresting member 130 allows manipulation of the leg manipulation mechanism 90.

In the present example, shown in FIG. 5B, the seat assembly 10 comprises a pair of leg arresting members 130, each designed similarly to the seat arresting member 110, being formed by a pawl having an engaging portion 131 at one end and a lever portion 132 at a second end thereof. The leg arresting members 130 are pivotally connected to the upper seat 50, and specifically to the backrest portion 52 by a pivot axis 134 located at the respective centers thereof. Each leg arresting member 130 is also connected, at the lever portion 132 thereof, either directly or indirectly to the holder portion 67A of the guiding pin 66 (i.e., the leg trigger member). The leg arresting members 130 are connected to the holder portion 67A such that manipulation of the holder portion 67A, i.e., by sliding the guiding pin 66 along the elongated guiding slot 41, results in pivoting of the leg arresting members 130.

In some cases which are not illustrated herein, the leg arresting members 130 can further comprise an arresting spring (not shown) designed to bias the leg arresting members 130 to the arresting states thereof.

In general, in the arresting state, the engaging portion 131 of a leg arresting member 130 is designed to abut/contact at least a portion of the leg handle 92 so as to prevent the leg handle 92 from being used to manipulate the leg manipulation mechanism 90. In the present example, the leg handle interior portion 92B further comprises a leg handle depression 135 and the engaging portion 131 having an arresting tooth 136 protruding laterally forward about the rear end thereof. The leg handle depression 135 is formed to receive the arresting tooth 136 of the engaging portion 131 of the leg arresting member 130, such that when it is received inside the leg handle depression 135, the leg arresting member 130 arrests the leg handle 92, and thus the leg manipulation mechanism 90, from being operated by a user to manipulate the legs 70 from the operational state to the storage state thereof.

In operation, when the leg trigger member is triggered by the upper seat 50, (i.e. when the upper seat 50 is manipulated to the upright state thereof), the guiding pin 66 is inserted into the slot depression 124 (by the compression forces applied thereon by the pin holder 64), thus causing the leg arresting member 130 to pivot in a first direction away from the leg handle depression 135 such that the leg arresting member 130 assumes the releasing state thereof. When the leg trigger member is withdrawn from the slot depression 124 and slid along and within the elongated guiding slot 41 (i.e. when the upper seat 50 is manipulated from the upright state thereof), the holder portion 67A is distanced from the pin holder 64 causing the leg arresting member 130 to pivot in a second direction opposite the first direction and into the leg handle depression 135, thus bringing the leg arresting member 130 to the locking state thereof. Thereby the leg arresting member 130 arrests the leg handle 92 to prevent a user from operating the leg manipulation mechanism 90 to manipulate the legs 70.

In other cases (not shown), the leg manipulation prevention arrangement 120, in the locking state thereof, can be configured to prevent the manipulation of the legs 70 towards the storage state by arresting the legs 70. In such cases, in the arresting state thereof, the leg arresting member 130 can be configured to abut/contact the legs 70 so as to prevent manipulation thereof. In such cases the leg arresting member 130 can be constituted by the upper seat 50 in its extended state, and more specifically, by the backrest portion 52 thereof.

For example, in the extended state thereof, the backrest portion can physically prevent manipulation of the legs 70 to the storage state by blocking at least a portion thereof from moving to its position in the storage state. In this example, the backrest portion 52 can be used to prevent the rear bar 84 of the pair of rear leg supports 76 from reaching to the position thereof in the storage state, and thus forcing the legs 70 to be maintained in the operational state thereof.

The convertible baby safety car seat assembly according to the presently disclosed subject matter can comprise one or more side protection modules configured to provide the seat assembly with side impact protection. More particularly, the side protection module is configured for absorbing at least a part of the energy of an impact thereupon. As an example, at least when the seat assembly is in its storage or car seat mounting mode and is positioned within a car adjacent a side door of the car, in the scenario of an impact from the door of the car on the assembly, the side protection module mounted on the side of assembly facing the car door would absorb at least a part of the energy of the impact, thereby preventing the infant seated in the assembly against injury.

In general, the seat assembly can include a seat having a backrest portion and a feet portion. In some examples, the seat can be constituted by a lower support and an upper seat portion having structure and being operable together in the manner similar to as described herein above with respect to assembly 10. In some examples, the seat can be constituted by a lower support and an upper seat portion integrally or unitarily formed together. Accordingly, the below description of the seat applies to any seat having a handle attachment area for connecting a handle to the seat and having an upper seat portion for allowing an infant to be seated therein and a lower support for providing mechanical strength to the seat.

The assembly comprises a handle pivotally connected to the seat at the handle attachment area of the seat. The connection allows the handle to pivot between a plurality of positions to take at least the anti-rebound or stroller state, the carrier state, and the storage state. The handle can have a seat-connection portion at which the handle is connected to the seat and comprises a seat-facing area facing the handle attachment area and an opposite exterior-facing area. The connection of the handle and the seat can be by any suitable connection arrangement including mechanical, electrical, or magnetic connections allowing pivoting of the handle between a plurality of different positions.

It is to be understood herein that the handle is connected to the seat at both the lateral sides of the seat and for the sake of conciseness only one side of the seat, the corresponding handle attachment area, and the corresponding portion of the handle is described herein, and the description thereof applies to the other side as well. Also, the seat assembly can include two side protection modules, one on each side of the handle/seat, and only one has been described herein for sake of conciseness. The description of one side protection module applies to the other side protection module well.

The side protection module can be selectively mountable to the handle at the exterior-facing area of the handle, such the side protection module extends in a lateral direction of the seat to an extent greater than the handle. The connection of the side protection module and the handle can be by any suitable connection arrangement including mechanical, electrical, or magnetic connections allowing the side protection module to be pivotable together with the handle when connected thereto, while allowing for selective attachment and detachment of the side protection module. It is to be understood that the handle is pivotally connected at the handle attachment area, thereby making the handle attachment area bulky and structurally complex, and mounting the side protection module at the portion of the handle connected to the handle attachment area, to be pivotable together therewith, requires a complex structure of the connection arrangement.

In the present example illustrated by FIGS. 7A to 7H, the convertible baby safety car seat assembly 210 comprises a seat 202 constituted by the upper seat portion 250 and the lower support 230. It is to be understood herein that although the seat assembly 210 has been shown to be in the storage mode, it can have an operational mode similar to that described herein above with respect to the seat assembly 10. In fact, the seat assembly 210 can include some or all of the features of the seat assembly 10 described above, for example related to the modes, and the corresponding description of the operational and storage modes of the assembly 10 and operational and storage state of the legs 70 applies to the assembly 210 and the legs 270.

The seat 202 has two lateral sides 202A and 202B, each having a corresponding handle attachment area 205 at which the handle 212 is pivotally connected. For instance, the two seat-connection portions 213 at each side of the handle 212 are connected to the handle attachment areas 205 at the two lateral sides 202A and 202B of the seat 202. The seat connection portion 213 comprises a seat-facing area 213A facing the handle attachment area 205 and an opposite exterior-facing area 213B.

The side protection modules 206 are shown as being mounted to the corresponding sides of the handle 212. As can be seen in FIGS. 7C, 7D, and 7E showing the handle 212 in the anti-rebound state, the carrier state, and the storage state respectively, the side protection module 206 is pivotable together with the handle 212.

In general, the side protection module 206 can have an elongated shape extending along a longitudinal axis, such that the side protection module can have a longitudinal dimension extending along the longitudinal axis, which is longer than a lateral dimension extending transverse the longitudinal axis. The elongated shape can be rectangular, polygonal, triangular, oval, elliptical, egg-shaped, teardrop shape, or the like.

The side protection module engages the handle at least at two portions, more particularly fixedly engages at least at two portions extending at least partially along the longitudinal axis. Thus, the side protection module comprises a first handle engaging portion and a second handle engaging portion spaced from each other at least partially along the longitudinal axis, and the handle comprises, at the exterior facing area, corresponding first module engaging portion for engaging the first handle engaging portion and second module engaging portion for engaging the second handle engaging portion. At least one of the two engagements can be a connection to mount the side module to the handle, and at least one of the two engagements can be an orientation-fixation to fix the orientation of the side module with respect to the handle such that the side module is pivotable together with the handle.

For instance, the engagement of at least one of the first and second handle engaging portions with the corresponding first and second module engaging portions can constitute a connection arrangement for mounting the side protection module onto the handle. The connection arrangement can include a handle connection element positioned at least one of the first and second handle engaging portions and a corresponding module connection element positioned at least one of the first and second module engaging portions. The connection elements can be detachably connected to each other such that the connection arrangement can constitute a quick release mechanism. In general, the connection arrangement can have any suitable structure allowing the detachable connection of the side protection module to the handle. For example, the connection arrangement can be a mechanical, electrical, or magnetic connection arrangement constituting a quick release mechanism.

Further, the engagement of at least one of the first and second handle engaging portions with the corresponding first and second module engaging portions can constitute an orientation fixing mechanism that whether or not participate in mounting the side protection module to the handle, fixes the orientation of the side protection module with respect to the handle. In general, the orientation fixing mechanism can comprise a first part positioned at the side protection module and a second part positioned at the handle. The first and second parts can so engage with other to prevent relative pivoting therebetween so as to fix the orientation to allow the side protection to pivot together with the handle. The orientation fixing mechanism can include any suitable structure to fixedly engage the first part and the second part to prevent relative pivoting of one with respect to the other, without necessarily connecting them to each other. In some examples, the orientation fixing mechanism can be constituted by a connection arrangement.

Figure 7A:
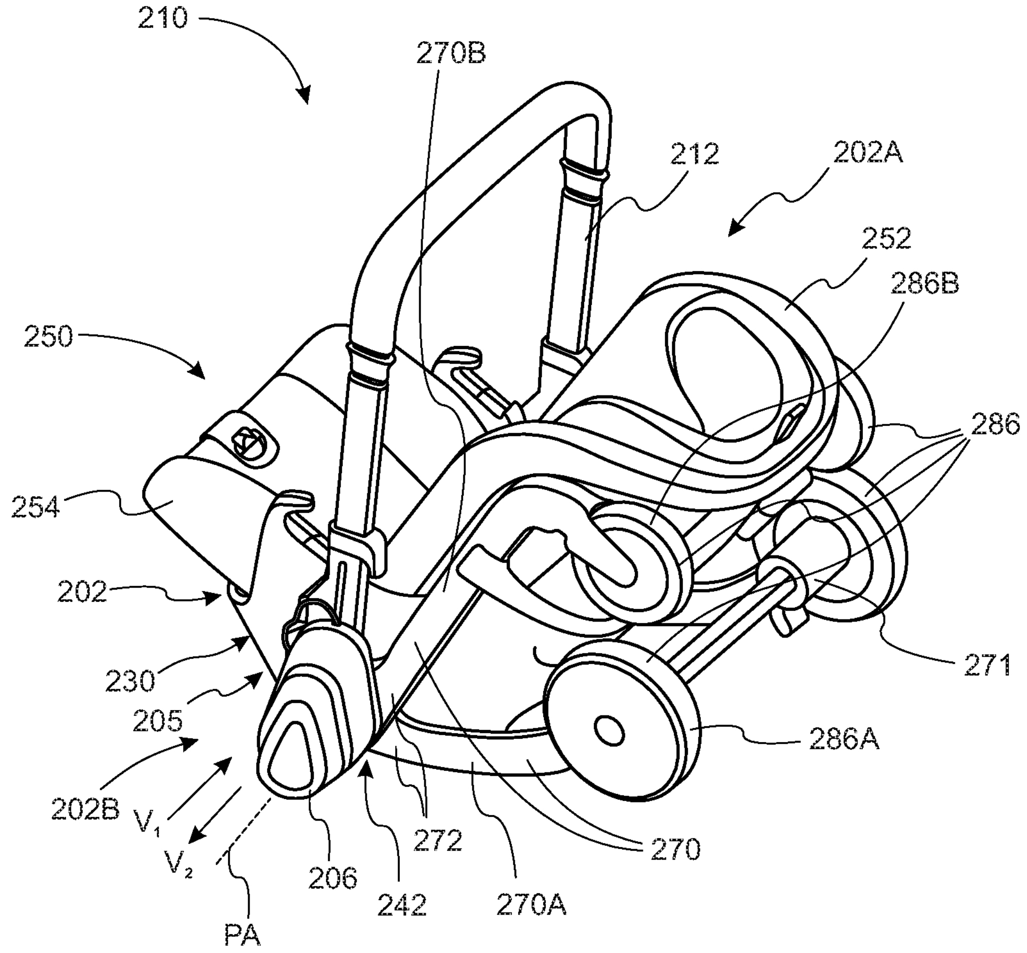
FIG. 7A is a rear perspective view schematically showing a baby safety car seat assembly in a storage mode according to one example of the presently disclosed subject matter, with a side protection module.
Figure 7B:
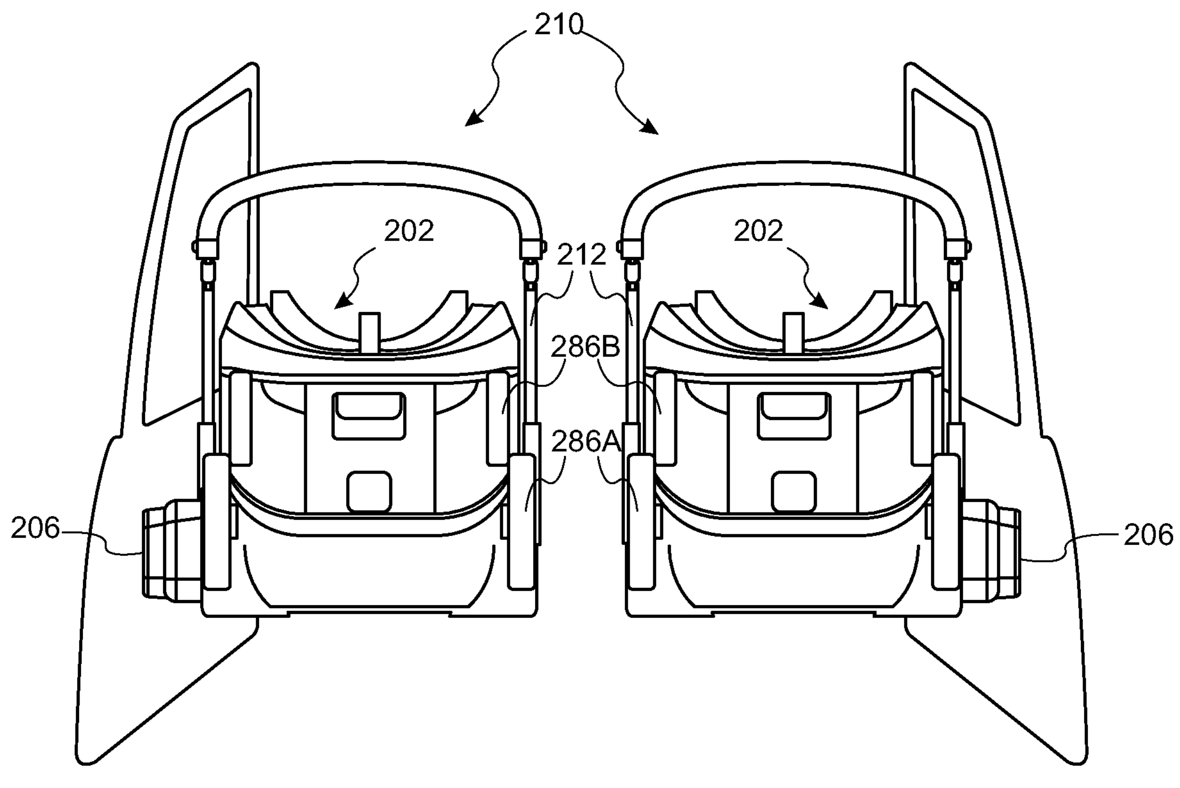
FIG. 7B is a rear view schematically showing two baby safety car seat assemblies, each in a storage mode positioned within a car according to one example of the presently disclosed subject matter, each with a side protection module.
Figure 7C:
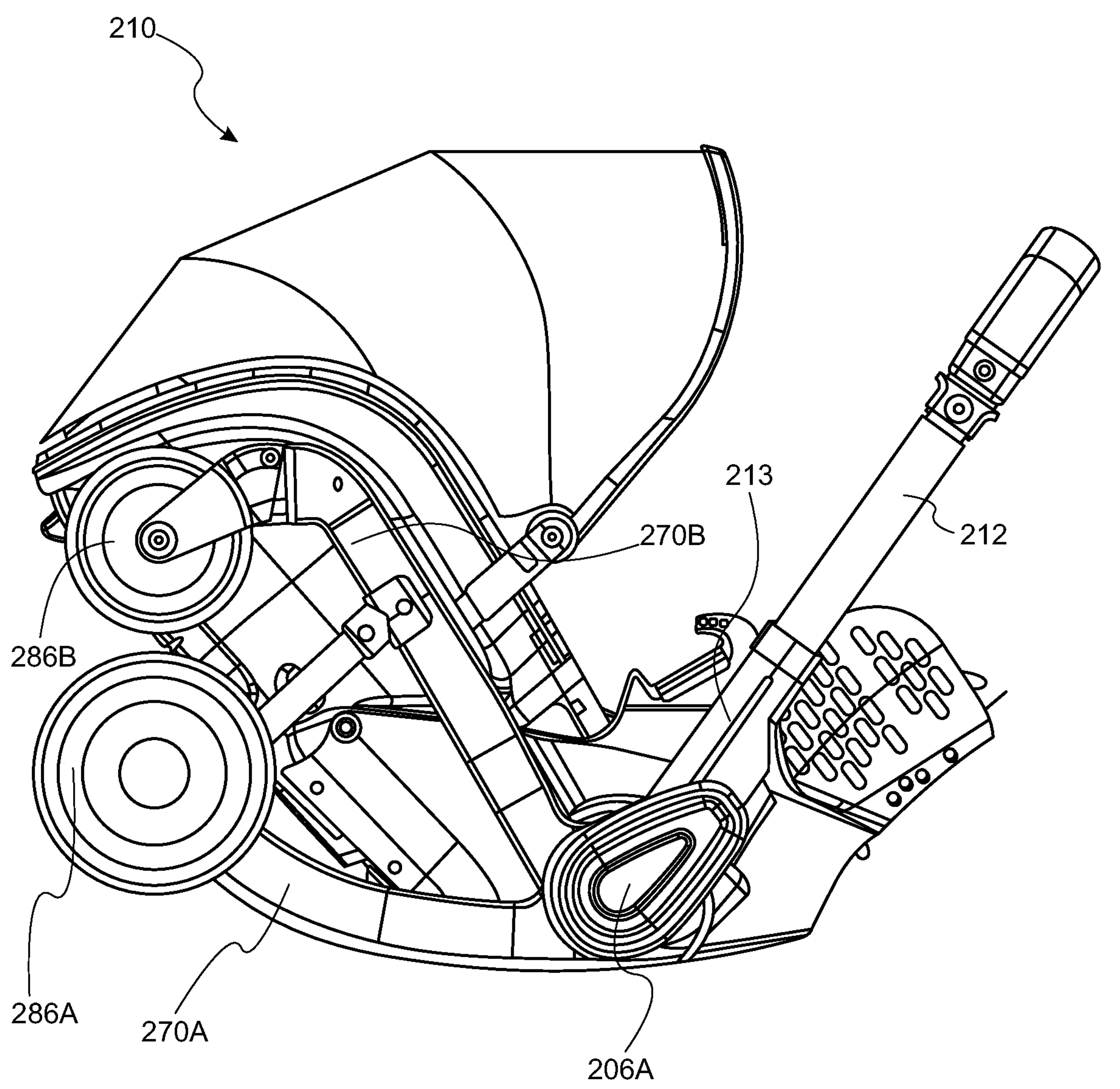
FIG. 7C is a side view of a baby safety car seat assembly in a storage mode with its handle in an anti-rebound state according to one example of the presently disclosed subject matter, with a side protection module.
Figure 7D:
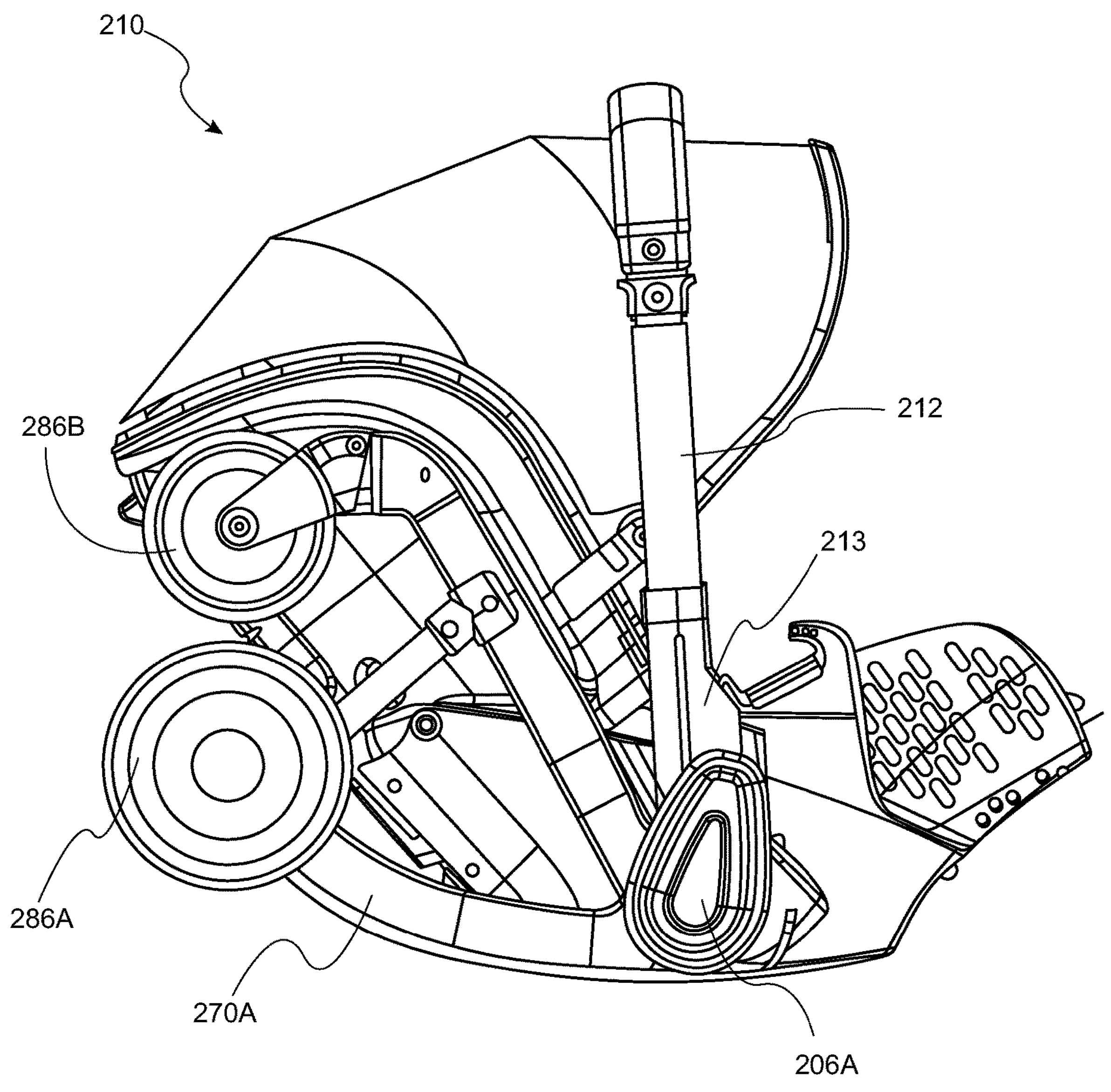
FIGS. 7D and 7E are side views of the baby safety car seat assembly of FIG. 7C with the handle in carrier state and storage state respectively.
Figure 7E:
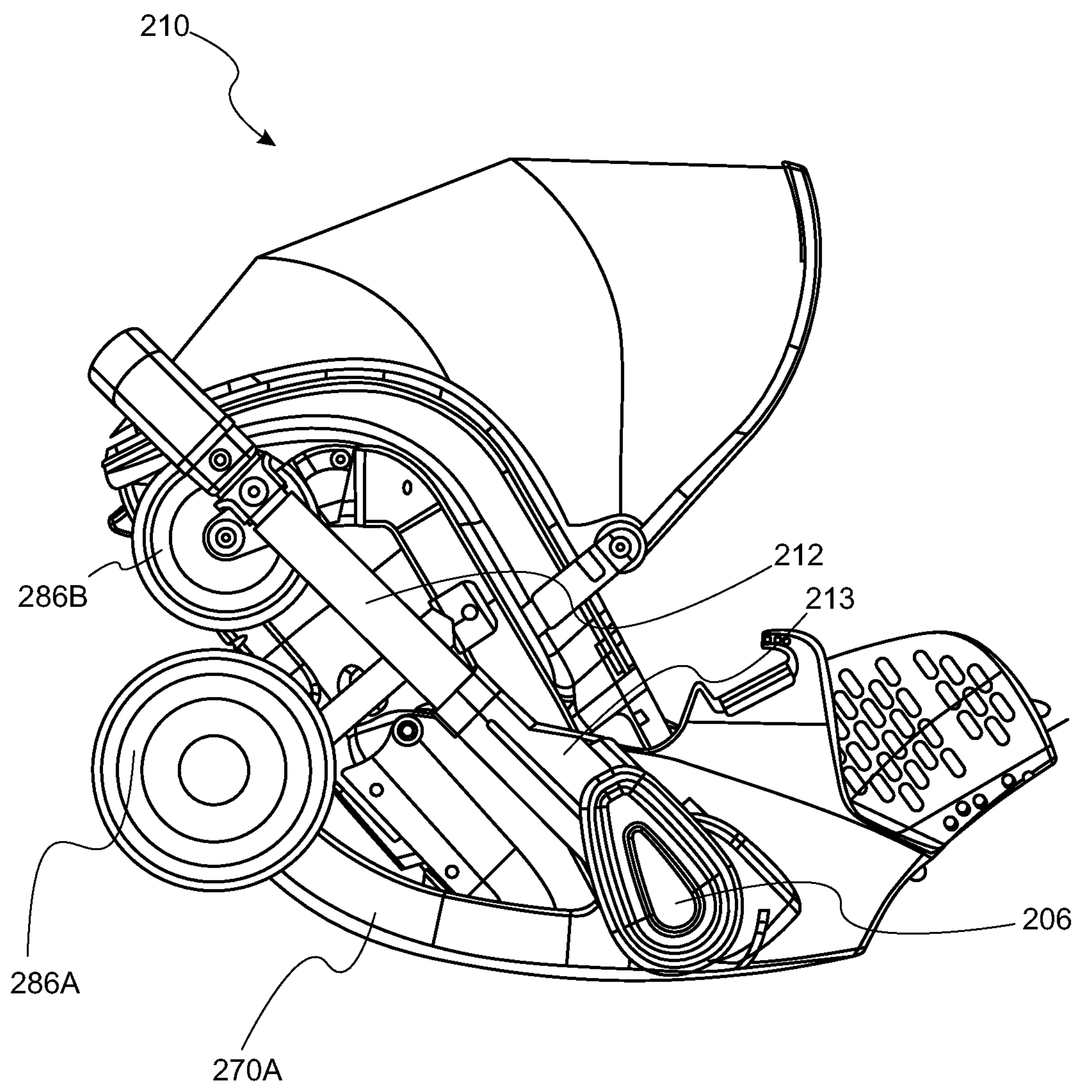
Figure 7F:
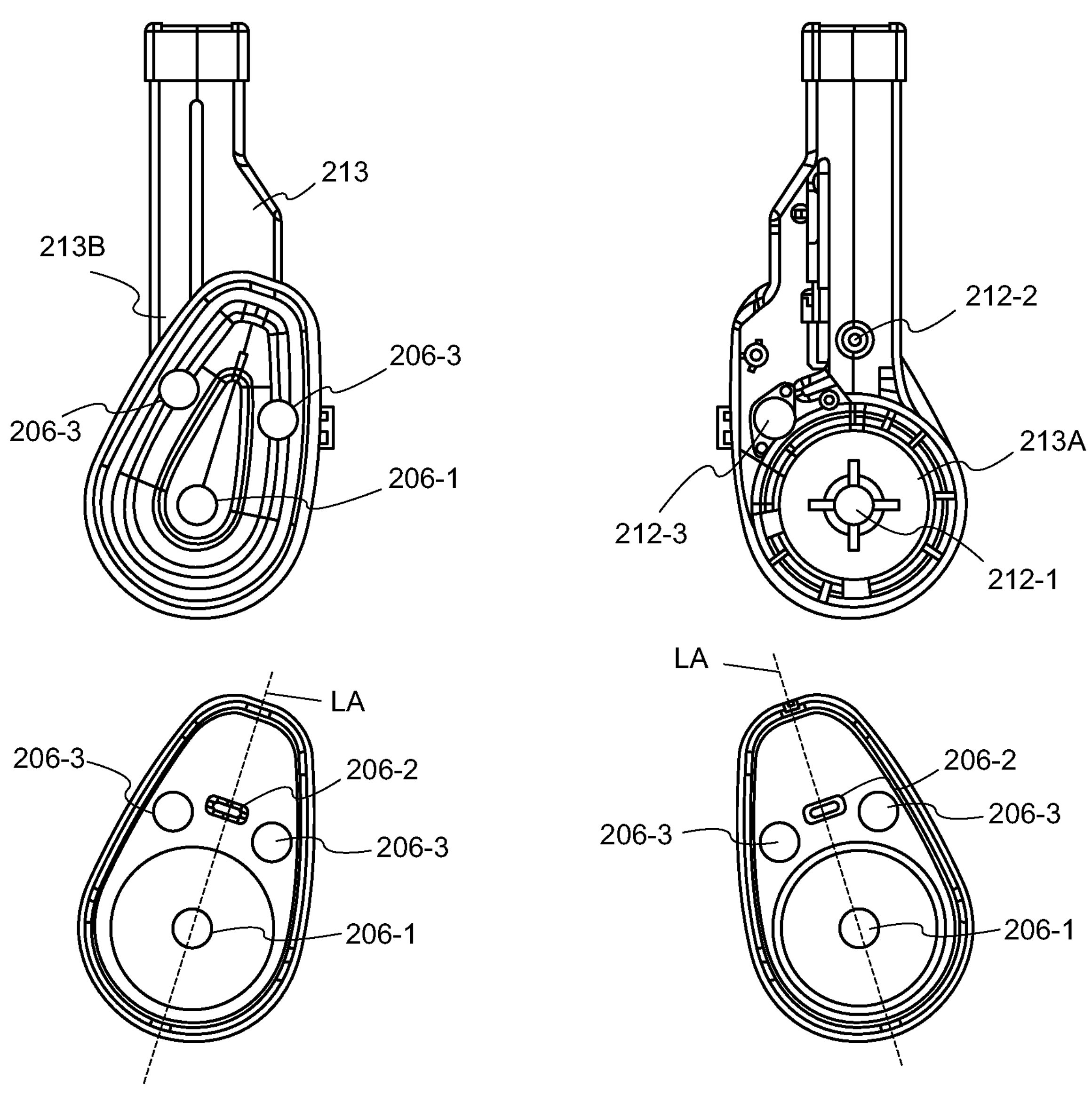
FIG. 7F illustrates different views of the handle and side protection module of the baby safety car seat assembly of FIG. 7C.

In the present example illustrated by FIGS. 7A to 7H, the side protection module has an elongated shape having a longitudinal axis LA. The side protection module 206 and the seat connection portion 213 of the handle 212 have been shown as having handle engaging portions and module engaging portions respectively. FIG. 7F shows different views of the side protection module 206 and the seat connection portion 213, in which the upper left part of FIG. 7F shows a cross-section view of the side protection module 206 mounted to the handle 212, taken along a plane perpendicular to a pivot axis PA of the handle and as seen in a lateral direction extending along the pivot axis PA into the side protection module from a laterally outermost area thereof, represented by viewing direction V1 (FIG. 7A). The upper right part of FIG. 7F shows a cross-section view of the handle 212, taken along a plane perpendicular to a pivot axis PA of the handle and as seen in a lateral direction extending along the pivot axis PA from the seat-facing area to the exterior facing area of the handle 212, represented by viewing direction V2 (FIG. 7A). The lower left part of FIG. 7F shows a cross-section view of the side protection module 206 detached from the handle 212, taken along a plane parallel to the plane along which the view of the upper left part of FIG. 7F is taken and positioned further towards an interior surface of the side protection module that faces the handle when connected thereto, and as seen in the same direction as the upper left part of FIG. 7F. The lower right part of FIG. 7F shows a cross-section view of the side protection module 206 detached from the handle 212, taken along the same plane along which the view of the lower left part of FIG. 7F is taken, and as seen in the same direction as the upper right part of FIG. 7F.

As can be seen in FIG. 7F, the side protection module 206 comprises the first handle engaging portion 206-1 and the second handle engaging portion 206-2 spaced along the longitudinal axis LA, and the handle comprises the first module engaging portion 212-1 and the second module engaging portion 212-2. In the present example, the first handle engaging portion 206-1 and the first module engaging portion 212-1 constitute a magnetic-connection mechanism, of which one is magnet and the other one can be magnet or a magnetic element (which is not necessarily a magnet but gets attracted to a magnet). The magnet(s) and/or the magnet and the magnetic element constitute the handle connection element and the module connection element. Further, in the present example, the second handle engaging portion 206-1 and the second module engaging portion 212-1 constitute an orientation fixing mechanism, in which the second handle engaging portion 206-2 is a recess constituting the first part of the orientation fixing mechanism and the second module engaging portion 212-2 is a protrusion constituting the second part of the orientation fixing mechanism for being received within the recess when the side protection module 206 is mounted to the handle 212, such as the side protection module 206 cannot rotate/pivot with respect to the handle 212, and thus the orientation of the side protection module 206 is fixed with respect to the handle 212.

In general, the side protection module can comprise at least one third handle engaging portion positioned offset the longitudinal axis, and the exterior-facing area of the handle can comprise corresponding at least one third module engaging portion configured for engaging the at least one third handle engaging portion when the side protection module is mounted to the handle. The engagement of the at least one third handle engaging portion with the corresponding at least one third module engaging portion can constitute a connection arrangement that can include a handle connection element positioned at the at least one third handle engaging portion and a corresponding third module connection element positioned at the at least one third module engaging portion. The connection elements can be detachably connected to each other such that the connection arrangement can constitute a quick release mechanism. In general, the connection arrangement can have any suitable structure allowing the detachable connection of the side protection module to the handle. For example, the connection arrangement can be a mechanical, electrical, or magnetic connection arrangement constituting a quick release mechanism. In some examples, the engagement of the at least one third handle engaging portion with the corresponding third module engaging portion can constitute an orientation fixing mechanism that whether or not participate in mounting the side protection module to the handle, fixes the orientation of the side protection module with respect to the handle. In general, the orientation fixing mechanism can comprise a first part positioned at the side protection module and a second part positioned at the handle. The first and second parts can so engage with other to prevent relative pivoting therebetween so as to fix the orientation to allow the side protection to pivot together with the handle. The orientation fixing mechanism can include any suitable structure to fixedly engage the first part and the second part to prevent relative pivoting of one with respect to the other, without necessarily connecting them to each other.

In some cases, the side protection module can comprise two third handle engaging portions each being offset the longitudinal axis and positioned on opposite sides thereof. The handle can include only one third module engaging portion that engages one of the two third handle engaging portions depending on which side of the handle is the side protection module being connected to. For instance, the third module engaging portion of the left side of the handle can engage one of the two third handle engaging portions, and the third module engaging portion of the right side of the handle can engage the other one of the two third handle engaging portions. This structure and positioning of the third handle engaging portions and the module engaging portion allows the side protection modules to be usable at both sides of the seat, and eliminates the need for manufacturing different side protection modules for different sides of the seat.

In the present example, as can be best seen in FIG. 7F, the side protection module 206 comprises two third engaging portions 206-3 and the handle has one third module engaging portion 212-3. In the present example, each of the third handle engaging portions 206-3 and the third module engaging portions 212-3 constitute a magnetic-connection mechanism, of which one is magnet and the other one can be magnet or a magnetic element (which is not necessarily a magnet but gets attracted to a magnet). The magnet(s) and/or the magnet and the magnetic element constitute the handle connection element and the module connection element. The third module engaging portion 212-3 engages one of the two third handle engaging portions 206-3 depending on which side (left or right) of the handle 206 is the side protection module 206 being connected to.

In general, the side protection module can comprise more than one parts, i.e., at least a first module part selectively mountable to the handle and at least a second module part selectively mountable to the first module part. The side protection module can comprise a locking arrangement for selectively locking the first and second module parts with each other when the second module part is mounted to the first module part. The first and second module parts can be connected to each other by any suitable mechanical, electrical, or magnetic connection arrangement. The locking arrangement can have any suitable structure to prevent detachment of the second module part from the first module part when locked. The side protection module being formed in two parts allows selecting the lateral extension thereof from the seat, for example depending on the availability of space in the car.

Figure 7G:
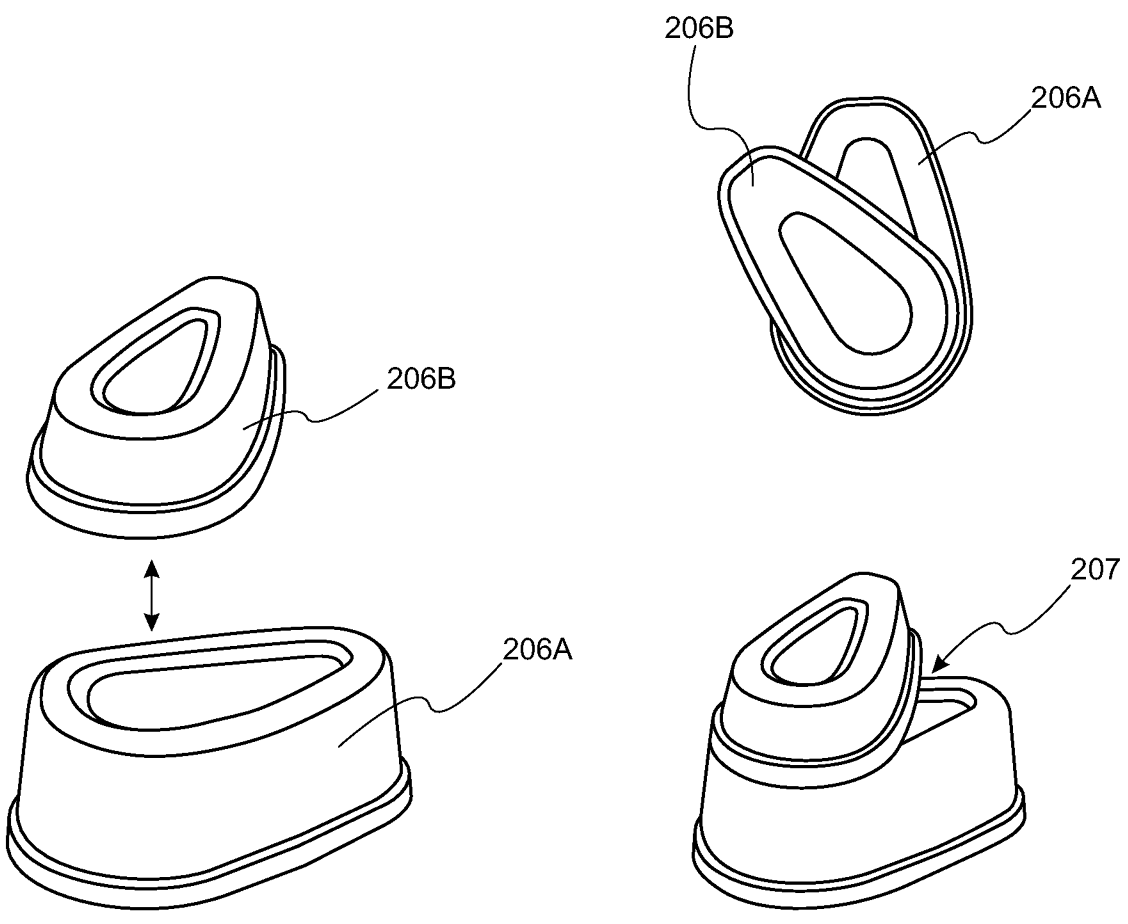
FIG. 7G illustrates different views of a side protection module having two module parts according to one example of the presently disclosed subject matter.
Figure 7H:
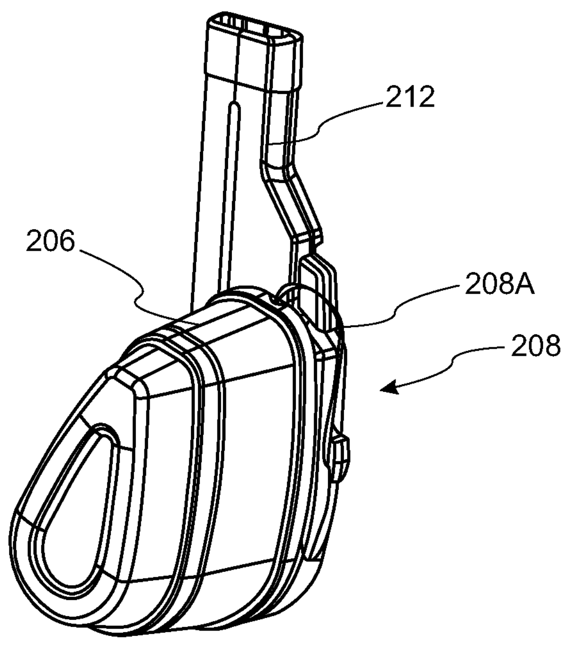
FIG. 7H is a side perspective view of a side protection module further connected to a handle by a cable-connection arrangement according to one example of the presently disclosed subject matter.

In the present example, as can be best seen in FIG. 7G, the side protection module 206 comprises a first module part 206A selectively mountable to the handle 212 and a second module part 206B selectively mountable to the first module part 206A. The side protection module 206 further comprises a locking arrangement 207 for selectively locking the first and second module parts 206A and 206B with each other when the second module part 206B is mounted to the first module part 206A. In the present example, the locking arrangement 207 is so structured to be displaceable between a locked state in which it prevents the detachment of the first and second module parts 206A and 206B and an unlocked state in which it allows the detachment of the first and second module parts 206A and 206B, by pivoting the second module part 206B with respect to the first module part 206A.

In general, the assembly can further comprise a cable-connection arrangement for connecting the side protection module to at least one of the handle and the seat when the side protection module is mounted to the handle. The cable-connection arrangement can comprises a cable having a first end connectable to the side-protection module and a second end connectable to the at least one of the handle and the seat. In some examples, the second end can be connected at the legs instead of the handle or the seat. The cable connection arrangement prevents the side protection module from flying off in the event of a sudden impact thereupon. For instance, if the quick-release mechanism fails to withstand the impact and the side protection module gets detached from the handle, the side protection module would not fly off and would instead be suspended from the handle or the seat by virtue of the cable connection arrangement. In the present example, the cable connection arrangement 208 can be best seen in FIG. 7H as having a cable 208A connected at one end thereof to the side protection module 206 and the other end to the handle 212.

In general, the assembly can further comprise legs having distal ends with wheels and opposite proximal ends connected to the seat at leg attachment areas thereof. The leg attachment area can constitute a part of the upper seat or the lower support, and is positioned on both the right left sides of the seat. The legs can constitute a front pair of legs and a rear pair of legs, and at least one of the front and rear pair of legs can be connected to the seat at the leg attachment area. The leg attachment area can at least partially overlap with the handle attachment area, and optionally with the side protection module, when mounted to the handle, in the side view of the assembly. For example, a lateral axis parallel to the pivot axis of the handle passes through at least a portion of the handle attachment area and at least a portion of the leg attachment area, and optionally through at least a portion of the side protection module, when mounted to the handle.

This overlapping of the handle attachment area and the leg attachment area provides a thick layer of material at the area where the side protection module is to be mounted, thereby providing an enhanced protection from the side impact. It is to be understood that the attachment of the legs as well as the handle at an area and both being independently pivotable makes that area bulky and structurally complex having a thick layer (thick in the lateral direction) of material. Further, mounting the side protection module at the portion of the handle connected at the handle attachment area makes that area even more bulky and having a thicker layer of material thereby increasing the energy-absorbing ability of that area in the event of a side impact.

In addition to the side protection module 206, a wheel can also constitute an additional side protection module. For instance, when the legs are in their stored state, the wheels are positioned on the lateral sides of the seat, allowing at least one wheel of the rear and front wheels to constitute an additional side protection module on both lateral sides of the seat.

Figure 13A:
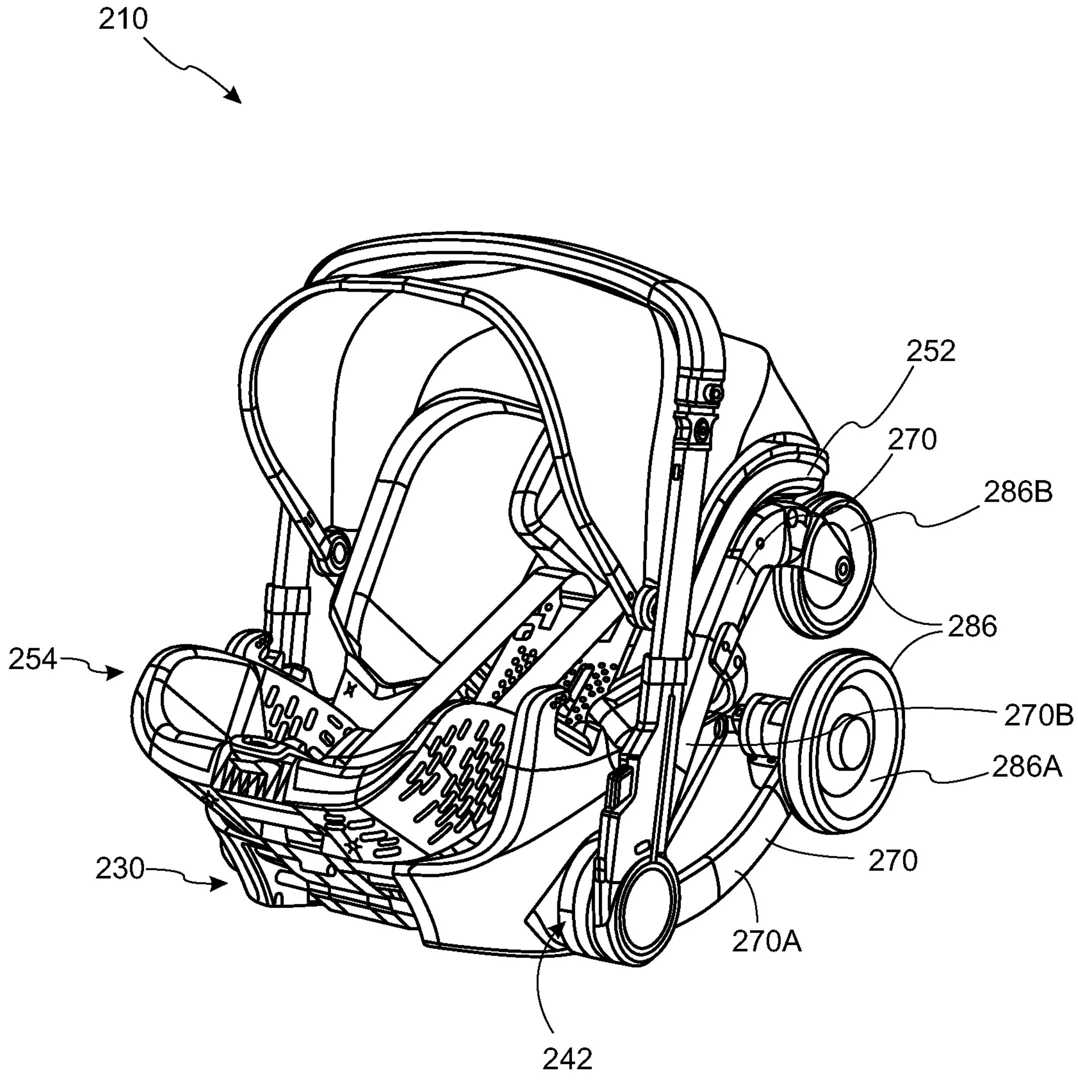
FIG. 13A is a front perspective view of a baby safety car seat assembly in a storage mode according to one example of the presently disclosed subject matter.
Figure 13B:
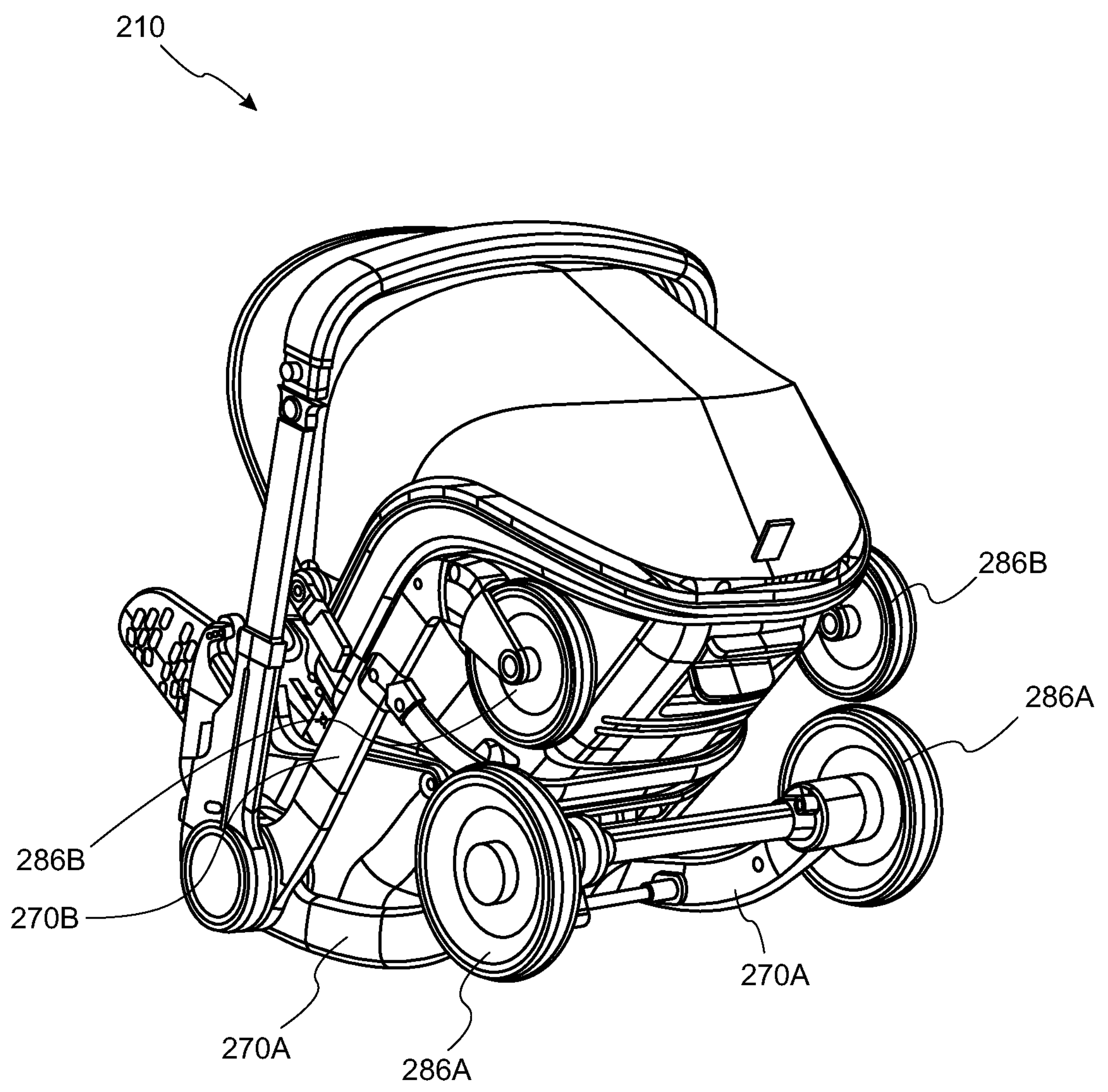
FIG. 13B is a rear perspective view of the baby safety car seat assembly of FIG. 13A.

In the present example, the legs 270 have distal ends 271 with wheels 286 and the proximal ends 272 connected at the leg attachment area 242 (can be best seen in FIG. 13A), only one of which is visible in FIGS. 7A to 7E. The leg attachment area 242 overlaps with the handle attachment area 205 in the side view of the assembly (FIGS. 7C to 7E). In other words, in the side view of the assembly, one of the leg attachment area 242 and the handle attachment area 205 at least partially blocks the view of the other one of the leg attachment area 242 and the handle attachment area 205.

In the present example, in the storage state of the legs (FIGS. 7A to 7E) the front wheel 286A of the front leg 270A protrudes sidewards from the seat 202, to a greater extent than the rear wheel 286B of rear leg 270B on the same side of the seat 202, and constitutes an additional side protection module. In some examples, the rear wheel may protrude sidewards from the seat, to a greater extent than the front wheel on the same side of the seat, and constitute an additional side protection module.

The pivoting of the legs between the operational state and the storage state has been described herein above with respect to the legs 70 of the assembly 10, and the description thereof applies to the legs 270 as well. For instance, the legs 270, in a manner similar to the legs 70, are pivotable rearwardly towards the backrest portion 252 of the seat for being manipulated from the operational state to the storage state such that in the storage state said distal ends 271 are positioned closer to the backrest portion 252 than the feet portion 254 of the seat 202.

The convertible baby safety car seat assembly according to the presently disclosed subject matter can comprise a zipper arrangement which enables both a fabric cover and a canopy to be independently zipped to a backrest portion thereof. In fact, the zipper arrangement can be used with any baby seat having detachably connectable fabric cover and canopy and the description below should thus be considered as applicable to any such seat having a backrest portion comprising a shell made of plastic and having an external side and an internal side to which a fabric cover can be applied so as to at least partially cover the internal side of the shell. The plastic shell of the seat can comprise a back wall and two sidewalls, each of these three walls having corresponding inner and outer surfaces which merge at respective upper edges. Together, the respective upper edges of the back wall and the sidewalls merge to form a continuous upper edge of the shell. In other words, the continuous upper edge of the shell is defined by the upper edges of the respective backwall and sidewalls.

The zipper arrangement can comprise two zippers, each being of separating zipper type. The zipper arrangement can include a cover zipper and a canopy zipper, each having a shell zipper half sewn to the shell, e.g. along and adjacent at least a portion of the shell upper edge, and a matching zipper half, the matching zipper half of the cover zipper being sewn to the fabric cover, and the matching zipper half of the canopy zipper being sewn to the canopy. As such, the fabric cover and the canopy can both be zipped, with their zipper parts to the respective ones of the shell zipper halves sewn to the shell.

Each of the two halves of each of the canopy and cover zippers has a teethed portion with zipper teeth and a base portion free of such teeth, the base portions being used for sewing the zipper half to the shell or to the cover/canopy, while leaving the teethed portions flappable. The shell zipper half of each of the cover and canopy zippers is sewn to the shell at the base portion thereof by means of at least one sewing seam. This allows the teethed portions of the shell halves of the cover and canopy zippers to be flappable independently from each other so that they can be spaced apart when attaching the cover and the canopy.

The base portion of the shell zipper half of the canopy zipper can be located at least partially between the shell outer surface and the shell zipper half of the cover zipper, e.g. the base portion of the cover zipper. Optionally, the shell zipper halves of the two zippers can be sewn to the shell together, i.e. by at least one common sewing seam.

The teeth of the teethed portions of the shell halves of the two zippers can be spaced from the shell upper edge to about the same or different distances. In the latter case, the teeth of the shell zipper half of the cover zipper can be spaced from the upper edge of the shell to a greater distance than that of the canopy zipper. In any case, the teeth portions of the shell halves of the two zippers can be generally parallel to one another and to the shell upper edge.

In some cases, the two zippers can be configured to be fastened in opposite directions, for example the canopy zipper is configured to be fastened from a first side wall of the shell towards the second side wall of the shell, and the cover zipper can be configured to be fastened from the second side wall of the shell towards the first side wall. Such arrangement, in which each of the zippers is fastened from a different direction, may facilitate use, e.g. upon connecting or removing the canopy or the cover.

In some cases, the zippers differ in length. The canopy zipper may extend to a shorter length than the cover zipper, with the cover zipper extending further along the two sidewalls of the shell. Optionally, the canopy zipper, when fastened, is at least partially layered above the fastened cover zipper, so that when the canopy is connected to the seat, only the canopy zipper is visible from the exterior of the seat. When the canopy is connected, the cover zipper is not accessible at least along a portion of its length. This may reduce a likelihood of unintended removal of the cover from the seat, and may prevent removal of the cover before the canopy had been removed.

The cover zipper can be located at the backrest portion of the seat, without extending further (for example the cover zipper does not extend to the feet portion). This may provide a potential manufacturing advantage in that the cover zipper is sewn to the shell along a shorter distance than would have been required if the zipper was to extend to the feet portion as well.

Figure 8A:
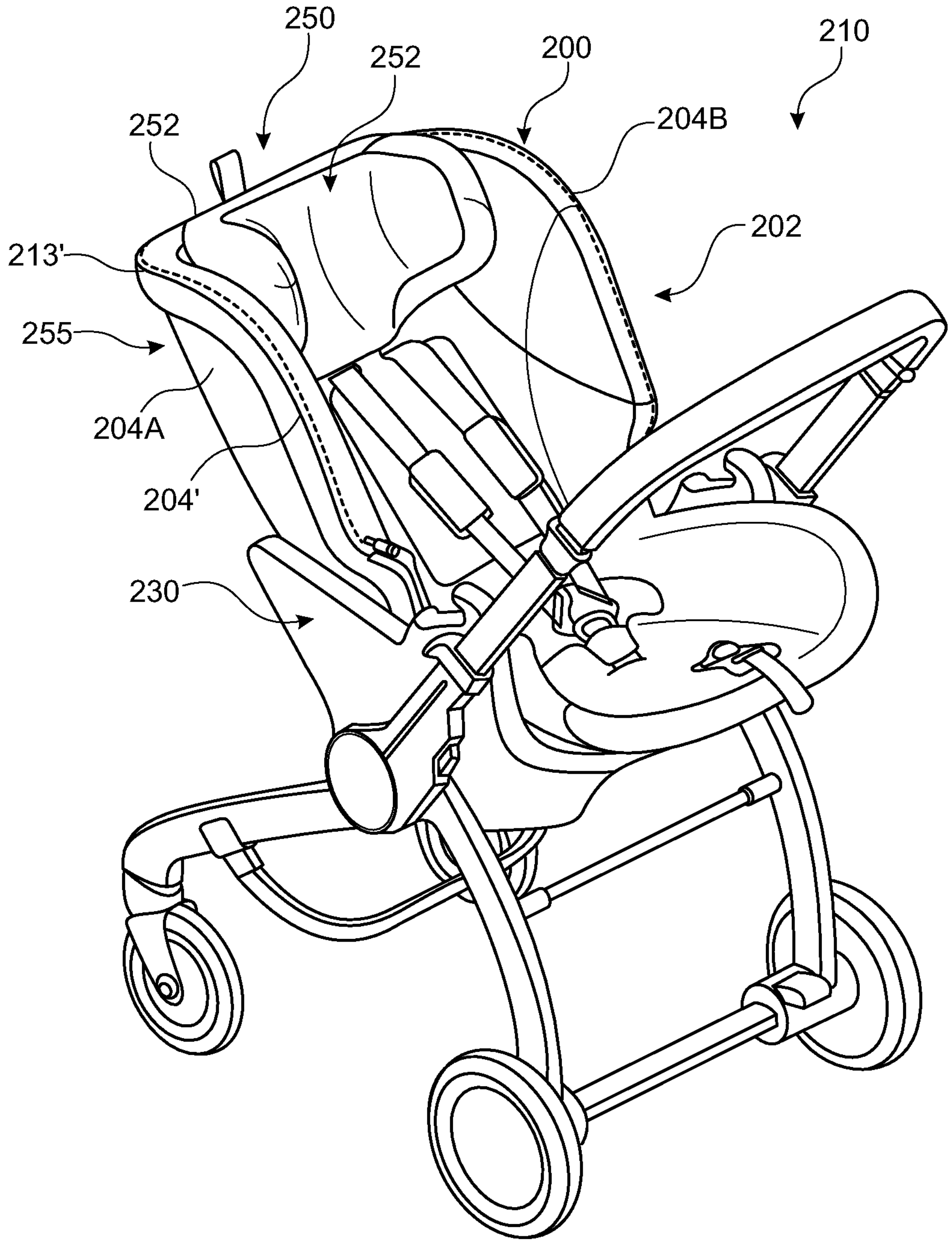
FIG. 8A is a front perspective view of a baby safety car seat assembly in an upright operational mode according to one example of the presently disclosed subject matter.
Figure 8B:
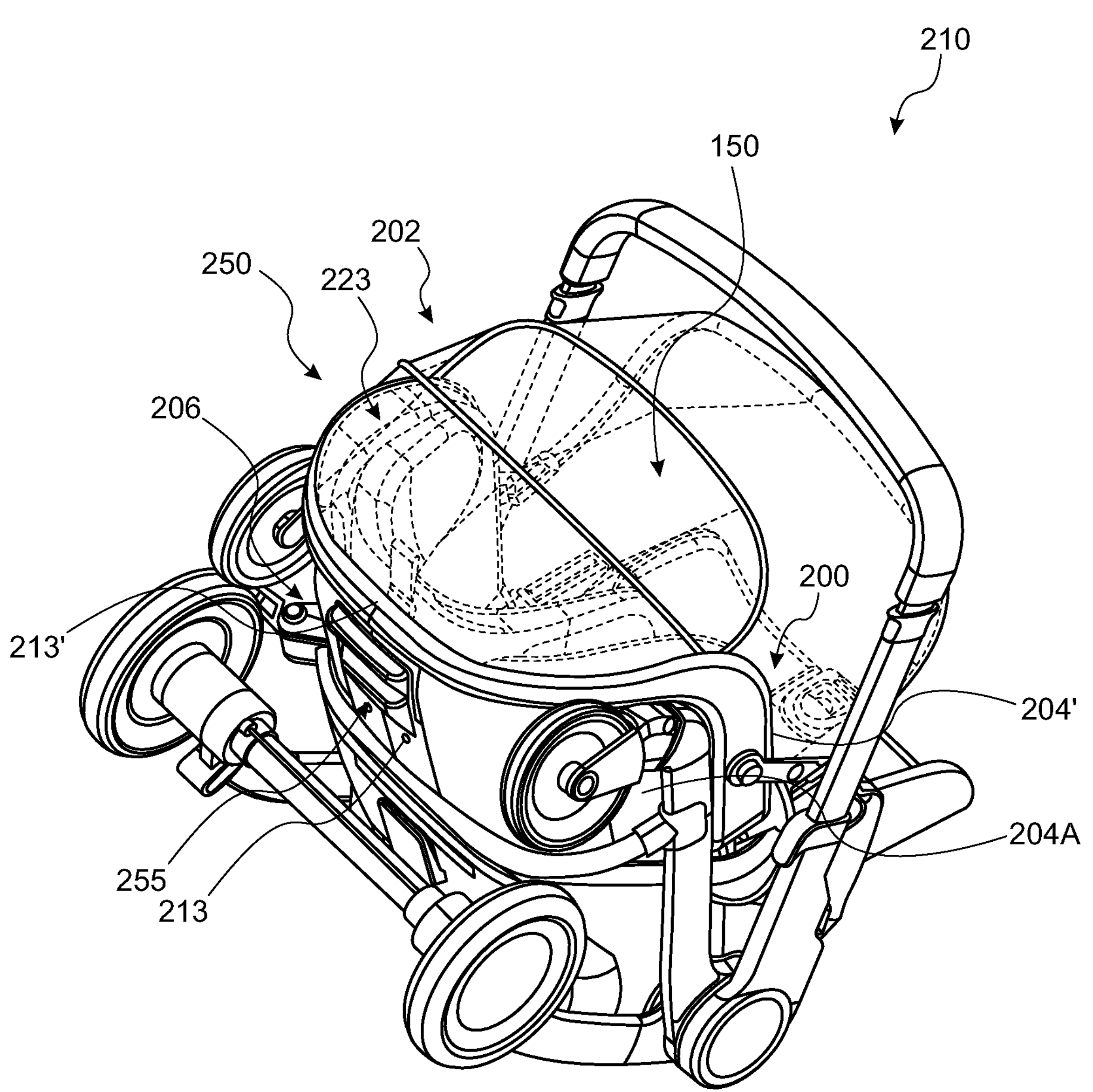
FIG. 8B is a rear perspective view of a seat assembly according to one example of the presently disclosed subject matter, with a canopy attached thereto.
Figure 9:
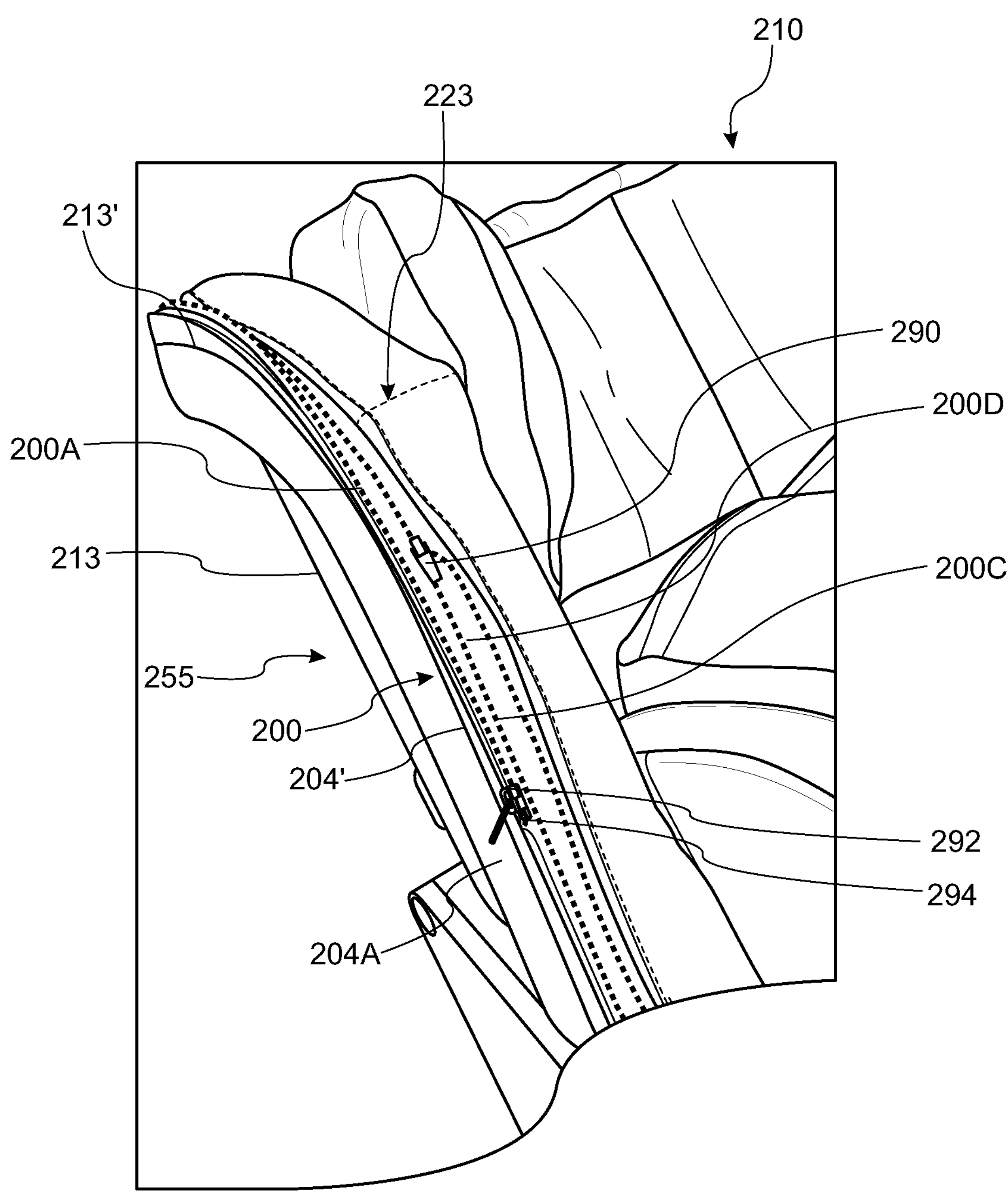
FIG. 9 is an enlarged perspective view of a portion of an upper seat with a zipper arrangement in a seat assembly according to one example of the presently disclosed subject matter, wherein a fabric cover is zipped thereto along a majority of zipper length.

Referring to FIGS. 8A, 8B and 9, in the depicted example of the seat assembly 210, the upper seat 250 comprises a backrest 252 having a shell 255 made of plastic, to which a fabric cover 223 is removably applicable. The plastic shell 255 of the backrest 252 generally comprises three walls: a back wall 213 and two opposed sidewalls 204A, 204B integrally formed to define a generally continuous and contoured body of the shell 255. Each of the back wall 213 and the sidewalls 204 has corresponding inner and outer surfaces, which surfaces respectively merge to define a continuous outer or upper edge 204', 213' of the respective walls 204A, 204B, 213. Together, the upper edges 204', 213' of the respective walls 204A, 204B, 213 merge to form a generally continuous outermost upper edge of the shell 255.

FIG. 9 shows a portion of the shell 255 with a part of a zipper arrangement 200 by which a canopy 150 (not seen) and a fabric cover 223 can be independently zipped thereto along the upper edge of the shell 255. The upper edge (not seen) extends along a first sidewall 204A, up to the top of the back wall 213, and then down the opposite sidewall 204B. The zipper arrangement 200 is sewn to the shell 255 such that it extends alongside and runs adjacent to the upper edge thereof, or at least along a substantial portion thereof.

In the depicted example, a part of the zipper arrangement 200 is shown. One half 200A of a first zipper is configured to be matched with a corresponding half of the first zipper (not seen) sewn to the canopy 150, and one half of a second zipper 200C is configured to be matched with a corresponding half of the second zipper 200D that is sewn to the fabric cover 223. These two halves 200A, 200C of the zipper arrangement 200 may be referred to as the "shell zipper halves" 200A, 200C since they are sewn to the upper seat 250 and are configured to respectively provide a zipping connection to the canopy 150 and to the fabric cover 223.

The cover zipper is illustrated at a partially fastened stated, whereby at a portion configured above a puller 290 of the zipper, half 200C and half 200D are zipped together, with their teeth intermeshed. Below the puller, the two halves are separate from each other.

For the canopy zipper, only the shell half 200A of the zipper is shown, extending to a shorter distance than the cover zipper (such as a shorter distance along sidewall 204A). A puller 292 of the canopy zipper is shown at the start of the zipper teeth, where a starter box 294 of the zipper is located.

The zipper half 200A that is configured to be matched to the canopy 150 can be sewn closest to the upper edge of the shell 255 such that the zipper half 200A extends along a length and path that is directly adjacent and parallel to the upper edge of the shell 255.

The zipper half 200C that is configured to be matched to the fabric cover 223 can be spaced inwardly from the shell zipper half 200A.

In an example configuration of the zipper arrangement, both halves of the first and second zippers which are sewn to the shell may themselves be sewn together. In FIG. 9, the shell zipper half 200C of the cover and the shell zipper half 200A of the canopy are sewn together via a generally continuous strip of fabric such that the shell zipper halves 200A, 200C are generally adjacent one another along their lengths. In such configuration, each of these shell zipper halves 200A, 200C are spaced apart from one another along their lengths such that they travel along respective paths that are generally parallel to one another and the upper edge of the shell 255 of the upper seat 250. The shell zipper half 200C which zips to the fabric cover 223 is inwardly spaced from the shell zipper half 200A which zips to the canopy 150.

The shell zipper halves may differ in length. For example, the shell zipper halves do not have to extend along the upper edge of the seat to the same extent. For example, the shell zipper half that is configured to be matched with the zipper half of the cover may extend along the upper edge of the shell to a first extent, which extent may be the substantial or entire length of the upper edge. Meanwhile, the shell zipper half that is configured to be matched with the zipper half of the canopy may extend along the upper edge of the shell to a second extent, wherein the first extent is larger than the second extent. In other words, the zipper half that is configured to be zipped to the canopy may be shorter in length than the zipper half that is configured to be zipped to the fabric seat cover. This difference in zipper length corresponds with the sizing and placement of the fabric cover and canopy.

Referring again to FIG. 9, the internal side of the upper seat 250 is configured to be substantially covered by the fabric cover 223 applied thereto. As such, the shell zipper half 200C that is sewn to the upper seat 250 and configured to zip to the fabric cover 223 is configured to extend substantially around the entire upper edge of the shell 255 so that the fabric cover 223 can be zipped along the entire length of the shell zipper half 200C so as to cover the internal side of the upper seat 250.

The canopy (not shown) 150, which is configured to provide sun and/or rain protection, may be arranged such that it extends outwardly generally from an upper region of the upper seat 250 such that it extends over and shields at least the head, if not at least a portion of the body of the infant in the upper seat 250. As such, and with reference to FIG. 9, the shell zipper half 200A which zips to the canopy 150 starts slightly higher up along the upper edge 204' of the sidewalls 204 of the shell 255. By comparison, the shell zipper 200C half which zips to the fabric cover 223 starts substantially at the lower most region of the upper edge 204' of the sidewalls 204 of the shell 255. In other words, the shell zipper half 200A that is configured to zip to the canopy 150 extends along the upper edge 213' of the back wall 213 and down the respective upper edges 204' of each sidewall 204. At the very least, the shell zipper half 200A which connects to the zipper half of the canopy does not extend down the upper edges 204' of the sidewalls 204 as much as the shell zipper half 200C that is configured to zip to the fabric cover 223. As such, the shell zipper half 200A that is configured to be zipped to the canopy 150 is sewn to the shell 255 such that it is directly adjacent the upper edge of the shell 255. Meanwhile, the shell zipper half 200C that is configured to be zipped to the fabric cover 223 is sewn to the shell zipper half 200A such that it is spaced inwardly from the shell zipper half 200A along its length, and thus the zipper half 200C extends along a length that is directly adjacent to and inwardly spaced from the shell zipper half 200A.

The cover zipper and the canopy zipper of the zipper arrangement are configured so that their fastening is in opposite directions. In the example shown, a puller of the canopy zipper is configured to be pulled starting from sidewall 204A towards sidewall 204B (not shown in this figure), in order to zip the canopy zipper closed; while a puller of the cover zipper is configured to be pulled in the opposite direction, from sidewall 204B towards sidewall 204A, in order to zip the cover zipper closed. Therefore, a start box of the canopy zipper is configured at the start of the canopy zipper teeth at sidewall 204A; and a start box of the cover zipper is configured at the start of the cover zipper teeth at sidewall 204B.

Figure 10:
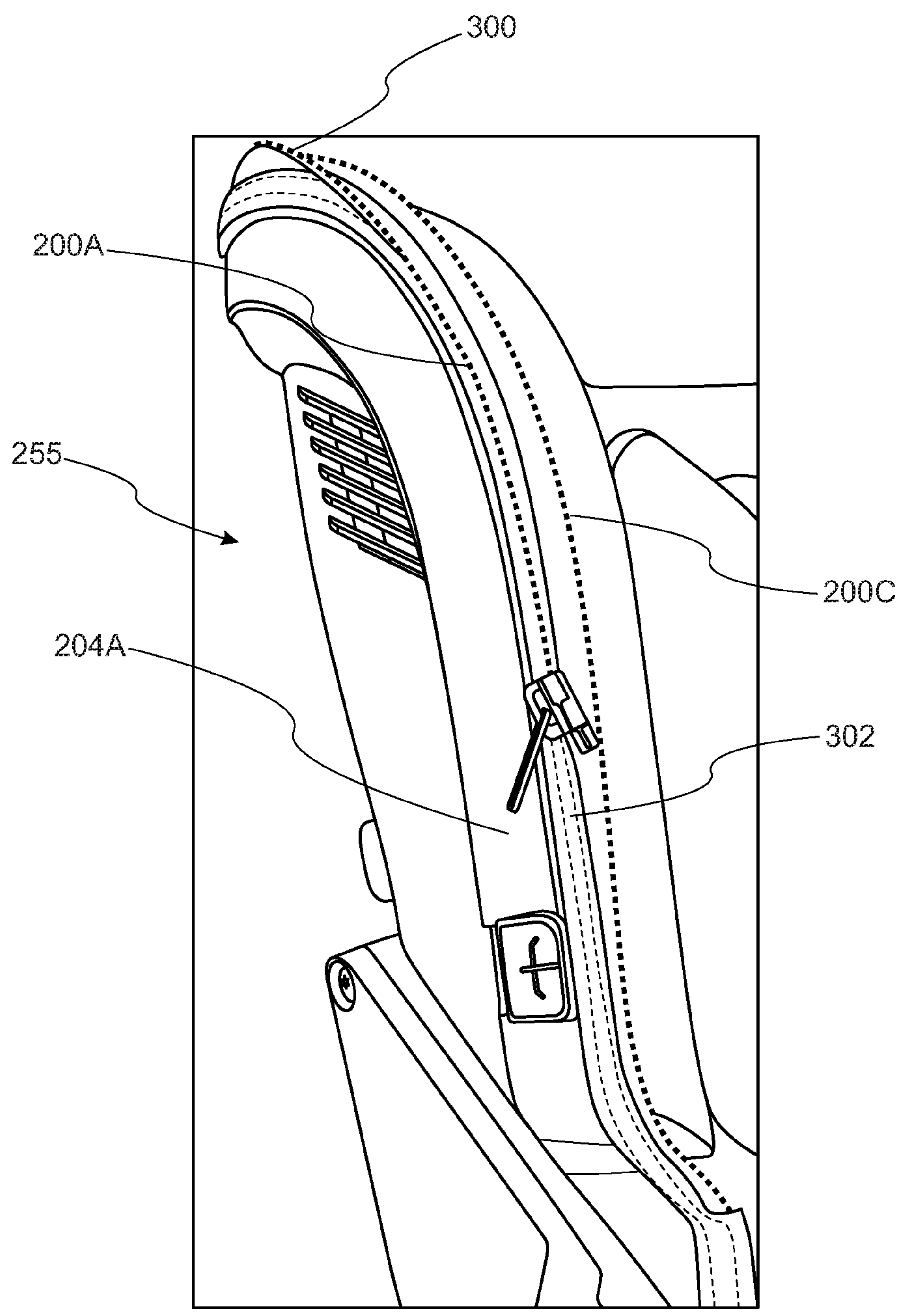
FIG. 10 is the same view as in FIG. 9, without the fabric cover.

The zipper arrangement is further illustrated at FIG. 10. Shell zipper half 200A of the canopy zipper extends at least partially along the outermost upper edge of the shell 255. Shell zipper half 200C of the cover zipper is parallel to and spaced inwardly from shell zipper half 200A, and extends a longer distance along the sidewalls (sidewall 204A is shown herein).

Shell zipper halves 200A, 200C are seamed to the plastic shell 255. Each zipper half is generally comprised of a flappable teeth portion 300, and a base portion (not visible)

via which the zipper half is attached to the shell. In FIG. 10, seams 302 are shown to extend under the flappable portions of the zipper halves and parallel to the outermost upper edge of the shell. (In the present example, the flappable portion of shell half zipper 200A is partially folded about the seams, so that the seams are visible above and below the folded flappable portion.)

Optionally, the base portions of the shell zipper halves are at least partially bound together by a binding, for example, a fabric binding. In some embodiments, an arrangement of the bound together shell zipper halves and their binding is fitted within a designated recess, for example, a stepped recess, formed along the shell adjacent its upper edge. In such structure, the binding can be aligned with the shell upper edge, such that it does not protrude above the outer surface of the shell. The binding together with the shell zipper halves can be connected to the shell by at least one common sewing seam. Having the binding placed within a recess may further be advantageous in that a sewing seam which attaches the binding to the plastic shell is made through a relatively thin layer of plastic (defined by the stepped recess).

In the present example, the above structure is illustrated in FIG. 10, showing a cross sectional view along the length of the backrest, including a part of the zipper arrangement. The shell zipper half 200A of the canopy zipper and the shell zipper half 200C of the cover zipper are shown. Each of the shell zipper halves comprises a flappable teeth portion 300 (only a single tooth of each appears in this cross-sectional view), and a base portion 304. Both base portions are bound together by a binding 306 (for example, a fabric binding, a ribbon or a tape). Optionally, the base portions are welded to each other.

The arrangement of the bound together shell zipper halves is fitted within a designated stepped recess 308 formed in the plastic material of shell 255, such that the arrangement does not protrude beyond a surface of the shell, defining a smoothed outer profile. Recess 308 may extend along the length of the outermost upper edge of the shell.

Figure 11:
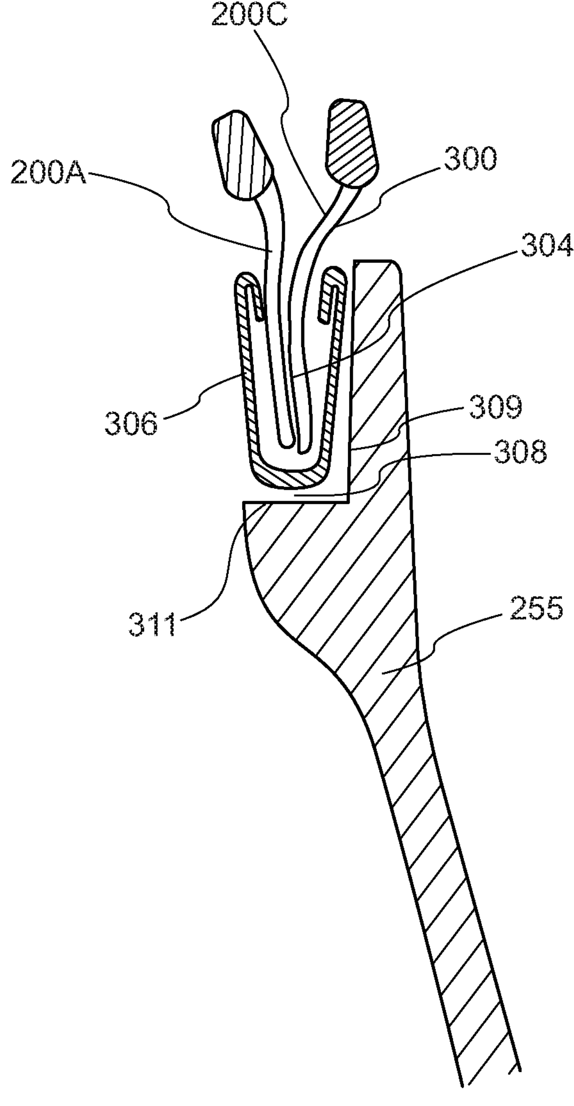
FIG. 11 is a schematic cross-sectional view, which a zipper arrangement can have, for mounting a fabric cover and a canopy to a backrest of a baby seat according to further example of the presently disclosed subject matter.

The arrangement of the bound together shell zipper halves is sewn to the plastic material of the shell by one or more sewing seams, not shown in FIG. 11. The stepped recess 308 as shown includes a first wall 309 through which the zipper arrangement (along with the binding) is sewn to the shell, such as via one or more sewing seams, and a second wall 311 transverse to the first wall, which defines a height that sets a depth of the recess with respect to an outer, back facing surface of the shell. The thickness of the binding inclusive of the shell zipper halves may be similar to or small than the depth defined by the recess, so that the binding does not protrude outwardly from the shell surface. Further, since a thickness of the shell is reduced along the first wall of the recess, sewing the zipper arrangement to the plastic material of the shell at that wall may be facilitated.

Reverting to FIG. 11, in this example seams 302 are constituted of two seams, where a first inner seam holds the binding and the base portions of the shell zipper halves together, and a second outer seam holds the arrangement of the bound together shell zipper halves to the plastic material of the shell, at the recess.

The convertible baby safety car seat assembly according to the presently disclosed subject matter can be, when in the storage mode and positioned on an external supporting surface, rockable thereon between a neutral position and at least one of front and rear inclined positions.

In general, the assembly can have one or more lowermost areas that, in the neutral position, are operable to contact the external supporting surface, which can be a platform, ground, floor, or any other suitable surface that allows positioning and rocking of the assembly thereon. The assembly can further have at least one of front and rear areas that can be operable to contact the external supporting surface when the assembly tilted, by virtue of its rocking, into a corresponding one of the front and rear inclined positions. For instance, the front and/or rear areas can be positioned above the external supporting surface when the assembly is in the neutral position and can contact the external supporting surface when the assembly is tilted (or in other words rocked) into its front and/or rear inclined position. The external supporting surface can generally be imaginarily represented by a reference plane that includes the one or more lowermost areas of the assembly when the assembly is in the neutral position and includes the front and/or rear areas when the assembly is in the corresponding inclined position.

In some cases, the one or more lowermost areas can include at least one of a seat lowermost area, i.e., a lowermost area of the lower support, when the assembly is in the neutral position, and a first area of the legs of the assembly, which can be legs lowermost area (the lowermost areas of the legs), when the assembly is in the neutral position. For instance, either or both of the lowermost area of the lower support and the lowermost area of the legs can constitute the one or more lowermost areas of the assembly when the assembly is in the neutral position. In any case, the lowermost area of the support, i.e., the seat lowermost area is closest to the reference plane in the neutral position whether or not it coincides therewith. In other words, in cases where the one or more lowermost areas of the assembly do not include the seat lowermost area, the seat lowermost area is that area of the lower support which is positioned closest to the reference plane.

In some cases, the front and/or rear areas of the assembly can be constituted by at least one second area of at least one pair of the legs (of the front pair and rear pair of legs), which in the neutral state can be positioned above the external supporting surface and in the front and/or rear inclined position can be operable to contact the external supporting surface, for example by virtue of a curved shape of the legs. For instance, the second area(s) of the legs can extend further in the frontward and/or backward direction than the corresponding front portion of the lower support and/or the rear portion of the lower support to thereby increase a range of rocking of the assembly as compared to what would be the range of rocking if only the lower support were to participate in the rocking with a curved bottom thereof. The range of the rocking can be defined by a total area or total curved length of the assembly that would contact the external supporting surface when the assembly rocks thereupon in a full cycle of rocking between the neutral position and the inclined positions.

Accordingly, the second area(s) and whatever area that constitutes the lowermost area(s) of the assembly, together constitute a continuous curved shape at least as seen in the side view of the assembly. For instance, in case when the seat lowermost area partially or wholly constitutes the lowermost area of the assembly, the seat lowermost area and the second area(s) of the legs constitute a continuous curved shape in the side view of the assembly.

In fact, the second area(s) of the legs can have a rocking-participating portion on each of the second area(s). The rocking-participating portion can be that portion of the legs at least a part of which participates in the rocking of the assembly, or in other words contacts at least at some stage of the rocking the external supporting surface.

The legs that have the second area(s) can also have at least one third area spaced from the first and second area(s) and constituting those areas of the legs that may not contact the external supporting surface at any stage of the rocking of the assembly thereupon. In fact, the third area(s), that may not contact the external supporting surface at any stage of the rocking of the assembly, may include a majority of the legs. The rocking-participating portion(s) can be made of a material that improves at least one rocking quality of the second area(s) as compared to that which the second area(s) (or at least the rocking-participating portion(s)) would have if they were made of the material from which the third area(s) are made. For instance, the third area(s) can be made of a material that is not required to improve any rocking quality, at least because the third area(s) may not contact the external supporting surface at any stage of the rocking of the assembly. The rocking quality can generally be that characteristic which participates in providing a smooth and comfortable experience to the infant positioned in the assembly.

In some cases, the rocking quality can be a higher friction ability such that the rocking-participating portion constitutes a friction increasing portion. The friction increasing portions at the areas that contact the external supporting surface during the rocking provide a controlled rocking, for example the speed, the extent (range) of rocking, and prevention against unintentional sliding of the assembly on the external supporting surface, thereby providing safe and comfortable rocking experience to the infant. The material of which the friction increasing portions are made of can have a material having higher friction ability than that of the at least one third area, or areas which remain free of contact with the external supporting surface during the rocking. It is to be understood herein that for the purposes of the present description, a comparison between the friction ability of any two materials is considered to be carried out in all those conditions being same that could impact the friction ability, for example with respect to the same external supporting surface. For instance, the friction ability of the material of which the friction increasing portions are made, being higher than any other material means that the friction ability of the material of which the friction increasing portions are made is higher than the other material when measured with the same external supporting surface under same circumstances, physical properties, and environment. In other words, the material of the friction-increasing portion facilitates more friction between the friction-increasing portions and the external supporting surface than the friction that would exist between the third area(s) (or other areas of the legs that remain free of contact with the external supporting surface) and the external supporting surface.

In some cases, the rocking quality can be softness such that the rocking participating portion constitutes a soft-contact portion. The soft-contact portions at the areas that contact the external supporting surface during the rocking provide a softer contact therewith and thus smoother and controlled rocking, for example by dampening the rocking as the assembly approaches its inclined positions. It is to be understood herein that the material of which the friction increasing portions are made can be such as to improve both the rocking qualities discussed above, i.e., provides a friction-increasing portion which acts as soft-contact portion as well.

In fact, all the areas, for example, the one or more lowermost areas, whether constituted by any one or both of the lower support and the legs, can having a rocking-participating portion similar to the one described above with respect to the second area(s), and all the description of the rocking-participating portion described above with respect to the second area(s) would apply to the rocking-participating portions of the one or more lowermost areas of the assembly. For instance, the rocking-participating portions of the one or more lowermost areas of the assembly can be made of a material other than that of at least one other area of the assembly (that remains free of contact with the external supporting surface during rocking, and may constitute a majority of at least one of the lower support and the legs), and can be such as to improve at least one rocking quality compared with that which said rocking-participating portion would have if it were made of the material from which the other area is made. The rocking quality is at least one of a higher friction ability such that the rocking-participating portion constitutes a friction increasing portion in the same manner as described above with respect to the second area(s), and softness such that the rocking participating portion constitutes a soft-contact portion in the same manner as described above with respect to the second area(s). The material of the rocking-participating portions of the one or more lowermost areas can be same or different than the material of the rocking-participating portions of the second area(s).

In some cases, the material of the areas that are to remain free of contact from the external supporting surface include plastic, aluminum, or any other metal/alloy or any other material which is hard enough to provide strength to the assembly and is light enough for the assembly to be carried by a person. The material of the areas (rocking participating portions) that are to contact the external supporting surface can include softer materials, for example, rubber or any other material suitable to provide above-described rocking qualities. In addition to the rocking qualities, the material of the rocking participating portions provide resistance/prevention against mechanical damage to the legs and/or lower support, for example by wear and tear, and to the external supporting surface, for example when the external supporting surface includes a mat or otherwise a soft upper layer, as well as to the seat of the car when the assembly is positioned thereupon.

During operation of the assembly as a rocker, i.e., when the assembly is positioned on an external supporting surface in its storage mode and in neutral position, the one or more lowermost areas contact the external supporting surface (that coincides with the reference plane). When the assembly is rocked (inclined/tilted) towards its inclined position, initially the one or more lowermost areas (by virtue of their curved shape) participate in the rocking. Once the second area(s) comes in contact with the external supporting surface and by virtue of the curved shape of the legs, they allow further tilting of the assembly towards its inclined position, thereby increasing the range of the rocking as compared to what would be the range of rocking if only the one or more lowermost areas were participating therein. The wheels of the legs constitute stoppers for restricting the rocking of the assembly in the inclined position thereby limiting the range and extent of rocking. In some examples, the wheels can be detachable from the legs, and in such examples, the distal ends of the legs would act as the stoppers. The diameter of the distal ends can be smaller than that of the wheels, and hence when the wheels are detached, the range of the rocking can be further increased.

Figure 12A:
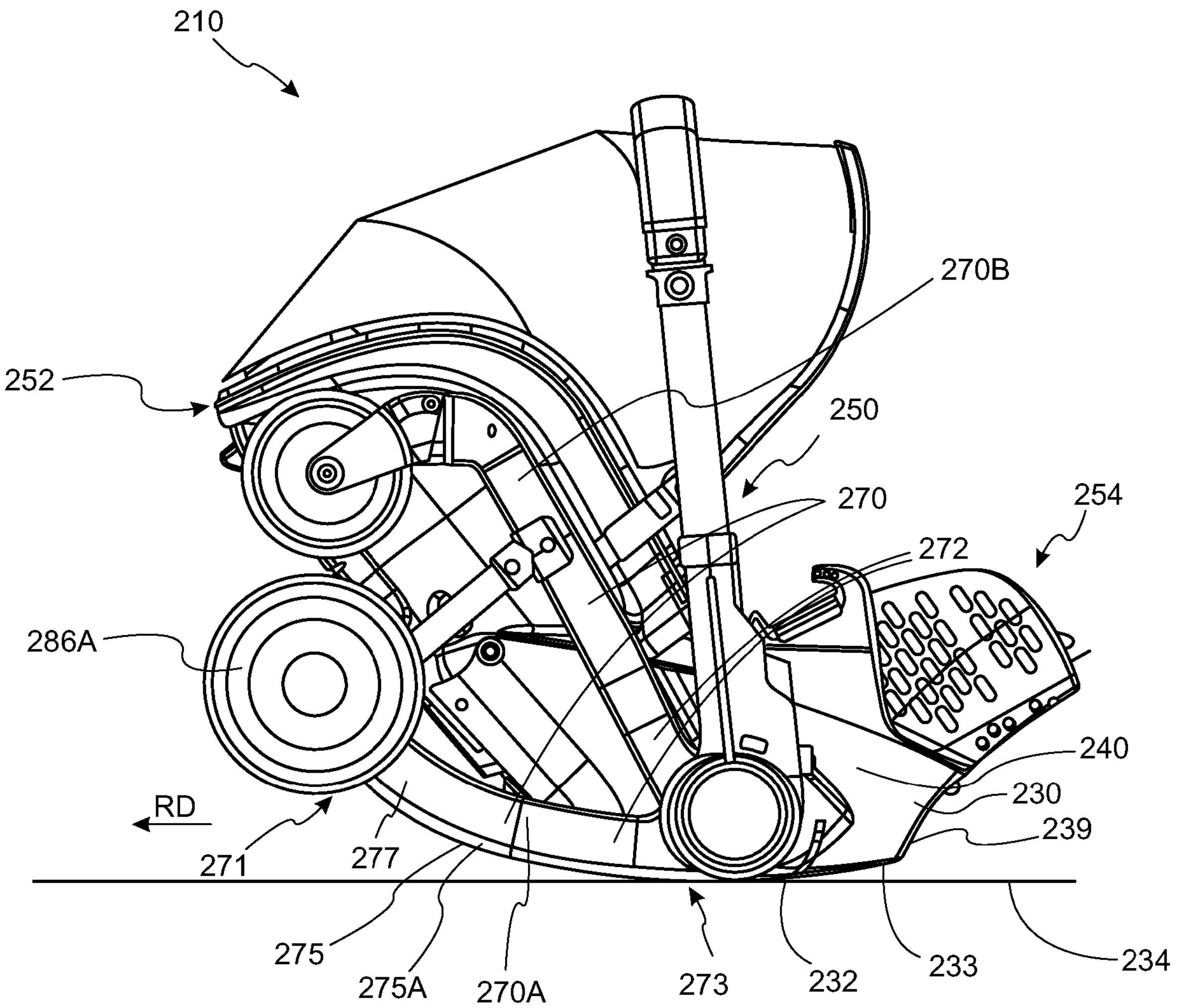
FIG. 12A is a side view of a baby safety car seat assembly in a storage mode according to one example of the presently disclosed subject matter, shown in its neutral position.
Figure 12B:
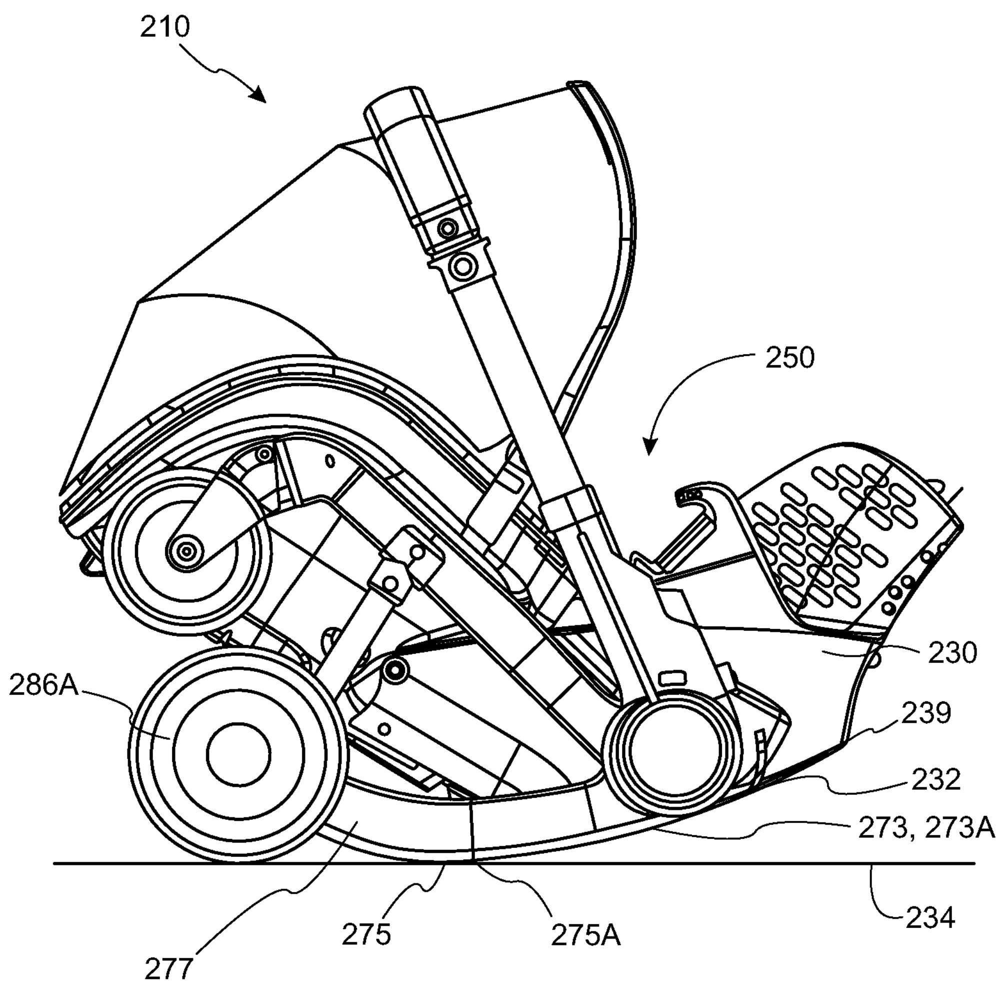
FIG. 12B is a side view of the baby safety car seat assembly of FIG. 12A, shown in its rear inclined position.
Figure 12C:
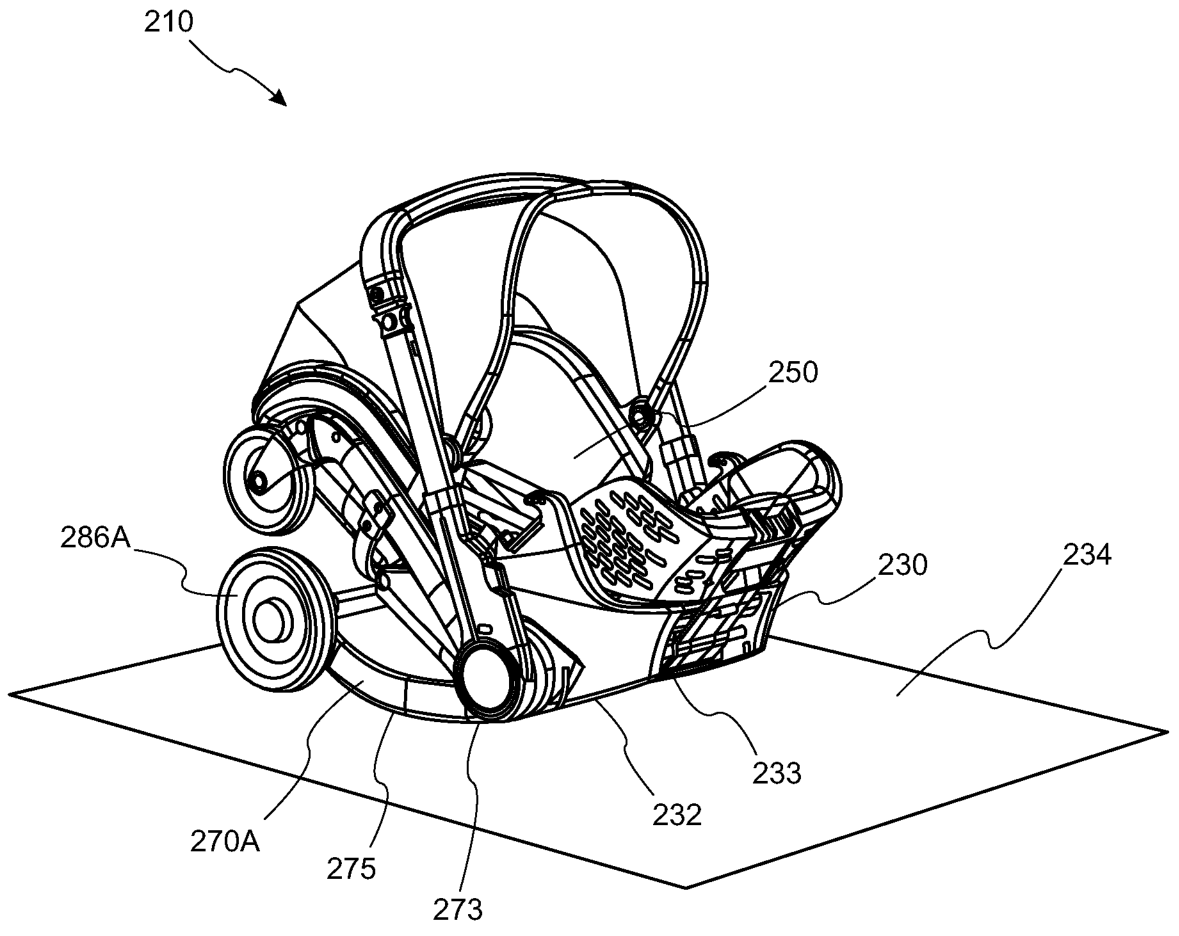
FIG. 12C is a side perspective view of the baby safety car seat assembly of FIG. 12A, shown in its rear inclined position.
Figure 12D:
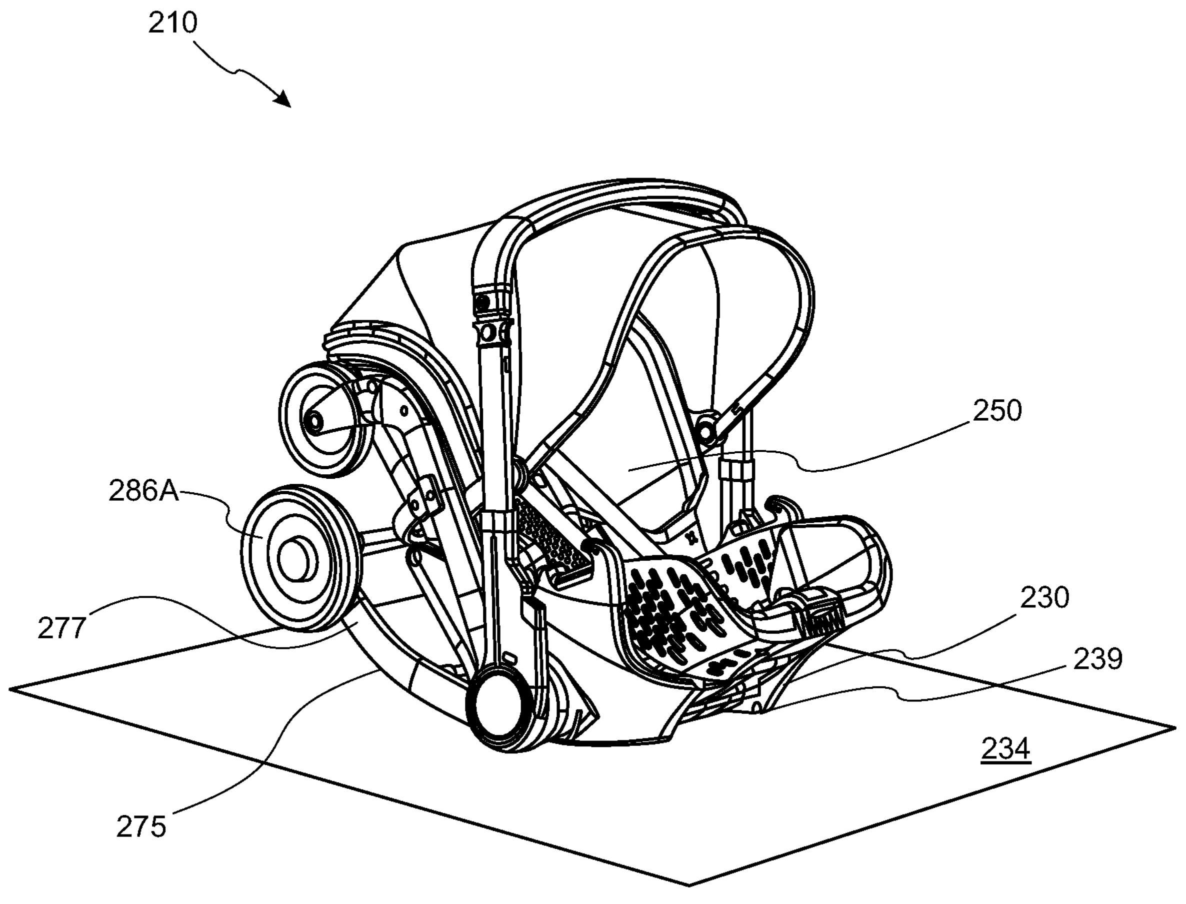
FIG. 12D is a side perspective view of the baby safety car seat assembly of FIG. 12A, shown in its neutral position.
Figure 12E:
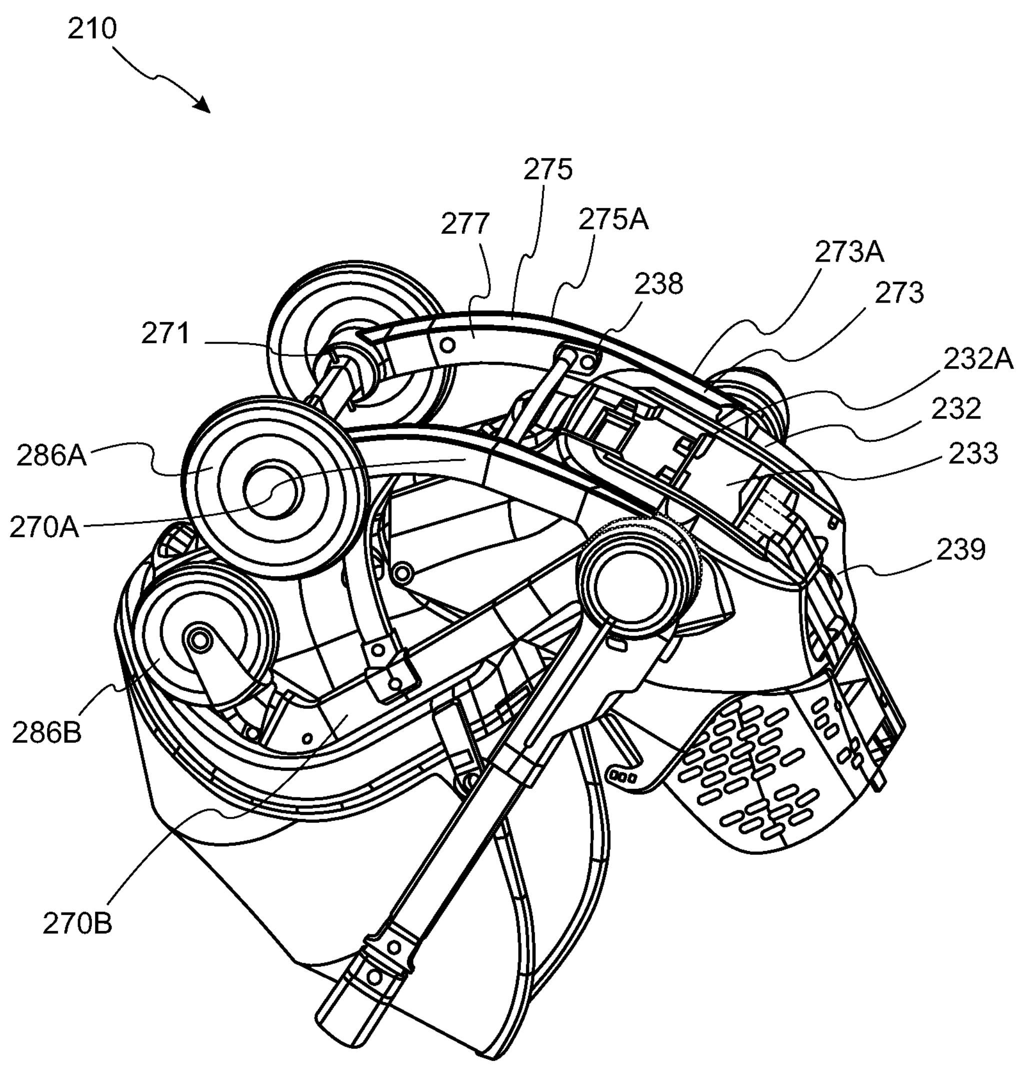
FIG. 12E is a bottom perspective view of the baby safety car seat assembly of FIG. 12A.

In the present example illustrated in FIGS. 12A to 12E, the convertible baby safety car seat assembly 210 has been shown in its storage mode (similar to the one in which assembly 10 has been shown at least in FIG. 1A), and can have an operational mode (similar to the one(s) in which assembly 10 has been shown at least in FIGS. 1B to 1D). The assembly 210 has a horizontal reference plane 234 (also referred to herein as "base plane," "reference plane," and "horizontal base plane" with all these terms used interchangeably), which in FIGS. 12A to 12D represent an external supporting surface 234, and is rockable on the external supporting surface 234 between the neutral position (shown in FIGS. 12A and 12D) and the rear inclined position (shown in FIGS. 12B and 12C). The lower support 230 comprises a curved bottom 233 having a seat lowermost area 232, which in the illustrated example constitutes one of the one or more lowermost areas of the assembly 210. For instance, as can be seen in FIGS. 12A and 12D, in the neutral position the reference plane 234 includes the seat lowermost area 232. The lower support 230 further includes a rear portion 238 and a front portion 239, between which the curved bottom 233 extends and at least partially facilitates rocking of the assembly 210.

The upper seat 250 comprises a rear backrest portion 252 associated with the rear portion 238 of the lower support 230 and a front feet portion 254 associated with the front portion 239 of the lower support 230. An infant can be seated in the upper seat 250 with his/her feet positioned towards the front feet portion 254 and back towards the rear backrest portion 252.

The assembly 210 further comprises legs 270 having distal ends 271 with wheels 278, which can be detachably or fixedly connected thereto, and proximal ends 272 pivotally articulated to the lower support 30. The legs 270 are manipulable between a storage state associated at least with the storage mode of the assembly, in which at least a part of each leg with the wheel is located above the reference plane 234 (as shown in FIGS. 12A to 12D), and an operational state associated at least with the operational mode of the assembly, in which at least said part of each leg with the wheel is located below the reference plane 234 so as to enable the seat assembly to be rolled by means of said wheels constituting, for example in the manner as described herein above with respect to the legs 70 of the assembly 10.

The legs 270 constitute a pair of front legs 270A and a pair of rear legs 270B, out of which in the illustrated example, the front legs 270A have a curved shape and participate in the rocking of the assembly as described herein below. It is to be understood that in some examples, the rear legs can also be formed so as to participate in the rocking in addition or in alternative to the front legs.

In the present example, the front legs 270A have a first area 273, which is also the legs lowermost area 273, which in the illustrated example also constitutes another one of the one or more lowermost areas of the assembly. For instance, as can be seen in FIGS. 12A and 12D, in the neutral position the legs lowermost area 273 is positioned above the reference plane 234 and also coincides therewith. In some examples, the first area may not constitute the legs lowermost area, or may constitute the legs lowermost area but may not constitute the one or more lowermost areas of the assembly. For instance, the first area may be located above the reference plane 234 and not coincide therewith.

In the present example, the front legs 270A have a second area 275, which also constitutes the rear area 275 of the assembly 210, and thus participates in the rocking of the assembly. For instance, as can be seen in FIGS. 12B and 12C, in the rear inclined position, the second area 275 coincides with the reference plane 234, i.e., is operable to contact the external supporting surface 234 when the assembly is positioned thereupon and is in the rear inclined position. The second area 275 extends further in the rearward direction RD that the rear portion 238 of the lower support 230, and constitutes a continuous curved shape (best seen in FIG. 12E) with the one or more lowermost areas of the assembly, which in the illustrated example include the seat lowermost area 232 and the first area 273 of the front legs 270A, in the sideview of the assembly 210. In the illustrated example, as the first area 273 also participates in the rocking of the assembly, the second area 275 is adjacent the first area 273 and may even partially overlap therewith. In some examples, the first area and the second area may be space apart.

In the present example, the front legs 270A have a third area 277 spaced from the first area 273 as well as the second area 275. It is to be understood herein that although in the illustrated example, the third area 277 has been shown to be facing away from the reference plane 234, in some examples, it can be facing the reference plane 234 and can be positioned at a part of the legs that would not contact the external supporting surface during the rocking, for example at or adjacent the distal ends of the legs, which may not contact the external supporting surface due to the presence of the wheels. In fact, any such area of the legs can constitute the third area which would not contact the external supporting surface during the rocking of the assembly.

The front legs 270A can be made of a first material, which can also be the material of which the third area 277 is made. In fact, the third area 277 can constitute a majority of the front legs 270A. The second area 275 has the rocking-participating portion 275A made of a second material other than the first material. The second material is such as to improve at least one rocking quality of the rocking-participating portion 275A as compared with that which the rocking-participating portion 275A would have if it were made of the first material. For example, the second material can have higher friction ability as compared to the first material and/or can be softer than the first material. Accordingly, the rocking-participating portion 275A can constitute the friction-increasing portion and/or the soft-contact portion.

The lower support 230 comprises another area 240 spaced from the seat lowermost area 232. It is to be understood herein that although in the illustrated example, the other area 240 has been shown to be not facing towards the reference plane 234, in some examples, it can be facing the reference plane 234 and can be positioned at a part of the lower support that would not contact the external supporting surface during the rocking, for example at the curved bottom 233, at a portion which may not contact the external supporting surface, for example because of the seat lowermost area 232 being formed as protruding towards the reference plane with respect to other portions of the curved bottom 233. Such other portions of the curved bottom may constitute the other area. The other area 240 can be considered together with the third area 277, at least because both these area represent those areas of the legs and the lower support which would remain free of contact with the external supporting surface during rocking of the assembly thereupon. Accordingly, the other area 240 may constitute a majority of the legs 270A and the lower support 240.

The lower support 230 can be made of a third material, which can also be the material of which the other area 240 is made. The seat lowermost area 232 has the rocking-participating portion 232A made of a fourth material other than the third material. The fourth material is such as to improve at least one rocking quality of the rocking-participating portion 232A as compared with that which the rocking-participating portion 232A would have if it were made of the third material. For example, the fourth material can have higher friction ability as compared to the third material and/or can be softer than the third material. Accordingly, the rocking-participating portion 232A can constitute the friction-increasing portion and/or the soft-contact portion.

In the present example, as the first area 273 of the front legs 270A also constitute the one or more lowermost areas of the assembly 210, and participates in the rocking thereof, the first area also has a rocking-participating portion 273A, which is made of a fifth material other than the first and the third materials. The fifth material is such as to improve at least one rocking quality of the rocking-participating portion 273A as compared with that which the rocking-participating portion 273A would have if it were made of the first or third material. For example, the fifth material can have higher friction ability as compared to the first and third material and/or can be softer than the first and third material. Accordingly, the rocking-participating portion 273A can constitute the friction-increasing portion and/or the soft-contact portion.

It is to be understood herein that the first and the third material can be same or different and can include plastic, aluminum, or any other metal/alloy or any other material which is hard enough to provide strength to the assembly and is light enough for the assembly to be carried by a person. The second, fourth, and fifth materials can be same or different and can include softer materials, for example, rubber or any other material suitable to provide above-described rocking qualities. In fact, in the present example, the rocking-participating portion 273A of the first area 273 and the rocking-participating portion 275A of the second area are formed continuously on the face of the front legs 270A facing the reference plane 234.

In the present example, the rocking-participating portions have been shown as being in the form of liners attached to the corresponding parts (legs and lower support). It is to be understood herein some or all of the rocking-participating portions can be formed within the corresponding parts instead of being attached thereto in the form of liners. For instance, the lower support and/or the legs may include recesses to receive therewithin the rocking-participating portions. In some examples, some or all of the rocking-participating portions can be formed unitarily with the corresponds parts. In some examples, some or all of the rocking-participating portions can be formed integrally with the corresponds parts.

During operation of the assembly 210 as a rocker, i.e., when the assembly 210 is positioned on an external supporting surface in its storage mode and in neutral position, the lowermost area 232 of the curved bottom 233 of the lower support 230, and the first area 273, contact the external supporting surface (that coincides with the reference plane 234). When the assembly 210 is rocked (inclined/tilted) towards its rear inclined position, initially the curved bottom 233 (by virtue of its curved shape) and the first area 273 participates in the rocking. Once the rear portion 238 of the lower support 230 comes in contact with the external supporting surface, simultaneously the second area 275 (extending further rearwardly than the rear portion 238 and being curved) comes in contact with the external supporting surface and by virtue of the curved shape of the front legs 270A, allows further tilting of the assembly 210 towards its rear inclined position, thereby increasing the range of the rocking as compared to what would be the range of rocking if only the lower support were participating therein. The wheels 286A of the front legs 270A constitute stoppers for restricting the rocking of the assembly in the rear inclined position thereby limiting the range and extent of rocking. In some examples (such as that shown in FIGS. 13A to 13F), the wheels 286A can be detachable from the legs, and in such examples, the distal ends 271 would act as the stoppers. The diameter of the distal ends 271 is smaller than that of the wheels 286A, and hence when the wheels are detached, the range of the rocking is further increased.

The convertible baby safety car seat assembly according to the presently disclosed subject matter can comprise one or more wheels connected to the corresponding legs by a quick-release mechanism. Such wheels can be detached from the seat assembly, for example, when the assembly is to be used in its car seat mounting mode or storage mode. The wheels can be detached to prevent a child sitting adjacent the seat assembly or the seat of the car itself from the dirt/damage/injury from the wheels when the assembly is to be positioned in the car.

In the present example illustrated in FIGS. 13A to 13F, the convertible baby safety car seat assembly 210 comprises a lower support 230 having a rear portion 238 and a front portion 239, and a horizontal reference plane 234 passing through a lowermost area 232 of the lower support 230, also referred to herein as seat lowermost area 232. An upper seat 250 is connected to the lower support 230 such that a backrest portion 252 of the upper seat 250 is connected to the rear portion 238 of the lower support 230 and a feet portion 254 of the upper seat 250 is connected to the front portion 239 of the lower support 230.

The assembly 10 further comprises legs 270 having wheels 286 manipulable between a storage state shown in FIGS. 13A to 13E and an operational state. It is to be understood herein that the legs 270 can include some or all of the features of the legs 70 described above with respect to the assembly 10, and the description thereof at least with respect to manipulation of the legs 70 between the storage state and the operational state applies to the legs 270 as well, and has not been repeated herein for the sake of conciseness of the present description. For instance, in the storage state of the legs 270, the wheels 286 are located above the reference plane 234 and the assembly 210 is suitable for being positioned in a car or on a supporting surface at a position suitable for securing an infant therein, and at the operational state of the legs 270, the wheels 286 can be located below the reference plane 234 so as to enable the seat assembly 210 to be rolled by means the wheels 286.

The legs 270 constitute a front pair of legs 270A having front wheels 286A and a rear pair of legs 270B having rear wheels 286B. In general, at least one of the front and rear pairs 270A and 270B of the legs 270, in a manner similar to the legs 70, can be pivotable rearwardly towards the backrest portion 252 for being manipulated from the operational state to the storage state such that in the storage state, the wheels 286 are positioned closer to the backrest portion 252 than the feet portion 254. In the present example, both the front and rear pairs of legs 270A and 270B are pivotable rearwardly towards the backrest portion 252 for being manipulated from the operational state to the storage state such that in the storage state, the wheels 286 are positioned closer to the backrest portion 252 than the feet portion 254. In some examples, only the front pair of legs 270A can be pivotable rearwardly and in the storage state, the front wheels 286A are positioned closer to the backrest portion 252 than the feet portion 254.

Figure 13C:
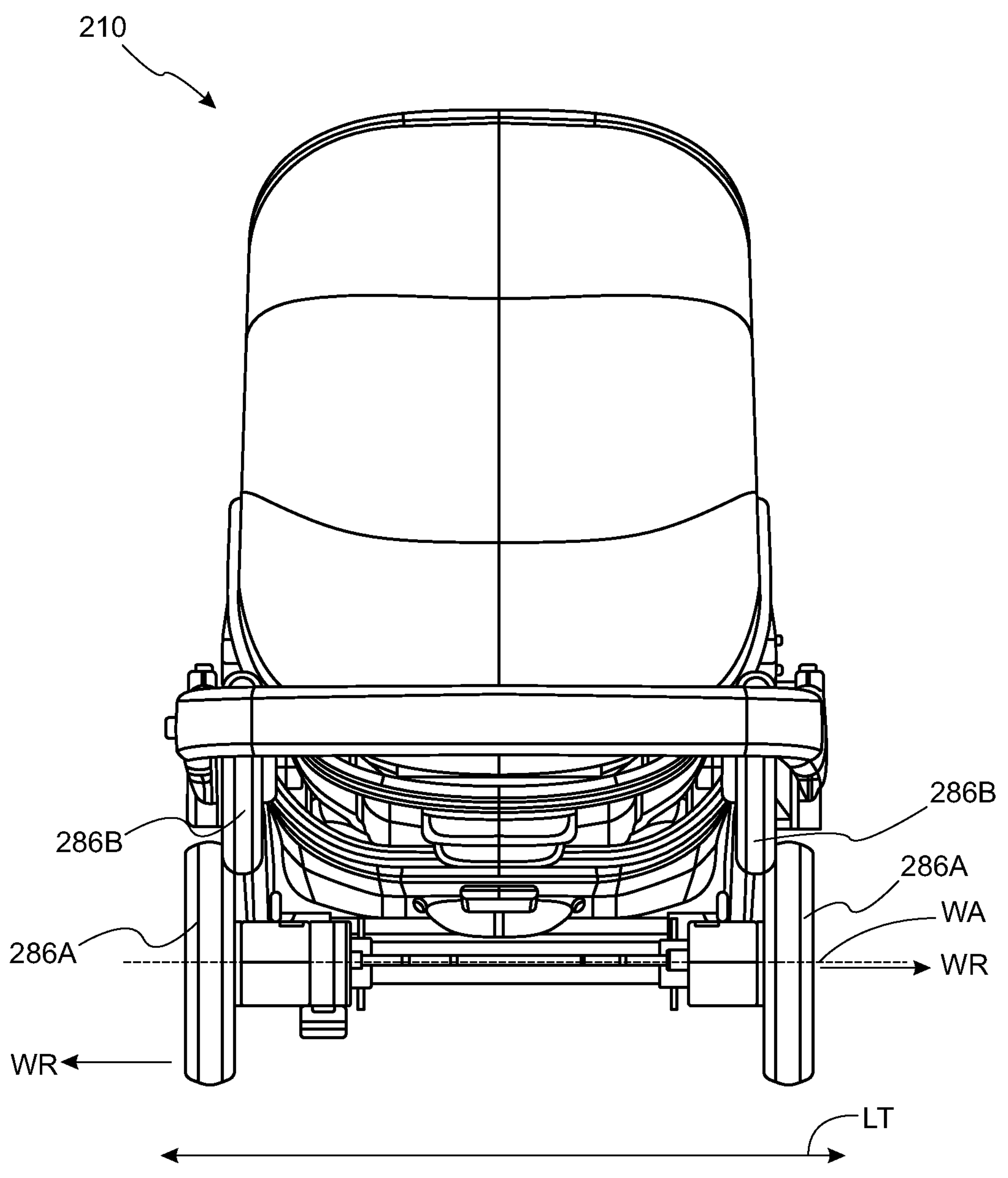
FIG. 13C is a rear view of the baby safety car seat assembly of FIG. 13A.
Figure 13D:
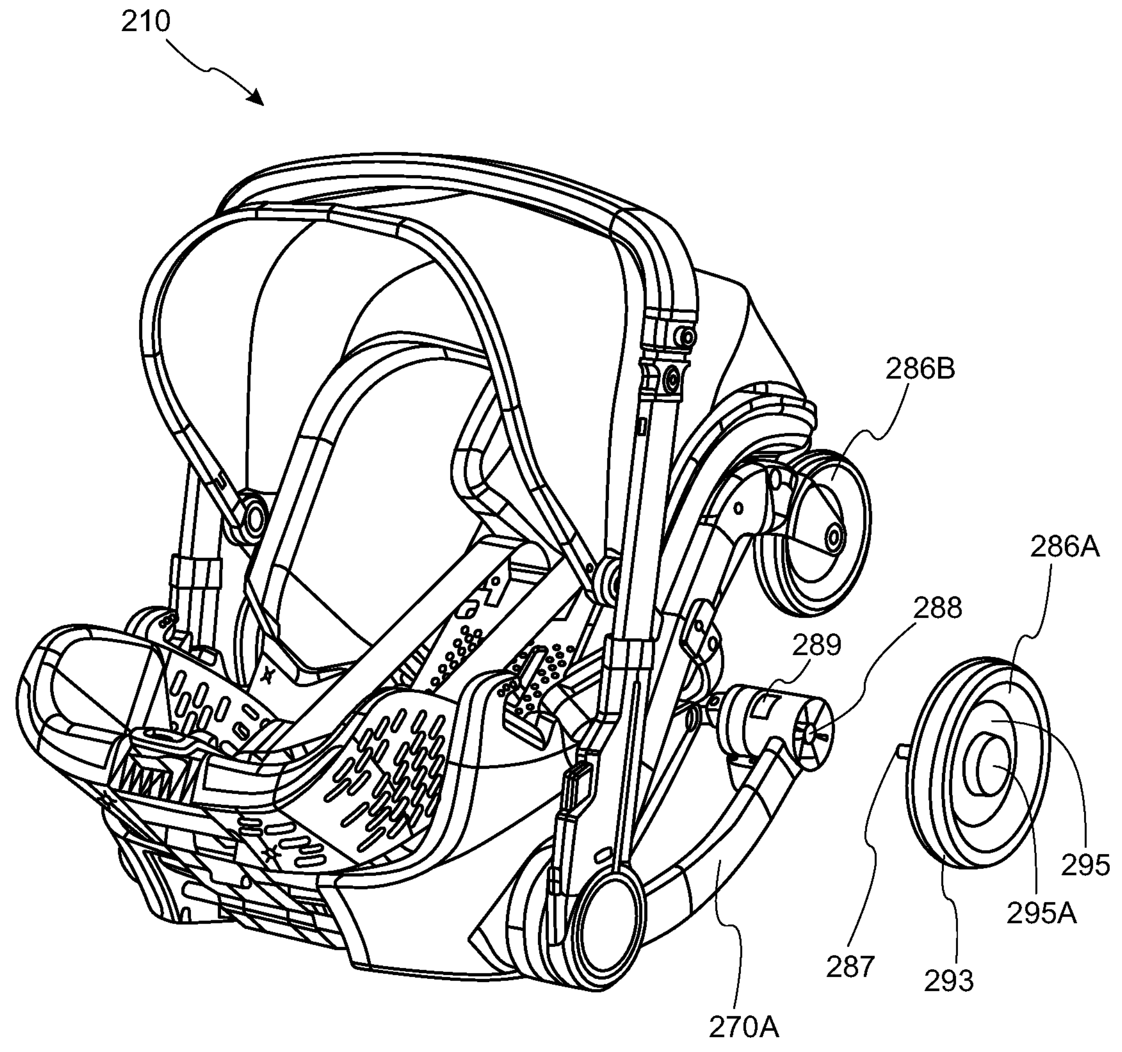
FIG. 13D is the same view as FIG. 13A, showing a front wheel removed from a corresponding front leg.
Figure 13E:
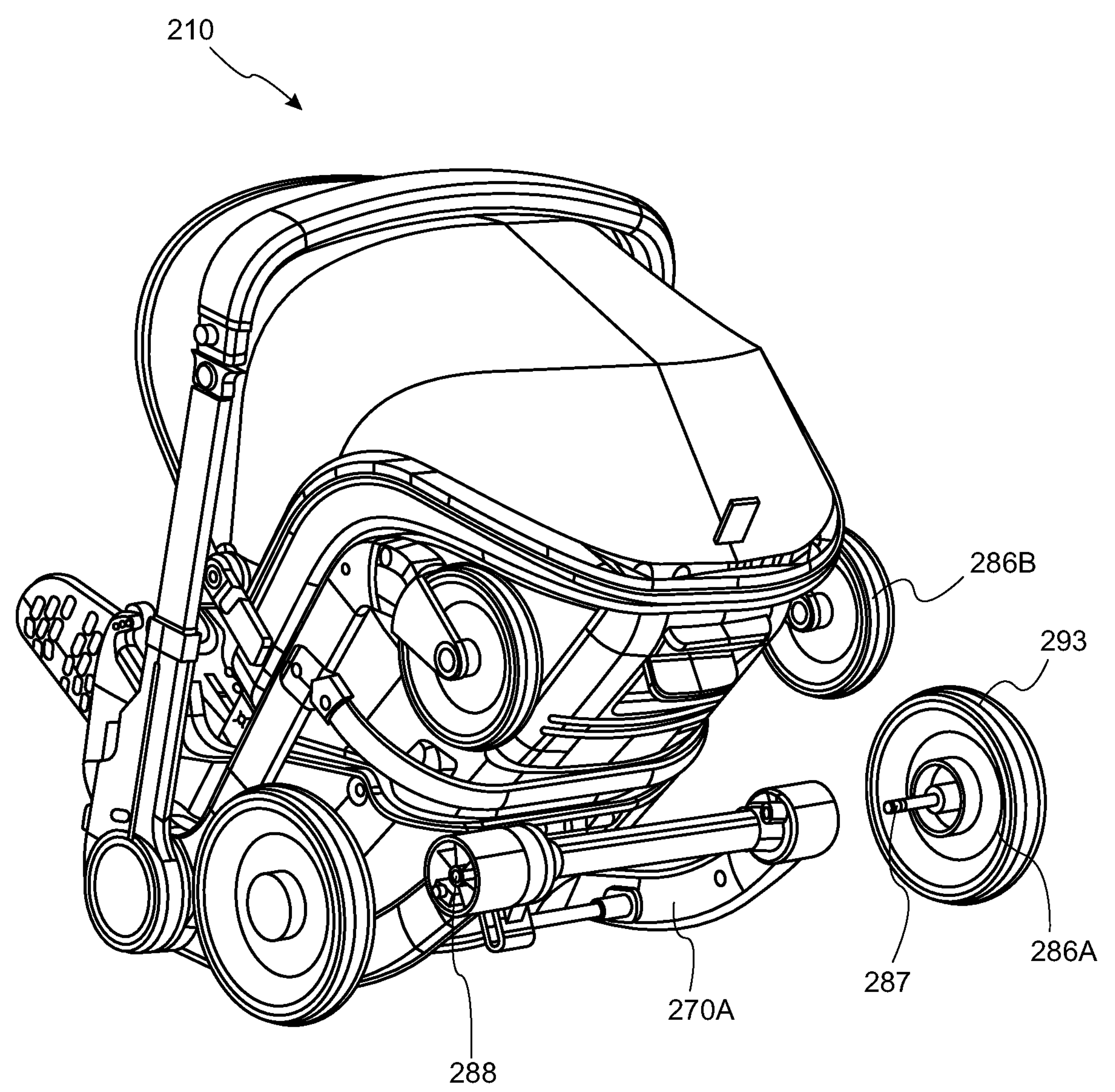
FIG. 13E is the same view as FIG. 13B, showing both front wheels removed from corresponding front legs.
Figure 13F:
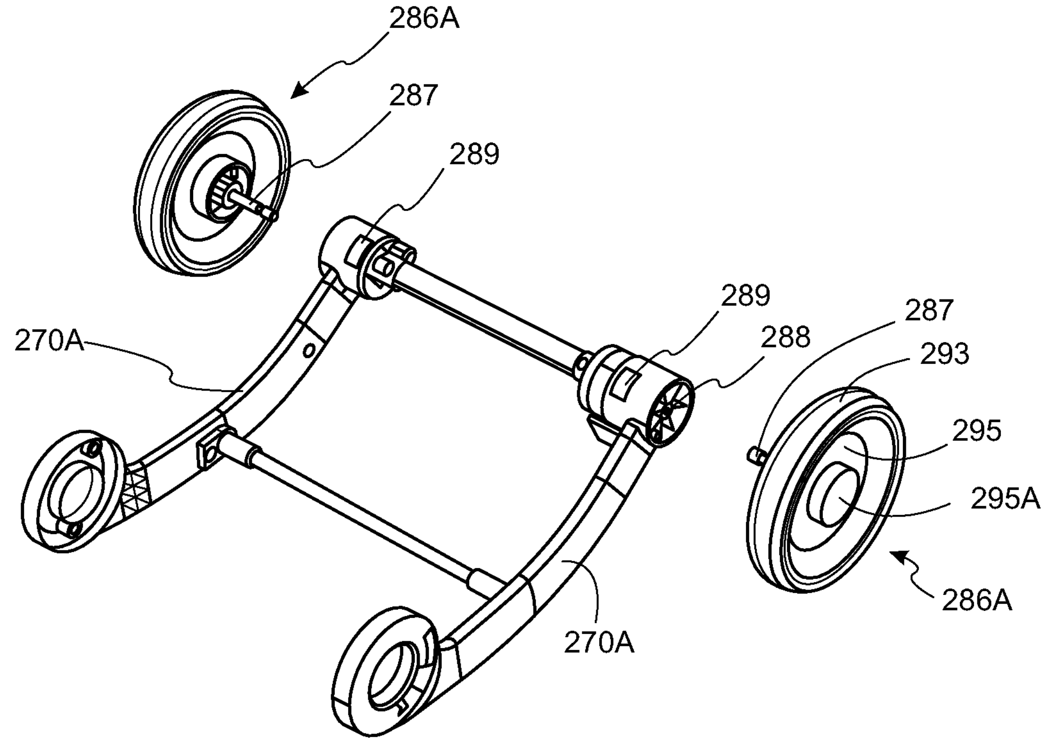
FIG. 13F illustrates the front legs and front wheels removed therefrom, of the baby safety car seat assembly of FIG. 13A.

In the present example, as can be best seen in FIG. 13C, in the storage of the legs 270, the front wheels 286A protrude sidewards (in a lateral direction depicted by arrow LT) with respect to the lower support 230 to a greater extent than the rear wheels 286B in the rear view (FIG. 13C) of the assembly 210. In the present example, the front wheels 286A are connected to the front legs 270A by a quick-release mechanism. In some examples, the rear wheels 286B can also be connected to the rear legs 270B by a quick-release mechanism having any suitable structure to allow connection and detachment of the rear wheels while allowing the wheels to roll when connected.

In the general, the front wheels 286A can be connected to the front legs 270A by a quick-release mechanism that allows removal of the wheels in a wheel-removal direction extending sidewards with respect to the lower support 230, for example parallel to the lateral direction depicted by arrow LT. The removal of the wheels in the sidewards direction allows the wheels to be removed by a person sitting in the car adjacent the assembly after positioning the assembly in the car.

Each of the front wheels can be detachably connected to its corresponding leg in the same manner, however only one has been described herein for the sake of conciseness. The front wheel 286A can comprise a leg-connection element that would extend along the wheel-removal direction when the wheel is connected to the corresponding leg, and the corresponding front leg 270A can comprise a wheel-connection element extending along the wheel-removal direction. The leg-connection element and the wheel connection element can constitute the quick-release mechanism and can have any suitable structure to allow detachable connection with each other allowing rotation of the wheel together with the leg-connection element with respect to the wheel-connection element about a wheel-rotation axis parallel to the wheel-removal direction. For example, the leg-connection element and the wheel connection element can constitute a pair of an elongated recess and an elongated protrusion, one of which can be on the wheel and the other on the leg. In some example, the leg-connection element and the wheel connection element can constitute two parts of a mechanical, electrical, or magnetic connection arrangement, being detachably connected to each other allowing rotation of the wheel with respect to the leg.

The quick-release mechanism comprises a release actuator for actuating a release of the leg-connection element from the wheel-connection element. For example, the release actuator can be in the form of a button or lever (either mechanical or electronic/electrical) that can be actuated by a user to remove the wheel. The release actuator can be positioned at the leg or the wheel at any location suitable for a user to access the release actuator and hidden enough to prevent unintentional actuation of the release of the wheel.

In the present example, the front wheel 286A has a leg-connection element 287 in the form of an elongated protrusion that extends parallel to the wheel removing direction WR when the wheel 286A is connected to the leg 270A. The front leg 270A comprises an elongated wheel-connection element 288 in the form of an elongated recess that extends parallel to the wheel removing direction The protrusion 287 and the recess 288 constitute the quick-release mechanism that allows rotation of the wheel about the wheel rotation axis WA. For connecting the front wheel 286A to the front leg 270A, the protrusion 287 is inserted into the recess 288, which gets locked therewithin, thereby securely connecting the wheel 286A to the leg 270A and allowing the front wheel 286A to rotate with respect to the front leg 270A.

The quick-release mechanism comprises a release actuator 289, in the form of a button positioned in the front leg 270A. For detaching the wheel 286A from the leg 270A, the button 289 is pressed, which actuates the release of the wheel 286A by releasing the protrusion 287 from the recess 288, and the wheel 286A can then be removed in the wheel-removal direction WR.

In general, the wheels 286 comprise a rolling area configured to come into contact with a supporting surface when the assembly 210 is rolled thereon by means of the wheels 286, and a remaining area configured to be free of contact with the supporting surface when the assembly is rolled thereon. The wheels 286 can comprise a wheel holding portion positioned at the remaining area and suitable for being held by a user at least for removing the wheel 286 from the corresponding leg 270. The remaining area can be at or adjacent the center of the wheel, and the wheel holding portion can be constituted by a central disc or a portion thereof. The wheel holding portion allows a user to hold the wheel, for example for removing the wheel from the leg without touching the dirty rolling area of the wheel.

In the present example, the front wheel 286A comprises the rolling area 293 and the remaining area 295 having the wheel holding portion 295A. The suitable for being held by a user at least for removing the wheel 286A from the corresponding front leg 270A.

The invention claimed is:

1. A convertible baby safety car seat assembly, comprising:

an upper seat having a backrest portion and a feet portion, the upper seat being manipulable between an upright state and an extended state, the backrest and feet portions forming a first angle therebetween in the upright state of the upper seat, the backrest and feet portions forming a second angle therebetween in said extended state of the upper seat, the second angle being greater than the first angle; and legs having distal ends with wheels and being manipulable between a storage state and an operational state, the car seat with the legs in the storage state being mountable in a car at a position suitable for securing an infant therein; the car assembly with the legs in the operational state being rollable on said wheels; the storage state of the legs being combinable only with the upright state of the upper seat in a first mode of the seat assembly, the extended state of the upper seat being combinable only with the operational state of the legs in a second mode of the seat assembly, while the operational state of the legs and the upright state of the upper seat being also combinable at least with each other.

2. The convertible baby safety car seat assembly according to claim 1, wherein the operational state of the legs is combinable with the upright state of the upper seat in a third mode of the seat assembly, and the seat assembly can be brought into its first and second modes only from its third mode.

3. The convertible baby safety car seat assembly according to claim 1, operative to have at least one of the following features:

manipulation of the legs in the second mode of the seat assembly is prevented at least indirectly by the upper seat being in the extended state; or manipulation of the upper seat in the first mode of the seat assembly is prevented at least indirectly by the legs being in the storage state.

4. The convertible baby safety car seat assembly according to claim 1, further comprising at least one of the following manipulation prevention arrangements:

a seat manipulation prevention arrangement operative to prevent manipulation of the upper seat from the upright state to the extended state at least when the legs are in the storage state; or a leg manipulation prevention arrangement operative to prevent manipulation of the legs from the operational state to the storage state at least when the upper seat is in the extended state.

5. A convertible baby safety car seat assembly, comprising:

an upper seat having a backrest portion and a feet portion;

a seat manipulation mechanism operable to manipulate the upper seat between an upright state and an extended state, the backrest portion and the feet portion forming a first angle therebetween in said upright state of the upper seat, the backrest portion and the feet portion forming a second angle therebetween in said extended state of the upper seat, the second angle being greater than the first angle;

legs having distal ends associated with wheels and operative to be manipulated between a storage state and an operational state, the car seat assembly with the legs in said storage state being mountable in a car at a position suitable for securing an infant therein, the car seat assembly with the legs in the operational state being rollable on said wheels; and a seat manipulation prevention arrangement operative to prevent manipulation of the upper seat from the upright state to the extended state at least when the legs are in the storage state, said seat manipulation prevention arrangement comprising a seat trigger member and a seat arresting member, wherein the seat trigger member is operative to operate the seat arresting member upon being triggered by the legs, when the legs are in the operational state thereof.

6. A convertible baby safety car seat assembly comprising:

a lower support having front and rear portions and a reference plane horizontally passing through a lowermost area of the lower support;

an upper seat articulably connected to said lower support and having a backrest portion articulated to the rear articulation portion of the lower support and a feet portion articulated to the front articulation portion of the lower support;

legs having wheels, the legs being manipulable between a storage state and an operational state, in said storage state at least the wheels being located above the reference plane and the assembly being mountable in a car at a position suitable for securing an infant therein, and in said operational state at least the wheels being located below the reference plane so as to enable the seat assembly to be rolled on of said wheels;

a leg manipulation mechanism operable to manipulate the legs between the storage state and the operational state;

a seat manipulation mechanism operable to manipulate the upper seat including articulation of the backrest and the feet portion with respect tot eh respective rear and front articulation portions of the lower support, between an upright state and an extended state, in said upright state of the upper seat the backrest portion and the feet portion forming a first angle therebetween, and in said extended state of the upper seat the backrest portion and the feet portion forming a second angle therebetween, the second angle being larger than the first angle;

a seat manipulation actuator configured to enable a user to manipulate the seat manipulation mechanism and at least one leg manipulation actuator configured to enable a user to manipulate the leg manipulation mechanism, wherein the seat manipulation actuator and the at least one leg manipulation actuator being positioned one at a location associated with the front articulation portion of the lower support and the other one at a location rearwardly spaced from the front articulation portion of the lower support.

7. The convertible baby safety car seat assembly according to claim 6, wherein the seat manipulation actuator is positioned at the front articulation portion of the lower support.

8. The convertible baby safety car seat assembly according to claim 6, wherein the storage state of the legs is combinable only with the upright state of the upper seat, defining a first mode of the seat assembly; the extended state of the upper seat is combinable only with the operational state of the legs, defining a second mode of the seat assembly; and the operational state of the legs and the upright state of the upper seat are also combinable at least with each other, defining a third mode of the seat assembly.

9. The convertible baby safety car seat assembly according to claim 8, configured to have at least one of the following features:

manipulation of the legs in the second mode of the seat assembly is prevented at least indirectly by the upper seat being in the extended state; or manipulation of the upper seat in the first mode of the seat assembly is prevented at least indirectly by the legs being in the storage state.

10. The convertible baby safety car seat assembly according to claim 6, further comprising at least one of the following:

a leg manipulation prevention arrangement configured to prevent manipulation of the legs from the operational state to the storage state at least when the upper seat is in the extended state; or a seat manipulation prevention arrangement configured to prevent manipulation of the upper seat from the upright state to the extended state at least when the legs are in the storage state.

11. A convertible baby safety car seat assembly suitable for securing an infant therein, and having a first, storage mode and a second, operational mode, in the first, storage mode the assembly being suitable for being mountable in a car at a position suitable for securing an infant therein, and in the second, operational mode the assembly being rollable along an external supporting surface, the assembly when in the storage mode and positioned on an external supporting surface being rockable thereon between a neutral position and at least one of front and rear inclined positions, the assembly comprising:

one or more lowermost areas that are operable to contact the external supporting surface in the neutral position;

at least one of front and rear areas that is operable to contact the external supporting surface when in said corresponding at least one of front and rear inclined positions;

a horizontal reference plane including the one or more lowermost areas of the assembly when in the neutral position and imaginarily representing said external supporting surface; a lower support having front and rear portions and a seat lowermost area closest to the horizontal reference plane when the assembly is in the neutral position;

an upper seat connected to said lower support and having a backrest portion associated with the rear portion of the lower support and a feet portion associated with the front portion of the lower support;

legs connected to the lower support at their proximal ends and having distal ends with wheels fixed thereto at least in the operational mode, the legs being manipulable between a storage state associated at least with the storage mode of the assembly and an operational state associated at least with the operational mode of the assembly, in the storage state of the legs at least a part of each leg with the wheel being located above the reference plane, and the operational state of the legs at least said part of each leg with the wheel being located below the reference plane so as to enable the seat assembly to be rolled on said wheels; the legs constituting a pair of rear legs and a pair of front legs, the legs of at least one of the pairs having a curved shape such that, when in the storage state, the legs of the at least one pair have a first area that is positioned above the reference plane in the neutral position, at least one second area constituting said at least one of front and rear areas, and at least one third area spaced from the first and the second area, at least the second area having a rocking-participating portion made of a material other than that of the at least one third area, said material being such as to improve at least one rocking quality compared with that which said rocking-participating portion would have if it were made of the material from which the third area is made.

12. The convertible baby safety car seat assembly according to claim 11, wherein said rocking quality is at least one of the following:

a higher friction ability such that the rocking-participating portion constitutes a friction increasing portion; or softness such that the rocking participating portion constitutes a soft-contact portion.

13. The convertible baby safety car seat assembly according to claim 11, wherein at least one of the lower support and the legs comprises at least one other area spaced from the one or more lowermost areas and the at least one second area, wherein at least one of the one or more lowermost areas comprises a friction-increasing portion made of a material having higher friction ability than that of the at least one other area.

14. The convertible baby safety car seat assembly according to claim 11, wherein the wheels of the legs of said at least one pair of legs, when connected to the legs, constitute stoppers for restricting the rocking of the assembly in said at least one of front and rear inclined positions.

15. The convertible baby safety car seat assembly according to claim 11, wherein each leg having the rocking-participating portion is made of a first material and said rocking participating portion is made of a second material other than the first material; and wherein said rocking participating portion is in the form of a liner attached to the corresponding leg at a surface thereof facing the reference plane.

16. A baby seat comprising at least in use:

a shell made of a plastic material and having an external side facing an exterior and an internal side at which a fabric cover of the seat can be attached to the shell, the shell having a back wall and two sidewalls, each having corresponding inner and outer surfaces merging at respective upper edges, the upper edges of the back wall and sidewalls merging continuously and constituting a shell upper edge, the fabric cover for covering at least the internal side of the shell when the fabric cover is detachably connected thereto;

a canopy; and a zipper arrangement for detachably connecting the cover and the canopy to the shell adjacent the shell upper edge, the zipper arrangement comprising a canopy zipper and a cover zipper, each of the zippers being of a separating type and comprising a zipper box and a zipper pin and having a shell zipper half with one of the zipper box and the zipper pin, sewn to the shell adjacent to the shell upper edge, at the outer surfaces of the back wall and the sidewalls at least along portions thereof adjacent to the back wall, and a matching zipper half with the other of the zipper box and the zipper pin, the matching zipper half of the cover zipper being sewn to said cover and the matching zipper half of the canopy zipper being sewn to said canopy.

17. The baby seat according to claim 16, wherein the shell zipper half of each of the zippers has a base portion at which the shell zipper half is sewn to the shell and a flapping portion with zipper teeth, and both shell zipper halves of the two zippers are sewn to the shell at the base portions of the shell zipper halves so that the flapping portions of the shell zipper halves can be manipulated separately and independently from each other when engaging the corresponding matching halves of the zippers.

18. The baby seat according to claim 16, wherein when both the cover and the canopy are zipped to the shell, the canopy zipper overlies the cover zipper along the length of the canopy zipper.

19. The baby seat according to claim 16, wherein the zipper boxes of the shell halves of the two zippers are located at or adjacent different side walls of the shell, enabling the cover zipper to be fastened in a direction opposite to that of the canopy zipper.

20. The baby seat according to claim 16, wherein both of the shell zipper halves are sewn to the shell together by at least one common sewing seam.

21. The baby seat according to claim 16, wherein the zipper box is located on the shell zipper half and the zipper pin is located on the matching zipper half.

22. A convertible baby safety car seat assembly, comprising:

a lower support having front and rear portions and a reference plane horizontally passing through a lowermost area of the lower support;

an upper seat connected to said lower support and having a backrest portion associated with the rear portion of the lower support and a feet portion associated with the front portion of the lower support;

legs having wheels, the legs being manipulable between a storage state and an operational state, in said storage state of the legs at least the wheels being located above the reference plane and the assembly being suitable for being positioned in a car or on a supporting surface at a position suitable for securing an infant therein; in said operational state, at least the wheels are located below the reference plane so as to enable the seat assembly to be rolled on said wheels; the legs constituting a pair of rear legs associated with rear wheels, and a pair of front legs associated with front wheels, the front wheels protruding sidewards from the lower support in the storage state thereof, to a greater extent than the rear wheels at least in the rear view of the assembly; said front legs being pivotable for being manipulated from the operational state to the storage state such that in the storage state said front wheels are positioned closer to the backrest portion than the feet portion;

wherein at least the front wheels are connected to the front legs by a quick-release mechanism and are removable from the front legs in a wheel-removal direction extending sidewards with respect to the lower support;

wherein each of said front wheels comprises a leg-connection element extending along the wheel-removal direction when the wheel is connected to the corresponding front leg, and each of the front legs comprises a wheel-connection element extending along said wheel-removal direction, said leg-connection element and said wheel-connection element being detachably connectable to each other allowing rotation of the wheel together with the leg-connection element with respect to the wheel-connection element about a wheel-rotation axis parallel to the wheel-removal direction, said leg-connection element and said wheel-connection element at least partially constituting the quick release mechanism.

23. The convertible baby safety car seat assembly according to claim 22, wherein each of the front wheels comprises a rolling area configured to come into contact with a supporting surface when the assembly is rolled thereon by means of the wheels, and a remaining area configured to be free of contact with the supporting surface when the assembly is rolled thereon, each of said front wheels comprising a wheel holding portion positioned at said remaining area suitable for being held by a user at least for removing the wheel from the corresponding front leg.

24. The convertible baby safety car seat assembly according to claim 22, wherein the quick-release mechanism further comprises a release actuator for actuating a release of the leg-connection element from the wheel-connection element.

25. The convertible baby safety car seat assembly according to claim 24, wherein the release actuator is positioned at one of the front wheel and the corresponding front leg.

26. The convertible baby safety car seat assembly according to claim 22, wherein the rear wheels are connected to the rear legs by a quick-release mechanism.

* * * * *